US008666786B1

(12) United States Patent
Wirz et al.

(10) Patent No.: US 8,666,786 B1
(45) Date of Patent: Mar. 4, 2014

(54) AUTOMATED SYSTEM TO UPDATE INSURANCE CARRIER WITH EXPOSURE DATA IN REAL-TIME

(76) Inventors: Derek Wirz, Ooltewah, TN (US); Kevin S. Hale, Joelton, TN (US)

( * ) Notice: Subject to any disclaimer, the term of this patent is extended or adjusted under 35 U.S.C. 154(b) by 0 days.

(21) Appl. No.: 13/355,812

(22) Filed: Jan. 23, 2012

Related U.S. Application Data

(60) Provisional application No. 61/435,587, filed on Jan. 24, 2011.

(51) Int. Cl.
*G06Q 40/00* (2012.01)

(52) U.S. Cl.
USPC .................................. 705/4; 705/30

(58) Field of Classification Search
USPC ....................................... 705/4–44
See application file for complete search history.

(56) References Cited

U.S. PATENT DOCUMENTS

| | | | | |
|---|---|---|---|---|
| 4,837,693 | A * | 6/1989 | Schotz | 705/4 |
| 7,240,016 | B1 * | 7/2007 | Sturgis et al. | 705/4 |
| 7,277,861 | B1 * | 10/2007 | Benson et al. | 705/4 |
| 8,090,598 | B2 * | 1/2012 | Bauer et al. | 705/4 |
| 2002/0143583 | A1 * | 10/2002 | Reader et al. | 705/4 |
| 2003/0191581 | A1 * | 10/2003 | Ukai et al. | 701/207 |
| 2010/0186469 | A1 * | 7/2010 | Blomkvist | 71/12 |
| 2010/0241463 | A1 * | 9/2010 | Corben et al. | 705/4 |
| 2012/0158436 | A1 * | 6/2012 | Bauer et al. | 705/4 |

* cited by examiner

Primary Examiner — Frantzy Poinvil
(74) Attorney, Agent, or Firm — Stephen J. Stark; Miller & Martin PLLC

(57) ABSTRACT

A computerized method for a commercial insurance policyholder, agent and/or insurer to maintain and manipulate data that is relevant to the cost of their insurance and risk to a loss or injury. A number of parties may view the relevant data to determine the risk of the policyholder and determine if the premium charges forecasted are accurate preferably in real-time such as during the policy period.

20 Claims, 10 Drawing Sheets

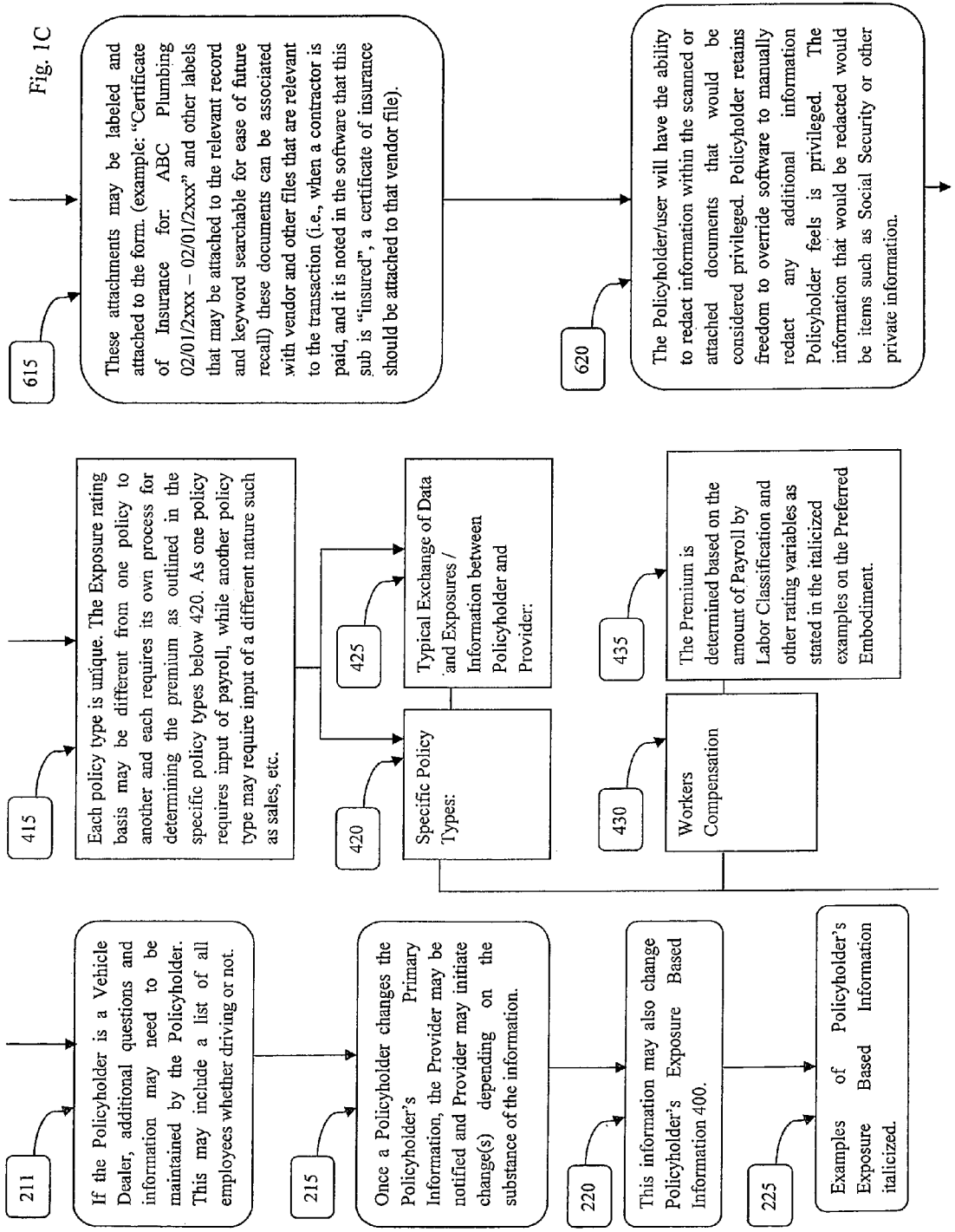

Fig. 1I

When the installation contract is attached to the software, questions may be posed about the method or materials used to install products in the installation process. The Provider may automatically evaluate the potential for injury when the Policyholder is using such materials. Additionally, when the materials list is input into the contract to install materials or the use of materials, the software may automatically assist the Policyholder by forwarding electronically or by other means the Material Safety Data Sheets. Additionally, when the materials or products being used or installed are identified, the installation process may also be forwarded to the Policyholder to assist with the proper techniques and methods of the installation. These two processes may reduce or mitigate the potential for injury to a worker or someone from the public while reducing the potential for a completed operations or product liability claim.

685

When the location of the job-site that the Policyholder has contracted to perform work or install materials is entered into the software, the software may automatically or by other means determine if the location of the state is a covered location under a Workers Compensation policy. If the location state is not a covered state, the software may notify the Provider and Policyholder of the problem. Each party may determine the steps to take to eliminate the potential exposure. If the policies do not include the premium rates for the states not covered by the insurance policies, the Provider may contact the Policyholder to alert them of the premium obligation, or notify the Policyholder of the need to make a request to add the coverage to the policy.

690

Policies with restrictive policy language or limitation involving the type of materials used or installed (property losses such as Installation Floater or Builders Risk) or other losses such as work performed outside of the United States or coverage territory, work or products manufactured or installed that are not insured products or installations that may affect the General Liability or other coverage.

691

AUTOMATED SYSTEM TO UPDATE INSURANCE CARRIER WITH EXPOSURE DATA IN REAL-TIME

CLAIM OF PRIORITY

This application claims the benefit of U.S. Provisional Patent Application No. 61/435,587 filed Jan. 24, 2011.

FIELD OF THE INVENTION

The present invention pertains to a method for a Policyholder to electronically communicate "exposures" in real-time on Workers Compensation, Commercial General Liability, Commercial Auto Insurance, Trucking and Transportation Insurance, Blanket Property, Blanket Builders Risk, Garage Liability, Professional Liability, and/or other insurance policies in which the insurance carrier normally contractually requires year end reconciliation. This reporting may be completed by the Policyholder or other party in real-time, any time, and reported on time during the policy term or after a policy term. More specifically, the present invention relates to a system for the insurance company or other to use specific information to produce mid-policy term evaluations and determine exposures, mitigate the potential for losses, and proper premium charges in real-time. The invention even more specifically may allow for a Policyholder or their insurance company underwriter or agent or other party (Provider) to review the information provided in the electronic data and determine potential future policy renewal terms, costs, and exposures. The invention even more specifically may allow for all departments of an insurance carrier to develop proper data so that the company may improve Sarbanes-Oxley 404 Processing requirements. Additionally, the invention may allow for the Loss Control Department of the insuring carrier to properly evaluate what techniques mitigate the potential for losses in areas and amounts of exposure that the Policyholder is engaged.

DESCRIPTION OF THE PRIOR ART

The term "audit" is a generally accepted insurance term. There are numerous methods and software available for calculating a premium audit. These methods and software programs do not anticipate that the Policyholder report periodic changes in exposures as these exposures occur; in fact these other methods typically require an event to occur. These events may be through a preliminary audit or a more traditional method such as waiting till the actual end of the policy term to determine the actual exposures that the Policyholder was engaged. U.S. Pat. No. 5,855,005 is illustrative of such prior art. While this may be suitable for insurance carriers, it is not believed to be suitable for a business that needs a method to evaluate exposures and measure these exposures real-time, any time and then to report these exposures on time to the insurance carrier. The prior art would be considered as a reactive system while there exists a need for an improved and/or proactive system.

These prior methods have been used by insurance carriers for many years because it has been valuable to collect this data to determine the final premium. The prior art would not be as suitable for at least some purposes. Waiting for data from the Policyholder appears to be an incubator that creates misunderstandings and inefficiencies.

Additionally, the unfamiliar tools that the insurance industry uses to communicate what is expected are universally creating misunderstandings. Under the prior art, the Policyholder has to wait to inform their insurance company (or its auditors) the information for an audit. Insurance companies that wait for this information do not know how much may ultimately be charged until after the policy term has been complete and audited.

Certain commercial insurance policies require that the insurance companies review the exposures that developed a premium charge. The typical method of the insurance industry is to review these exposures after the policy term is complete (typically one year policies). The computerized method in which commercial insurance carriers have had to develop the relevant audit information from their Policyholder is through systems such as the system in U.S. Pat. No. 5,855,005. Until now, this has been the most practical method.

However, there is believed to be a need for improvement over the prior art of collecting data. The prior art often required travel of an auditor to collect the data from a Policyholder and improvements are believed to be desirable over this prior art system. Furthermore, the prior art technique is believed to be an expensive method for the insurance carrier to determine premium charges. Additionally, prior art techniques are believed to not allow the insurance carrier to evaluate exposures that occurred, and thusly, the insurance carrier underwriters often times are surprised to learn that their Policyholder has changed operations, for example, in the contracting business a contractor may enter into a contract to perform work that was not anticipated when the policy was written for the Policyholder.

Also, many insurance agents and others may use Insurance Service Office (ISO) or National Council on Compensation Insurance (NCCI) information or other organizational information as licensed by those organizations to those parties for their use. Many policies provide requirements similar to: "You will let us examine and audit all your records that relate to this policy. These records include ledgers journals, registers, vouchers, contracts, tax reports, payroll, and disbursements records, and programs for storing and receiving data. We may conduct the audits . . . during the policy period and within . . . years after the policy ends. Information developed by audit will be used to determine final premium. Insurance rate service organizations have the same rights we have under this provision." However, in practice, very few audits are believed to be performed during the policy term, and if so, it is not a cost effective method of conducting audits as personnel associated with providing the interim insurance audits are costly.

SUMMARY OF THE INVENTION

For many embodiments of the present invention, much significant effort has been employed to avoid using the term "audit" as opposed to exposure. However, in the commercial insurance business, many policies are auditable. As opposed to prior art auditing methods, which occur after the end of a policy in a reactive manner, many embodiments of the applicant's system and method are proactive by providing information during the policy period so that it need not be tracked down later, or result in surprises to parties involved in the policy. Instead of having to wait until the end of the policy term, exposures in many embodiments of the applicants' system and method can be determined in real time, whenever an involved party desires such information.

Another advantage of many embodiments of the present invention is that it provides a risk mitigation tool. Policyholder can have a good knowledge of what coverage has been purchased and what the premiums may be in real time. Many embodiments can show the Policyholder how important it is to obtain certificates of insurance from subcontractors or obtain contracts or agreements and other important information to minimize the risk of the Policyholder, reduce the likelihood of their insurance carrier paying an unnecessary claim, and thus likely reduce the expense of the policy.

Another advantage of many embodiments of the present invention include an ability for Policyholder, agents and others to ascertain how their policy premiums are calculated and/or how to assign insurance classifications to certain portions of their business to attempt to limit misunderstandings. Rules and/or rates may be provided to the Policyholder through at least some embodiments of the applicant's invention.

Still another advantage of many embodiments of the present invention is that the Policyholder or other party can calculate premiums real time. Since Final Premiums are based on actual and not on estimated exposure to the insurance company, the tool reduces the likelihood that a salesman could provide an initial low quote in an effort to obtain new business.

The participating Policyholder and insurance carrier may benefit from using a system as shown and described herein by reducing the amount of time needed to complete an insurance application, reducing or eliminating misunderstandings on exposures during and/or after the term of the policy by commercial insurance companies, their Policyholders and their agents.

The data maintained by the Policyholder on the software may be used by the Policyholder, Policyholder's insurance company (Provider) or others to assist in preparing the final audit invoice. The application described herein may allow commercial Policyholders an easy, stress-free system to prepare the information to forward to the premium audit department of the insurance company. The program may change the insurance industry by reducing costs for the agent, insurance carrier and client Policyholder. Through the use of the software, the need for field insurance premium auditor preparing physical audits may be reduced or even no longer be needed, thus significantly reducing the cost of insurance company operations.

The insurance Policyholder, insurance agent and insurance company may no longer have to wait weeks and months for the final audit paperwork. The Policyholder may be able to take simple concise steps to enter/key their exposure data in a secure software database environment, allowing the premium audit department, and others to view and reconcile the data in a convenient way. Alternatively, the software may be able to import data from other software systems such as accounting systems of the Policyholder, or Provider/insurance company software programs that allow the Policyholder or representative to "pay-as-you-go" or other programs that may allow the Policyholder to report the Exposures on a "reporting form." Interested departments at insurance companies may benefit because they may be able to view Exposure Data Reports through the software. Requiring the Policyholder to use the software may advance the insurance industries' need to meet the requirements of real-time premium reporting (actual vs. forecasted/estimated), posting and accounting of commercial insurance premiums.

The previously preferred embodiment provides a method of auditing a policy has not changed in many years. The invention has changed the sequence in which data is collected.

The presently preferred embodiment provides a method allowing a Policyholder/carrier the ability to pro-actively assess the exposures and other information that may heighten the risk for injury or claims during the policy period instead of reactively assessing the exposures after the policy period is complete.

The insurance company may not have to wait for the Policyholder's premium audit to complete the final accounting by allowing the immediate availability benefits the insurance company and Policyholder.

The information that is being sent may be updated by various interested parties such as, but not limited to, Policyholder, accountant, insurance company auditor, or even their insurance agent. The information may be bridged and/or imported automatically or otherwise from the Policyholder's accounting or other systems such as QuickBooks® or Peachtree® accounting programs, including but not limited to other software programs that allow the Policyholder to report wages/payrolls and other Exposures within "reporting forms."

The current Sarbanes-Oxley requirement of the 404 processing at both carrier and Policyholder level can be met should either party be a publicly held company.

The data maintained by the Policyholder on the software may be accessible by the Policyholder's insurance company to prepare the final audit invoice in some embodiments.

While U.S. Pat. No. 5,855,005 (INA) is a software system that audits a policy, one difference between at least some embodiments of the applicant's software and the software of INA is that the applicant's process is the pro-active method to determine exposures during the policy term while the INA's program is a system that audits the Policyholder using a skilled auditor asking questions and then inputting the answers into a software program. INA's software does not permit the Policyholder to update their exposure information periodically (as the preferred embodiment of the applicant's software allows). The INA process is also employed to collect data to audit a policy most often AFTER the policy period is over and should the carrier desire a Preliminary Audit, the software can also perform this task, however input is still valuable which is the main difference between this art and the prior art as described in the U.S. Pat. No. 5,855,005. The difference is one of proactive vs. reactive. The INA method is costly and cumbersome because it typically demands that an employee travel to the Policyholder's office and collect data. The applicant's system is one that requires little or no help or involvement from the staff of the insurance company.

Insurance Company of North America patent refers to Policyholder as "first source." One distinction of some embodiments may be the applicant's Business Method reporting.

The applicant's preferred process recognizes and understands current electronic methods of auditing policies exist in the market place today (INA). For purposes of this patent, this business method may use electronic transmission of information over the World Wide Web and possibly utilizes a methodology that is proactive during the policy period. This proactive means of using data shared between the client and the company is believed to have many benefits.

This method should be granted a business method patent because it utilizes evolutionary processes that are not being utilized by any company today. Specifically, these processes include but are not limited to;

1. Policyholder may periodically update information that is reporting to the carrier in at least some embodiments.
2. Data may be extracted from accounting systems and used to populate the applicant's program at any time during the policy period at least in some embodiments.
3. Data extracted may be used to maintain accurate exposure levels for client (costs) and company (exposure) at least in some embodiments.

4. Data extracted may help the claims department view trends in payroll to help in forecasting claims costs for at least some embodiments.
5. Data extracted may be current and reveal real-time exposures to allow proper Dept. level executives to properly account to management necessary Section 404 reporting responsibilities for at least some embodiments.
6. Data imported into the software, such as copies of contracts to perform work, employment agreements, etc. may be used by the carrier Loss Control Dept to mitigate losses from occurring; for example, if a contractor enters into a restrictive contract to remove snow and ice at a shopping center and wherein the contractor assumes the risk of all bodily injury claims, the department can immediately deploy to reduce potential claims in this uncertain area, etc.

This field of invention is believed to differ from other's systems that use a means of "electronically auditing exposures," in that our system allows the Policyholder to periodically update information that may be reported to the carrier for at least some embodiments. Other programs require that the data be secured from the Policyholder and inputted by another party (such as the premium auditor) into the computer system of the carrier after the term of the policy, or by means such as "pay-as-you-go", or monthly or periodic reporting. Ours differ in the fact at least some embodiments allow questions to be exposed to the Policyholder in which they electronically answer which in turn reports back to the insurance company audit department the results. This information may be exposed back to the carrier from the Policyholder may then be used to help the Provider/agent manage the policy during the policy term. This may allow the agent and Policyholder to properly manage the policy cost and coverage, it may help underwriting know what exposures are occurring as they occur, it may help the Loss Control Department understand what the Policyholder is doing and where they are doing it, it may help the Claims Department view trends in payroll so that they can forecast claims costs in real time, it may allow all of the proper department level executives to properly account to management their department level reporting responsibilities, and then the software may transfer data into third party Analytics software programs (404).

A major problem with commercial insurance and more specifically, Workers Compensation, General Liability, Garage Liability, and Builders Risk Providers is keeping up with the cost of insurance during and after the term of the insurance policy. In this patent application, we describe how our business method and software application improves the process in which a Policyholder, insurance agent, and insurance carrier benefit from the logic of the system. When a Policyholder secures commercial insurance coverage, typically this coverage is secured based on a forecast as to how much payroll and other Exposures the Policyholder forecasts, how much sales the company may have during the typical one year policy term. The architecture of our program allows the Policyholder, insurance agent, and insurance carrier (Provider) to have a better understanding of how much the coverage cost is likely to be during one or more portions of the policy period or afterward in which the Policyholder or other policy or system may update the data into their own software and/or the insurance file that is hosted by the software.

Before this software was developed, the Policyholder often had to complete a mid-term audit by their insurance carrier, analyze information on an empirical basis and hypothesize what the business owed or was due to receive after an insurance audit.

In the past, an insurance company had to rely strictly on the insurance application, their observations of trends in certain classifications, and then wait for an outcome for the final premium calculation or reconciliation. Observations are no longer going to be permitted by the insurance industry once this software replaces the old system of auditing a policy (after the policy term has expired) because the industry cannot wait some 18 months after a policy has been written to determine the actual premium.

BRIEF DESCRIPTION OF DRAWINGS

The particular features and advantages of the invention as well as other objects will become apparent from the following description taken in connection with the accompanying drawings in which:

The FIGURE is a flowchart showing a presently preferred embodiment of the present invention.

DETAILED DESCRIPTION OF THE DRAWINGS

Policyholder's Initial Setup 100

Figure 1A:
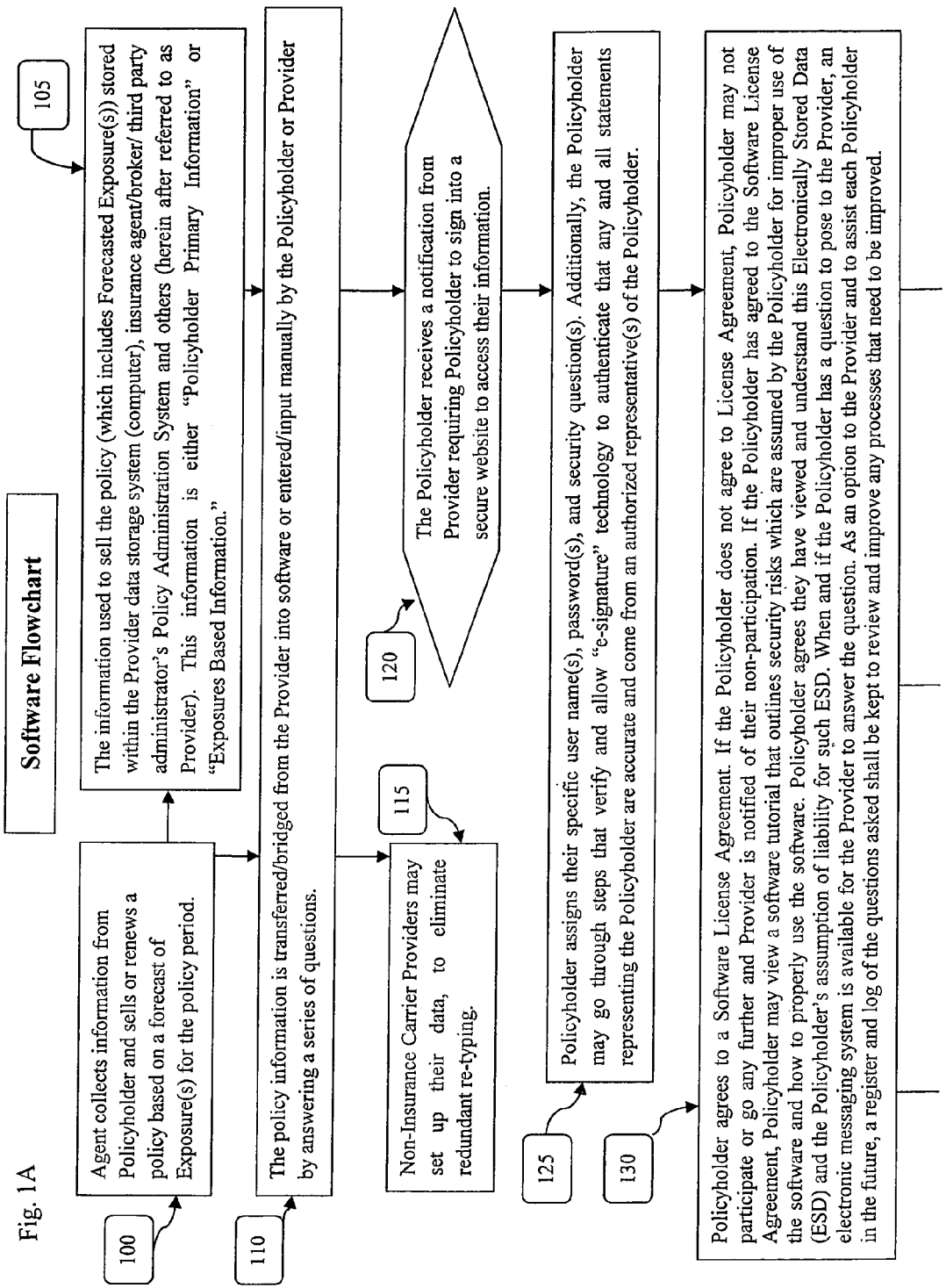
Figure 1B:
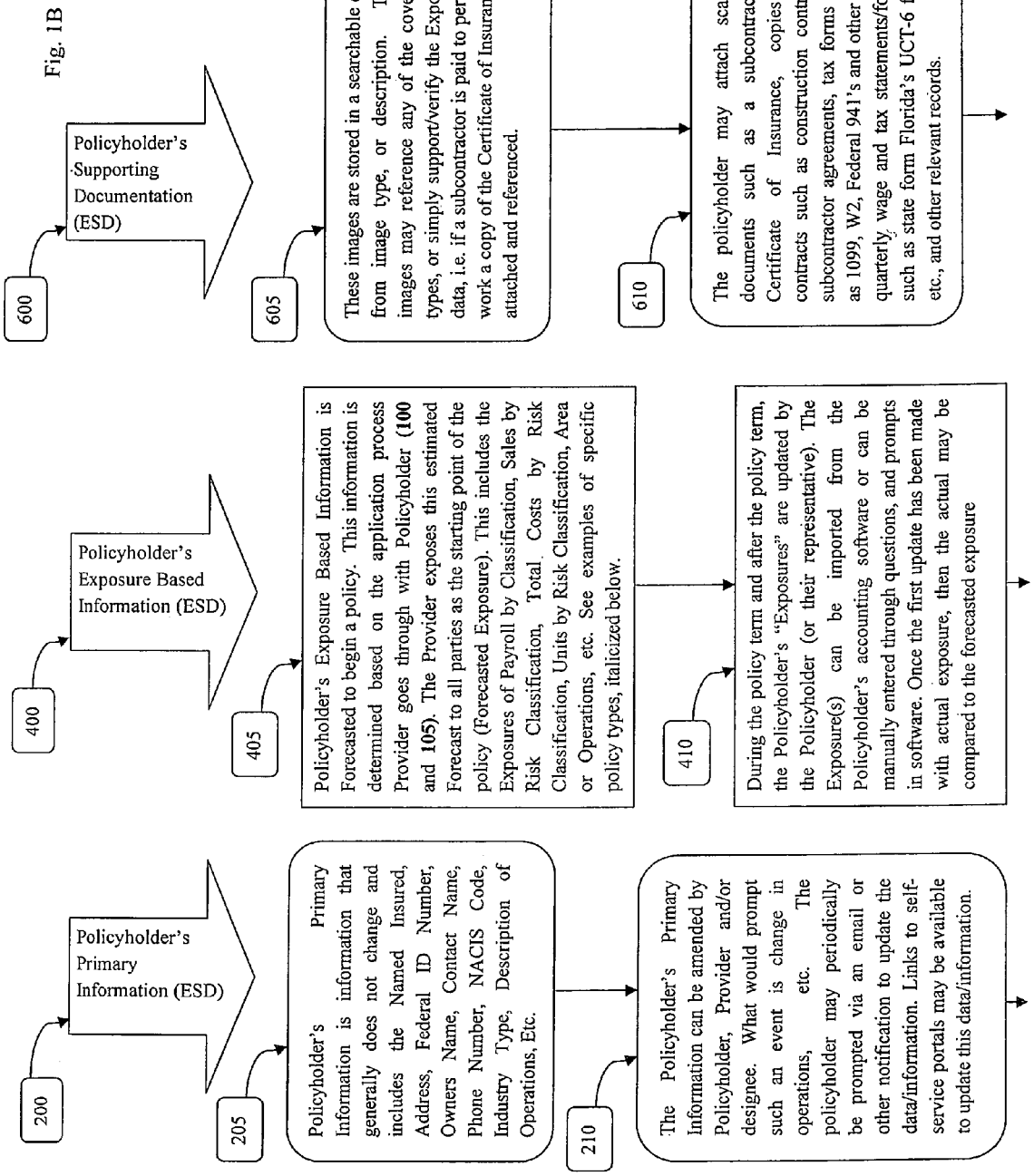
Figure 1D:
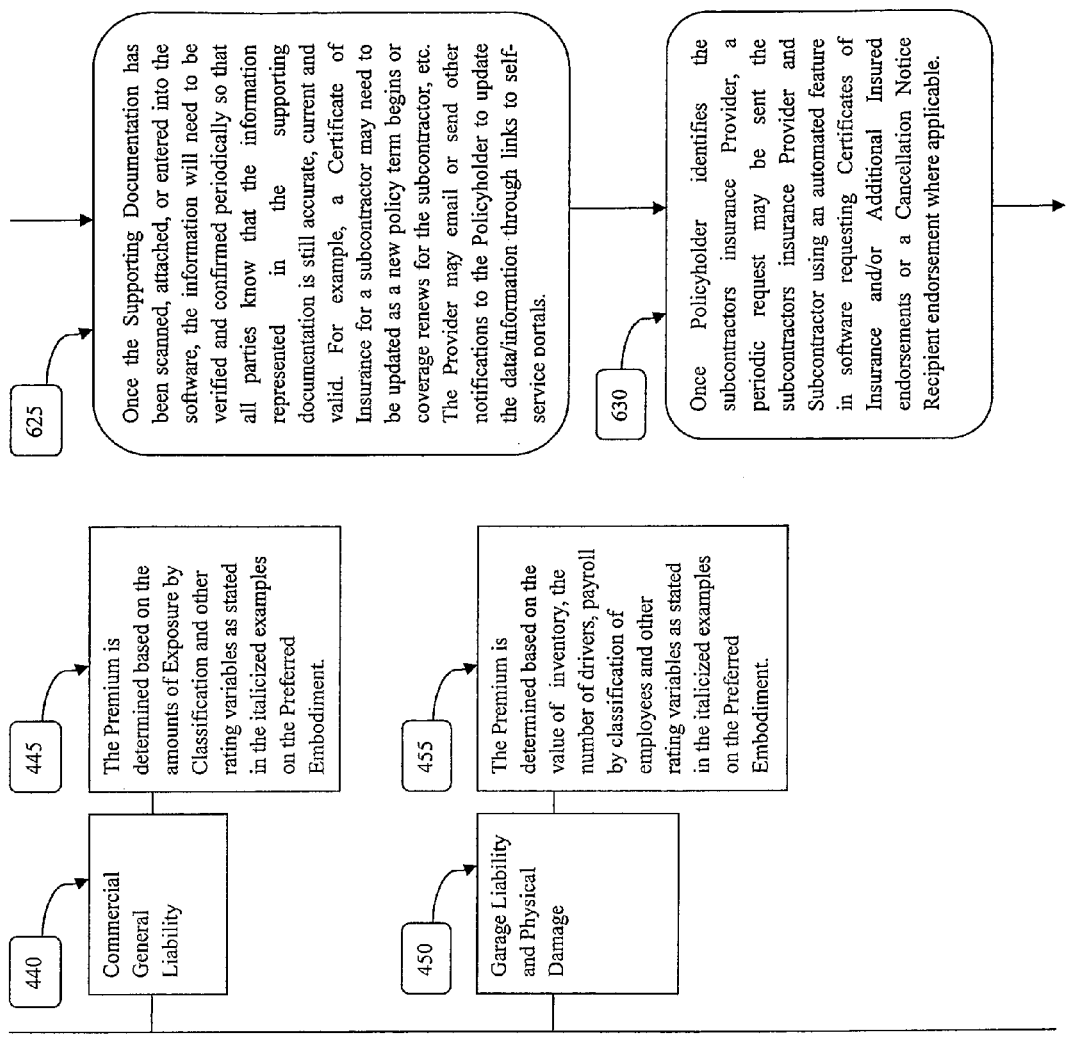
Figure 1E:
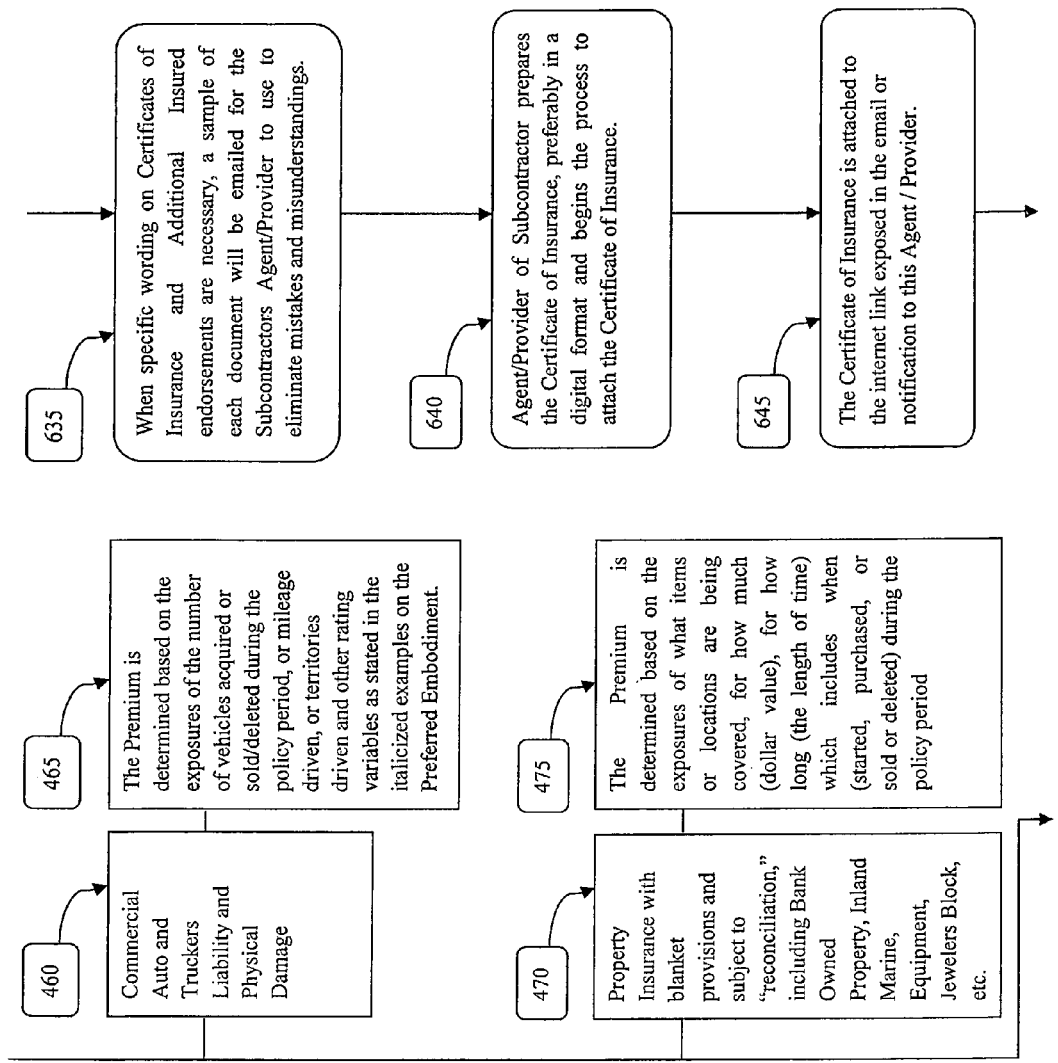
Figure 1F:
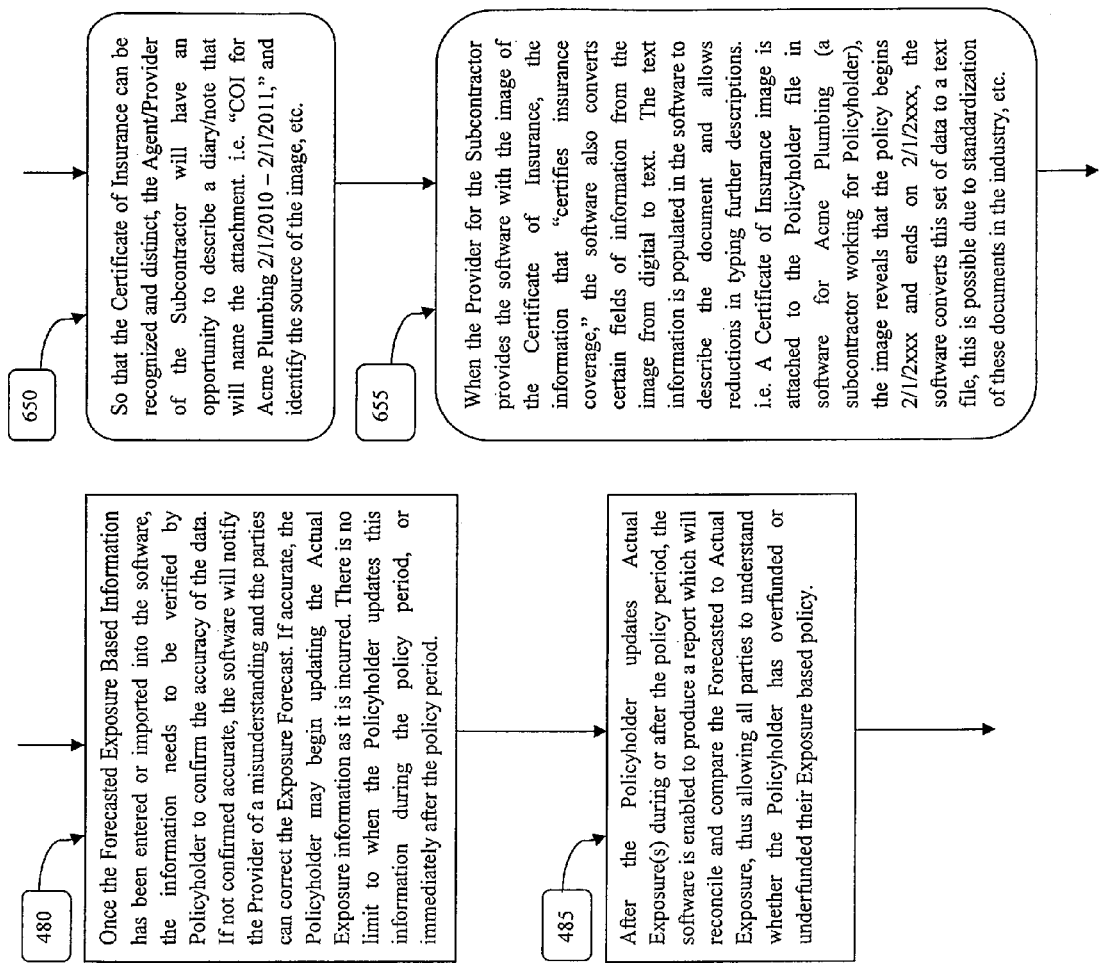
Figure 1G:
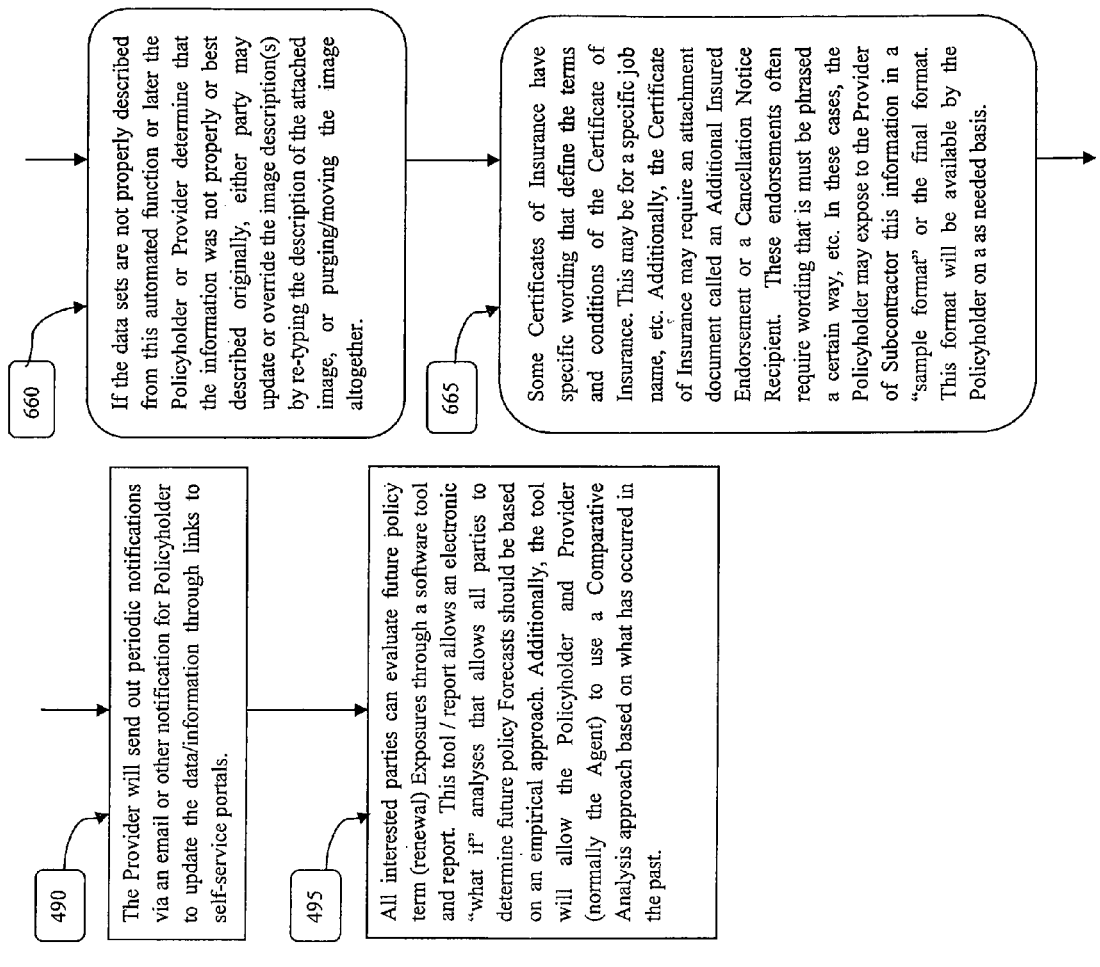
Figure 1H:
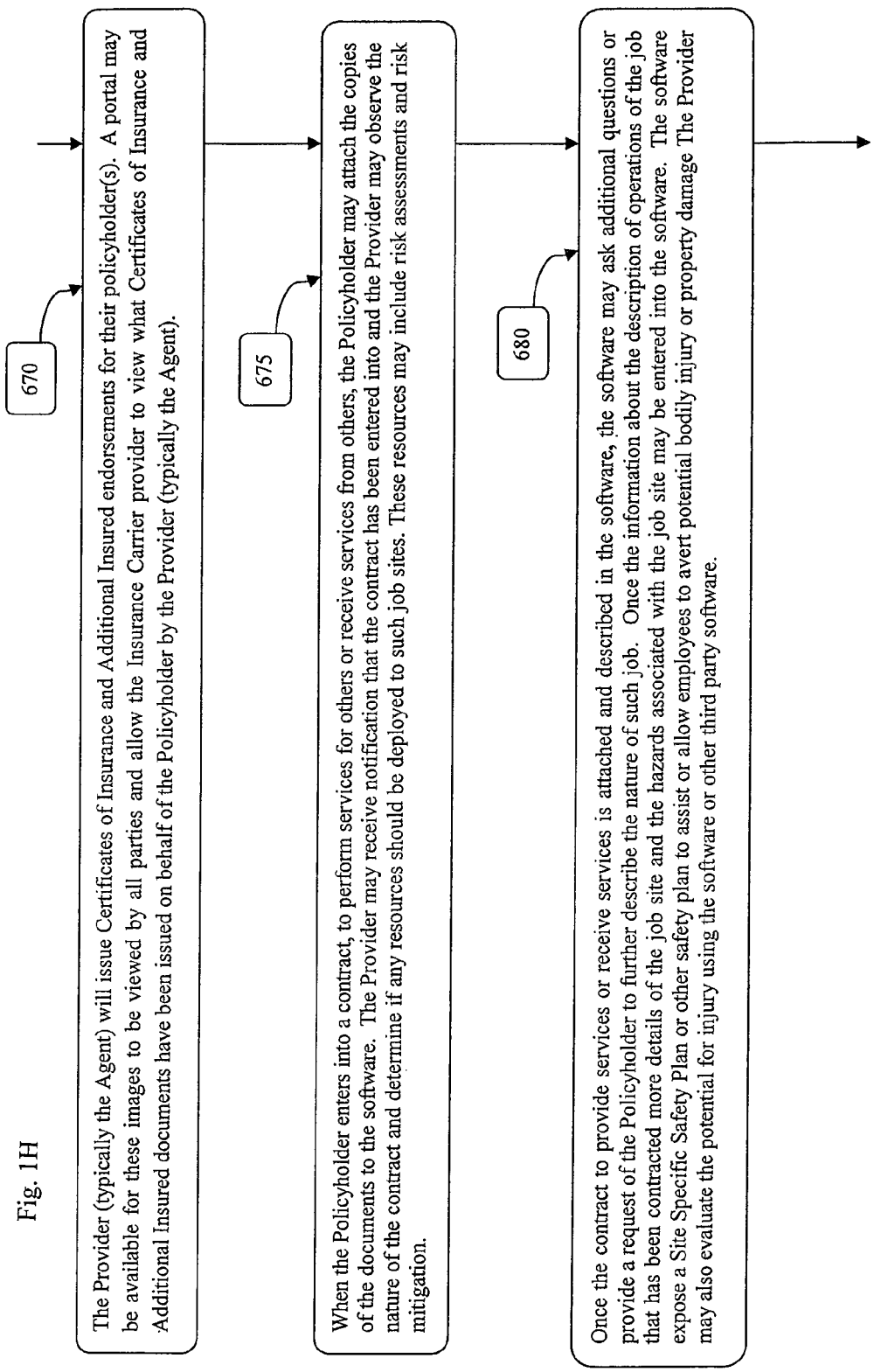
Figure 1J:
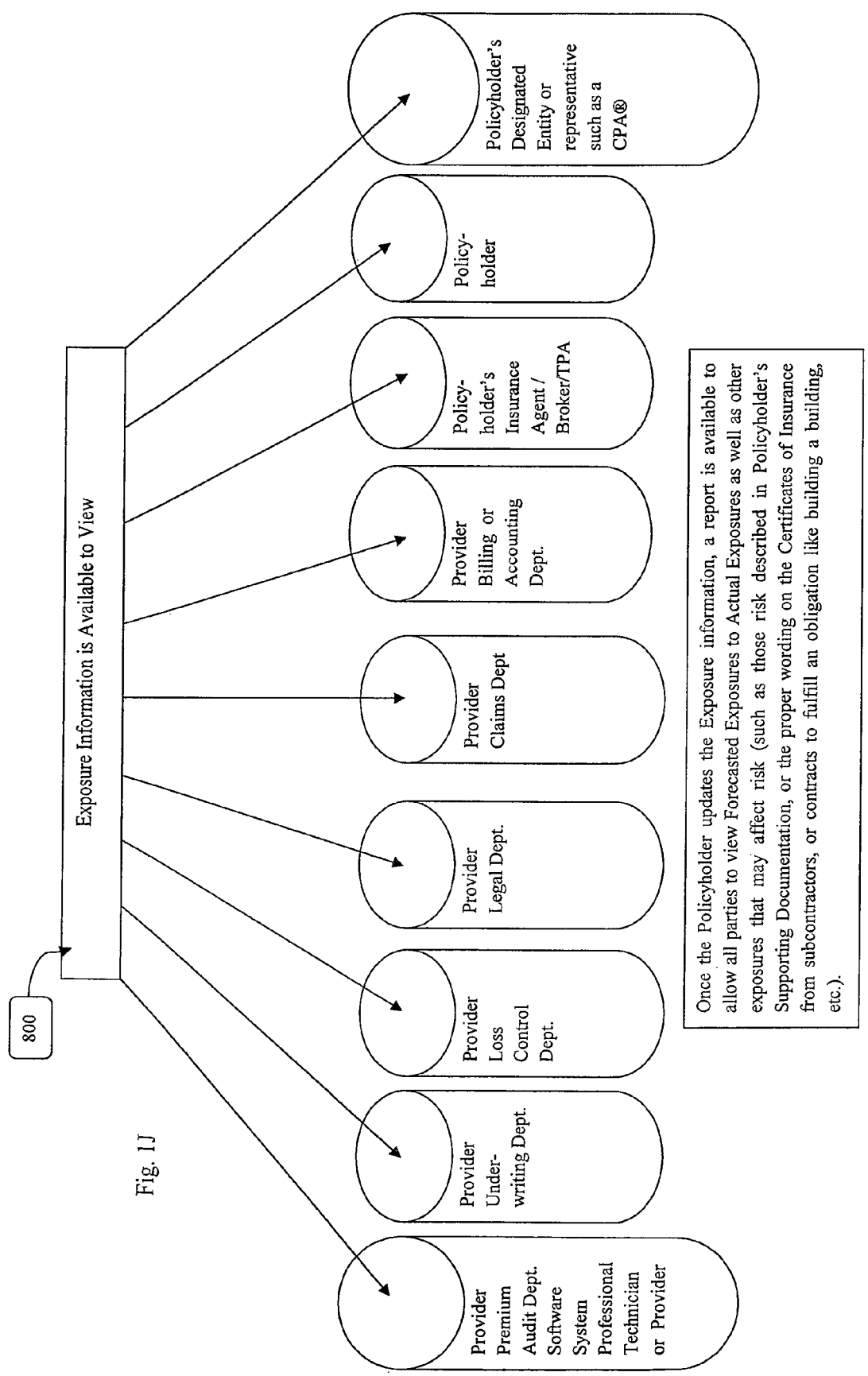

In the commercial insurance industry according to the preferred embodiment of the invention, when a business insurance policy is written and the final premium is ultimately calculated for an Exposure Based Policy, the Policyholder and Provider may maintain a close connection because an Exposure Based Policy is often structured and the premium for this policy is often priced based on Forecast(s) of Exposures. It is understood by all parties that the ultimate premium(s) and the potential for losses are determined based on what the Policyholder does, the type of work and risk associated with that work the Policyholder does (no matter what industry or work performed), the certificates of insurance the Policyholder receive from subcontractors, the methods of transferring risk to lower tier contractor(s), what contracts the Policyholder engages, what contracts that require the Policyholder to assume risk(s) of a higher tier contractor(s) (subcontractor) or owner(s) (customer), the territory in which the work is performed, the payroll developed to perform the work, the type of products manufactured, the type of products sold, the territory of the business, etc., as would be understood by those of ordinary skill in the art. The present invention preferably automates a method for at least some embodiments for each party to the Exposure Based Policy transaction to receive or transmit to each party what impact these risks have on the Policyholder and the Provider and the effect on premium that the Actual Exposures results are in comparison to the Forecasted Exposures.

Once the insurance agent, broker or Provider collects information at step 100 and sells insurance coverage(s) for an Exposure Based Policy(s), the Exposures Based Information and the Policyholder Primary Information have historically been entered into an insurance application before or after the policy was issued to the Policyholder at step 105. The information captured in the application for the Exposure Based portion is typically a Forecast of Exposure(s).

Throughout modern history, information about Exposures Based Policies has been typically stored in the Provider's computer (Policy Administration System) such as at step 105.

This Exposure Based Information and the Policyholder Primary Information can then be manually input into the present invention's software or by the Provider by bridging/exporting the application's Exposure Based Information and Policyholder Primary Information into the present invention's software import capabilities. If the policy information has not been imported into the software from the Provider, the set up questions can be answered (input) manually by the Policyholder or other party as at step 110.

To eliminate redundant activities, subscribing non-insurance carrier Providers (a non-insurance carrier Provider may include agents, third party administrators, brokers and the like) may have ability to setup all of their insurance companies/programs, addresses, email address, phone and fax numbers for the contact at the insurance company/programs, etc. and do not typically have to re-type the same information each time. The use of searchable words and drop down boxes may be supported as at step 115.

Once an account is established in the Present Invention, hereafter known as "the software" the Policyholder preferably receives notification from the Provider requiring them to sign into a secure website to access very basic information and complete a survey that may allow the Policyholder to then go to the next step to secure a connection into the software as at step 120.

The Policyholder may be required to setup their user name and password and security questions. Additionally, Policyholder may proceed through steps to verify and allow "e-signature" (digital signatures) technology to authenticate that any and all statements representing Policyholder are accurate and come from an authorized representative(s) of the Policyholder as at step 125.

Policyholder may agree that the use of this software is intended to help the Policyholder, their representative(s), and Provider(s), including but not limited to the agency, agent, all affiliated with the policy transactions including its subsidiaries, and the Policyholder's insurance company. Policyholder agrees to a Software License Agreement which has been exposed to them immediately after the Policyholder signs into the software as described at 125. If the Policyholder does not agree to the Software License Agreement, Policyholder may not participate or go any further and Provider is notified of their non-participation. Follow up discussions may be scheduled to determine compatibility for those whom did not agree to the Software License Agreement.

If the Policyholder has agreed to the Software License Agreement, Policyholder may view a software tutorial that outlines security risks which are assumed by the Policyholder for improper use of the software and how to properly use the software. Policyholder agrees they have viewed and understand this Electronically Stored Data (ESD) and the Policyholder's assumption of liability and risk for such ESD as at step 130. To further clarify, this procedure is to affirm that these interested parties using the software may realize the result(s) of their entry(s) into the software may have negative consequences if the software is improperly used or the party enter(s) the wrong information either by mistake or willfully enters the wrong information.

If the Policyholder has a question that they would like to pose to the Provider, the Policyholder, or the user on behalf of the Policyholder may decide to use the instant messenger function at anytime to ask a question of the Provider. The question and answers may be logged so that future similar questions can be answered through a self-service-portal and begin populating a series of Frequently Asked Questions (FAQs) and these questions/answers (data base) may become a method to improve the software in future versions as at step 130.

The software functions best when each party maintains an open communication between one another and the software reaches its most potential when the each party in the transaction has properly input information as intended. For the software to function at its optimum capacity the information stored in the software may be followed as outlined in the four sections below:

Policyholder's Primary Information 200
Policyholder's Exposure Based Information 400
Policyholder's Supporting Documentation 600
Exposure Information is Available to View or Transfer 800
Policyholder's Primary Information 200

Policyholder's Primary Information is information 200 that is initially based on Primary Information from a Policyholder to the Provider to begin a policy. This Primary Information is normally determined and gathered from the information gathered from the application that the Provider completes with the Policyholder 100 and 105. This information generally does not change and may include the Named Insured, Address, Federal Identification Number, Owners Name, Contact Name, Phone Number, Fax Number, Cell Phone Number, Email Address, Website Address, NAICS Code(s), SIC Code(s), Industry Type(s), Descriptions of Operations, Territory of Operations, etc. 205.

The Policyholder's Primary Information can be amended by the Policyholder, Provider, Authorized User, and/or designate. After the policy has been issued, Policyholder's Primary Information could change periodically. These changes could be, but not limited to, changes in Operation(s), Location(s), Mailing Address, Phone/Fax/Email Addresses, Ownership, Officer Status, Drivers List, etc. Periodically the Policyholder may be prompted by email or other notification to update, verify, all data and information. Links to self-service portals may be available to update the data and information as described at step 210.

When a Drivers List is included, each person may be noted as either an Employee or a Non-Employee. The software may periodically check the Motor Vehicle Record status of each listed driver from a scheduled event with the date set either the Policyholder or Provider. This list of both Employees and Non-Employees is particularly important for Garage-Division 1 policies where the Insuring Agreement's Liability premium is associated with all drivers (both employed and non-employed by Policyholder), and may in some cases count all employees, whether the occupation does not require the employee to drive or not (a garage vehicle).

The software may also request the occupation or responsibility of each individual on the Drivers List and may be expanded to identify if a vehicle is permanently assigned to a driver, or if the driver is allowed to take a vehicle to their home, etc. When the Provider intends to charge for all Employees (whether listed as a driver or not) and Non-Employee Drivers, further questions may be posed: "Other than the Drivers listed on the schedule, are there any other employees who do not drive vehicles in the business (the business name is exposed), such as clerical staff, or cashiers, etc?" If the answer is "Yes," the software may direct the user to update the list and designate the individuals who are employed, but do not and will not drive (such as clerical staff, receptionist, cashiers, accounting staff, and off site staff that are not located at the dealership, etc.). The list of non-driver employees shall/may be properly noted for the user, Policyholder and Provider to associate the accurate classification for the Garage rating (determining Exposure). Defaults are available within the software to allow the Provider to require all employees to be listed on a schedule, or to only require those employees whom are driving to be listed. Additional questions posed may include: Other than the Employees referenced above, who is also authorized to operate a garage vehicle? (i.e. non-employees such a spouses, children, etc) To reduce misunderstandings, the Provider may define potentially ambiguous language, and to describe why the Provider may charge for non-drivers, etc., the software may also include help buttons for the user to navigate through the software, as described in step 211.

If Policyholder's Primary Information has been changed as described in 210, 211, the Provider may be notified and Provider may initiate change(s) to the policy depending on the substance of the information received as described in step 215.

If information on the Policyholder's Primary Information has changed during or after the policy term, it may affect the Policyholder's Exposure Based Information 400. In instances where the Policyholder's Primary Information affects the Policyholder's Exposure Based Information, such changes in information may trigger a change in premium, or coverage terms, etc. Notifications to all parties may be initiated by Provider when changes occur as described in 220.

Descriptive examples are below as stated in 225:

What is the First Named Insured's Business Name? (If no business name the owner(s) name goes here, if it is a partnership, all partner's names, etc.) For Example: ABC Company, Inc. [for a corporation], ABC Company, LLC [for a Limited Liability Company], John Adams, Joe Blevins & Sam Conner dba ABC Company [for a partnership], John Smith dba ABC Company [for a Sole Proprietor/Individual with a Trade Name] or John Smith [for a Sole Proprietor/Individual with no Trade Name], etc.

What is the First Named Insured's legal entity? The options of the entity(s) types may include: Individual/Sole Proprietor, General Partnership, Limited Partnership, LLC (Limited Liability Company), Family Partnership, PLLC (Professional Limited Liability Company), S Corporation, C Corporation, Non-Profit Corporation, Governmental Entity, Joint Venture, or if none of the above describes the business, the Policyholder (insured) has the ability to describe the organizational structure. Policyholder or user is then given a chance to add information that is pertinent to their business.

For those policies that include more than one Named Insured, input is available to: "Add another Named Insured?" yes or no (drop down box) if "no," the user proceeds. If yes, the user proceeds to the same questions of the First Named Insured and the legal entity. The input(s) can continue until answering "no" to this question ("Add another Named Insured?").

Each Named Insured should be titled in a manner as the "First Named Insured" such as: "Second Named Insured," "Third Named Insured," etc. The use of drop down boxes are available to reduce redundant typing and make the identifiers easy to view and use, i.e. First Named Insured: ABC Co, Inc., Second Named Insured: ABC Co, LLC, and Third Named Insured: XYZ Co, Inc. This example demonstrates how each name may be shown when reporting is produced by the Policyholder to any party of interest.

Policyholder is then asked to describe the Business Operations in detail. If there was more than one Named Insured, there needs to be an option to answer the question for each Named Insured. If there is more than one location, the software may ask about location 2 (and list the name), etc. and loop the question till all locations have been answered. A Sample Description of Operations is available to view so that the user may have a guide to assist.

When the Business Operations are not associated with a clear and distinct insurance classification, the Provider may request additional information about the specific business operations. This may occur with businesses that are emerging industries or "one-off" businesses. For example, a manufacturer that manufactures after-market buckets and attachments used with mobile equipment used in construction equipment (such as scrappers or buckets used with mobile equipment), may review all classifications that may describe the business and council with the Policyholder's rating bureau or audit department of the insurance company to assign the most logical classification.

Name(s) of all Owners, Officers, Partners or Members are requested of each named insured. The title of each person: Owner, Partner, Member, Chief Manager, President, Chairman, Chief Operating Officers, Vice President, Secretary, Treasurer, or Other—a description text field is available. In cases where more than one title applies (such as the case for Secretary/Treasurer); the software may pose the question: "Add another title?". Show their percentage ownership; note: it may equal 100% in cases of Sole Proprietorship/Individuals, Partnerships, LLCs, PLLCs, and Limited Partnerships. For Corporations, those may not necessarily have to equal 100% ownership. For example, these may include "Associations," "Non-Profit Entity," "Publicly Traded", "Silent Investors", or Other—a description text field is available. Also included is a "Not Applicable" input for cases when an Officer of the company is not actually an owner. In cases of a Publicly Traded Company (where there are numerous stockholders, etc.) the software allows for the "Operations Executive Officers" to be shown only, regardless of ownership percentage(s). Additional questions may be added at anytime, such as: "Are these individuals listed "active in the business?". Y/N A complete description(s) of each Owner/Partner/Officer/Member's responsibility and duties may be input. The description(s) may be concise and descriptive such as: "Manages office staff, visits with clients and prepares proposals for the Sales Department". Drop down boxes may be available to reduce the amount of entry. After adding an individual, the software poses a question: "Add another individual?". If "Yes", continue to allow adding until "No." Once the user enters "No," the user may then be asked what the percentage of time is spent with each job description. The Provider may require this percentage to equal 100%. If no owner(s) job description includes outside sales, an additional question may be posed: "Are any of the owner(s) responsible for outside sales? Additionally, if the user is unclear of the answer to this question, the user may also add a field marking this answer to come back to at a later time. When this occurs, the user may be reminded to come back and complete the information.

Once input of the Policyholder's Mailing Address is entered, the user is asked if this "is the same as the physical address?" Yes or No—if "Yes," then the first physical address is automatically completed, but the County or Parish may be also entered/input. If "No," then the Policyholder enters/inputs Physical Address and County. Add Another Physical Address? Y/N (if "Yes," continue to add till answered "No").

Policyholder Contact(s) at Insured's Office: Contact Name, the Contact Name's Title, Phone Number(s) [indicate if land line or cell], Extension Number if applicable to a land line number, and Email Address of each contact. Add Another Contact? (the same question continues until "No")

The user is asked: "Which of the location(s) are the accounting records maintained?" User is then given an opportunity to describe the location of where the records are maintained. The software may also require the Phone Number of Office and the Extension, Fax Number (that may receive transmittals), Email Addresses and Cell Number of the Policyholder's point of contact for accounting records if applicable. Alternative Phone Numbers may also be added. The software then asks the user to describe whose number(s) and extension(s) are applicable. Add another number? Question is continued until answered "No."

The user is then asked for the Company's Website address and enters the information accordingly. Additional question is posed: Add Another Website Address? Y/N If Yes, the software may loop the question until "No." After this information is entered, a question is posed that states "Would you like to visit the website homepage?" If "Yes," information from the website (images) may become part of the information. These images may become attached to the description of operations. If there is no website, user check box "none."

The user is asked: "In the event an insurance company representative needs to visit your office, please give directions to the physical location of the business from the nearest interstate, freeway or major intersection. Describe landmark(s) that the building is adjacent and the describe markings on building if not easy to locate. The software may utilize current technology such as "Google® Maps" to aid in the location as well.

When the Policyholder's business involves the construction industry and Site Specific Safety Plans are needed, the software may pose additional questions of Key Personnel which may include the names and contact information of the individuals such as Project Managers, Project Engineer, Quality Control Manager, Risk Manager, Job Superintendent, or Job Foreman, etc. Each job may have different points of contact and when this is applicable, the user may document to in the software each job location, etc.

When the Policyholder Contact is inserted, the question appears for the user: "How do you want Policyholder Contact to be notified by the Provider to update the policy information?" Options selected from a list of Provider's capabilities, examples are: email, postal mail, text message, phone call, electronically, instant messenger, fax, or other means {describe in text field}, etc.

The Provider may select the intervals for updating each policy depending on predetermined factors of the Provider such as the level of risk, premium size, classifications of risk, and the industry of the Policyholder, etc. The Policyholder may also set manually the intervals for updating the software within Provider predetermined settings. These intervals may be set for options using radio buttons such as: "Annual, Semi-Annual, Quarterly, Monthly, Other Describe." The other option is a calendar is exposed on the software and the Policyholder can select the dates. Reminders may be sent electronically or by other means to prompt the Policyholder or user to update the software.

There may be several types of policies and each type may not be conducive to updates like the other. The Policyholder shall be given a chance to update one policy type monthly for example while another type may not need to be updated but quarterly, etc. When the Policyholder has not completed the tasks as described above within a certain allotment of days, automatic notifications may be used as reminders.

Does the Policyholder use an accounting software package? If so, what program? Hard Hat Accounting Software® [radio button], Peachtree® [radio button], QuickBooks® [radio button], Timberline®, Sage®, Other describe. Does the Policyholder use a "pay-as-you-go" or monthly reporting system processed by the Provider?

The software imports the Exposure Based Information (such as payroll, sales, cost, etc.) from accounting software packages. This occurs by the imported information having the files formatted in such a way for the software to receive and recognize the information. These files may include information such as employee's names, address, place of hire, date of birth, driver's license number, social security number, their payroll for the certain term, specific job duties, cost of certain operations, and other information that the Provider deems valuable, etc. In some scenarios and industries, a different rating basis (other than payroll) may be used, such as Full Time status, Part Time status, and other methods (such as a Garage business). The job duties may be preloaded inside drop down boxes based upon the type of business, the NAICS Code, SIC Code, Industry Type, Descriptions of Operations, and other factors.

When the employee's names are input (either manually or by other means such as an import from other software), additional questions concerning this employee's date of hire are requested, previous work history and the states in which the employee's previous work history may be requested also. This information may include questions regarding the previous employer's name, address, City, State, Zip Code and other information. When an employee has been accepted for a position and the employee's Primary Information has been input into the software, a question may be posed: "What state(s) has the employee previously worked?" "What employer(s) has the employee previously been employed?" Depending on the Provider's needs and the laws governing these questions may only be limited to past number of years (i.e. 5 year, 10 years, etc.). If the employee has had no previous work record, a drop down box is exposed to answer: No Previous Work Record, Self Employed, or Other. In cases when "other" is marked the user has an option to input the information that best describes the circumstance(s) in a text field. When a Workers Compensation policy has been written for the Policyholder, the information obtained from the collection of this information may complete inquiry forms from government authorities such as the State of Tennessee form titled "Request for Work History Information." The lawful use of such forms may allow the Provider to properly adjust a claim and determine previous compensability when an employee has what appears to be a previous injury. This data may be important for Provider in evaluating a previous injury detail to current injury details. Further the Provider may use previous Medical Impairment Rating(s) to determine Provider obligated Impairment Ratings in comparison to previous on-the-job injuries which resulted in medical impairment rating(s). This could assist the Provider with the proper settlement options. This process assures that an employee that has collected on a previous employer's Workers Compensation policy may not file for the same Medical Impairment Rating in which he or she has already collected.

What is the source of the Exposure information? Payroll Ledger [radio button], Checkbook [radio button], Payroll Book [radio button], Accounting Software [radio button], Manual Entry [radio button], Other [radio button], describe.

In instances when the agent/producer is not recognized by either party, a question is asked: Who is the agent that wrote this policy? name, phone number, and email address, etc?

Who is the Account Manager servicing this policy, name, phone number, and email address?

Who is the Policyholder's Accountant, Name, Firm Name, Address, City, ST, Zip, Phone Number, Fax and Email Address? Is the accountant in-house or an outside firm? describe A questions is posed: "Will you authorize your agent and his or her representatives to view the payroll and other audit information data?" If answered "Yes," the software prepares a letter for the Policyholder to sign and scan to the file for future reference by all parties or to sign the screen of a tablet computer or other device with a stylus pen, etc. When scanned or captured electronically, to the software as a record (ESD), the user may describe the scanned document so that any user may call the information in a search field, etc.

A question is posed: Other than travel in charter or commercial aircraft, are there any operations of aircraft; whether owned or non-owned? If "Yes," additional questions may be posed in each of the applicable coverage(s).

What is the NAICS Code for this business (North American Industry Classification System)? What type of industry is the business? options: Accommodation and Food Services, Administrative and Support and Waste Management and Remediation Services, Agriculture, Forestry, Fishing and Hunting, Construction, Arts, Entertainment, and Recreation, Educational Services, Finance, Health Care and Social Assistance, Information, Insurance, Management of Companies and Enterprises, Manufacturing, Mining, Professional and Scientific, and Technical Services, Public Administration, Other Services (except Public Administration), Real Estate and Rental and Leasing, Retail Trade, Transportation and Warehousing, Utilities, & Wholesale Trade.

To more narrowly define operations, the Policyholder may have the opportunity to designate sub-codes that are associated with the general codes as listed above. The NAICS sub-codes may be utilized and referenced. For example, if the business is a Carpentry business, the NAICS sub-codes may further define the carpentry operation.

Because businesses may be involved in more than one classification as described in NAICS, the user has the option to add another NAICS code. Question asked as: "Would you like to add another industry type?" (the question continues until the user answers "No.")

User is asked what is the "Radius of operations?" User is given space to elaborate the radius of operations in a text field.

Do you conduct business operations away from {insert the physical address location(s)}. Y/N. If answered "Yes," the next question is "What other state(s) does the company have operation(s), jobsite(s), or employee(s)? {pull down boxes of the states exposed} Each time the user selects a state away from the premises, the user is asked, "Add another state?" If answer is "No," then the user may continue to next question. Beside each state, the user may describe what operations go on in each state in a text field. If a particular address is known, then each address may be included after each state added, in these cases a description of those addresses that could be captured are those location(s) that an employee often goes and returns often. This optional feature may be disabled if for example the company is a locksmith or other service and has no set location to come and go from, etc.; but when this occurs the user may be given an option to describe why this is the case in a text field.

Policy Effective Date and Expiration Date. When the policy effective date is entered, the Expiration date automatically will go to one year (i.e. 01/01/2xxx-01/01/2xxx) but if that is not the correct Expiration date, a manual correction is allowable. A Policyholder may not have the same effective date for one policy to another. If the policy effective dates are not the same for each, separate workbooks may be available. A warning flag may be posed: "Separate inputs into the software must be maintained since the two coverage effective dates are not the same." The template for these two (or more) policies shall be separated for the final reporting and are separate for each Exposure Based Policy.

Policyholder's Exposure Based Information 400

Policyholder's Exposure Based Information 400, is initially based on Forecasted Exposure and Information from a Policyholder to the Provider to begin a policy. This Forecasted Exposure and information is determined from the results of the application that the Provider completes with the Policyholder 100 and 105. The Provider exposes this estimated Forecast to all parties as the starting point of the policy (Forecasted Exposures). This includes but not limited to the Exposures of payroll by risk Classification, total costs by risk Classification, units by risk Classifications, area of operations, operations by State, etc. at step 405. (See policy examples italicized below). To further define Exposure Based Information each Provider may have the ability to determine what Exposure Based Information is to be used. Each Provider shall determine what Exposure Based Information is based on the Policy type the software is servicing. Specific Policy types are referenced below. These Exposure Based Information components may be changed as the Policyholder's Exposures change and as the Provider determines valuable to properly charge for the risk involved.

It is further defined that a Forecasted Exposure is determined when a Provider writes a policy on an Exposure Based Policy, the Provider asks a series of questions of the Policyholder based on observations, descriptions of all operations, previous experience of Policyholder, future plans made by Policyholder, previous payroll incurred, current and previous employees, sales, contracts entered into by Policyholder, etc. Additionally, information that a Provider collects to start a policy for an Exposure Based Policy may be forecasted as described in 100 and 105.

Once the Policyholder's Forecasted Exposures are input into the software 105 there may be a corresponding premium(s) forecast. Under most circumstances a Provider may invoice/bill a premium(s) based off this Forecasted Exposure; many times referred to as a "deposit premium." Most often, premiums derived from Forecasted Exposures are not the final premium that the Provider may charge the Policyholder. Policyholder's Actual Exposure Based Information identifies exposures as they are entered or updated into the software and then measured against Forecasted Exposures which were used to be the basis of the deposit premium. The combination of all Forecasted and Actual Exposures may become the basis of data which may be known as the Policyholder's Exposure Based Information.

The Policyholder's Exposure Based Information (and the corresponding deposit premium) 400 is used to initially setup the policy is a "Forecast" as at step 100 and 105. The Exposure Based Information may include, but is not limited to, Payroll(s), Cost(s), etc as at step 405. This Forecast may be immediately compared back to Actual or Incurred Exposure(s) once the Actual Exposure(s) have been input into the software such as an expenditure of payroll, or cost of operations such as a payment made to a subcontractor, increased inventories, the number of employees, the type operations, etc. as at step 410. At step 410, the software may allow the Provider to properly apply or assign the Policyholders primary and secondary Classifications/codes (if applicable). At the option of the Provider, the software may determine the primary Classification based on which operations generate the most Exposure. Exposure may include the Policyholders sales, receipts, or payroll and other items that are deemed as "Exposure" to the Provider. The Provider may override this determination based on negotiations, and/or special filings with the jurisdictional authority such as the Department of Insurance, etc. If there is more than one Classification that properly describes the operations of the Policyholder's business, the Provider may assign these Classifications and apply the proper Exposure to the policy; which may include multiple Classifications in determining the final Exposure.

The Exposure(s) and Information is updated by the Policyholder or their representative(s) by an import function into the software from the Policyholder's accounting software or manually entered through questions and/or prompts in the software. A comparison of the Actual Incurred Exposure to the Forecasted Exposure is then available to be viewed for the specific period (Actual vs. Forecast) within the policy period 405. The report may reveal how the policy premium has been allocated to the Forecasted Exposure(s); specifically if the premium used for the deposit is adequate or excessive. Each coverage type and its process(es) are described in more detail beginning at step 420 and 425. For example, the Forecasted Exposure(s) on a Workers Compensation Policy 430 would be determined to set up the policy and complete an application of insurance (100) based off each employee's job duties, payroll amounts, or by the type of job performed, etc. Then, once an Actual Exposure (payroll) has been incurred, the information may be updated in the software 410 and compared to the Forecasted Exposures to give a real time allocation of premiums.

Each Policy type may be unique. The Exposure rating basis may be different from one policy type (such as Workers Compensation being different than an Automobile policy) to another and each policy requires its own process(es) for determining premium as outlined in the Specific Policy Types 420 italicized below. One policy type may require input of payroll, while another Policy type may require input of a different nature (such as sales as determining basis for rating exposure on a General Liability Policy while Payroll may be used as the basis of rating on a Workers Compensation Policy) 415.

Manual Entry of Information Clarified

For point of clarification, the Provider may have Classification(s) and other information defaulted into software from information obtained/gathered from the number series 100 and 200 above. Some cases may require the user, Provider, or Policyholder to input information about the Exposures or the basis of the policy. When the information has not been input from Provider, Policyholder or imported into software from Provider's Policy Administration System, a manual entry of the information may be required. The software is programmed to be flexible for all parties (whether the information has been pre-populated or not). This flexibility may require more action on behalf of the user, or by the Provider. When the specific policy type(s) below indicate that the user(s) manually input information, or imported information (from user's third party software including accounting packages, spreadsheets, etc.) it may be because the Provider has not imported the information into the software. Some examples below assume that the Provider has not imported into the software the information as captured in step 100, 105, & 110, therefore, a description of the manual process of entering the information is included in the coverage forms below.

The software periodically poses questions that may require a "Yes" or a "No" answer. When the answer is "Yes" or "No," it does not mean that the answer shall always be the same. Depending on the Provider's need and the importance of the questions posed, the Provider may re-pose the same question and the software is flexible for the Provider to automatically schedule the question again in the future. This may be monthly, quarterly, annually, or a specific date, etc.

Below are the Specific Policy Types that are Typically Exposure Based Policies 420

A Typical Exchange of Data and Exposures/Information between Policyholder and Provider are listed under each specific insurance coverage type as at step 425.

Workers Compensation 430

The Forecasted Premium is determined based on the amount of Forecasted/Estimated payroll by labor Classification and other rating variables as stated in the italicized below. The final premium is based on the actual payroll and other rating factors as stated in the process and examples of questions below 435: Provider may have basis of Exposure defaulted into the software from information obtained from information gathered from the 100 and 200 series above.

Workers Compensation Setup of the Available Classifications

What rating bureau Workers Compensation Class Codes or Names are allowed for this policy? The Class Code Number may be pre-filled (as per an import from the Policy Administration System) by Provider or may be searched by the Classification Name; additionally, as an option, a Class Code or name may be added manually when permissible by the Provider. This could also be a drop down box that includes the Class Code and the Classification Description for the Workers Compensation policy. These Class Codes are typically 4 digits (but may be expanded) and the Class Code description may be infinite in both name and definition. Once the Class Code(s) is/are selected, a state may also be added in which the location that the Policyholder performs the work or is domiciled. There may be the same Class Code listed a multiple of times in multiple states.

Does the business qualify for a Division of Labor between Classifications for employees on Workers Compensation? Y/N If the answer is "No," there is no need to have multiple codes for each worker, employee or Owner(s)/executive officer inside the specific policies; do not allow more than one Classification on each coverage line per employee. If "Yes," then the Class Codes shall grant permission to add more than one Class Code for the employee/workers. A notification to the Policyholder may be sent by Provider clarifying what is acceptable and what records and the method in which these records are maintained. The notification may be electronic or by other means. Software may import information from accounting software, Provider Exposure reporting software (such as Pay-As-You-Go reporting) or other time-tracking software on a per employee, per job, and per Classification basis.

Multiple state rating may be needed. A question appears: Are there plans to work outside of your Home State? If "Yes," a question appears: Please check the states in which you currently have job sites or work that may require your employees to leave the home state? (each state shall appear in a drop down screen for ease of use). After each state has been checked, the Policyholder may describe by each state what work they are doing, or plan to do and may add an address or site location if known.

A warning may appear when multiple states have been chosen: "There are some State Laws that require all payroll associated with labor performed in that state be assigned to that state's Workers Compensation Classification(s) and rate(s)." For example, if the State of Florida was chosen as a state in which work was anticipated or work was being performed, the warning may appear that "Any work in Florida must be covered by an insurance company authorized to transact business in Florida and the policyholder must pay the appropriate premium for the Classification in Florida. Out-of-state businesses operating in Florida must pay Florida-approved Workers Compensation rates for any work performed in Florida." A notification to "Ask your agent for further explanation" may appear. If the software was provided to the Policyholder by the Provider, the Provider may choose to handle a different way, especially in instances when the Provider may not extend coverage in the state(s) in which the Policyholder is working or plans to work.

If there were no other states checked, the software skips the questions about multi-state work, but each time the policy is renewed—or—reviewed, the question may appear again because the circumstances may have changed. The Provider may establish the schedule to pose the question again, depending on the nature of the business, etc.

When Policyholder's specific circumstances reveal that work is being performed in multiple states, the Policyholder may have a choice where to allocate these wages. To limit confusion, a decision tree may be exposed to the Policyholder (user) when the Policyholder indicates multiple states are in use. To determine the proper application of rating and Classification(s) for those state(s) that should be used, the Provider exposes how these multiple state exposures are to be handled, for example:

1.) If the employee leaves the primary (home) state where the business is located to perform work in an adjoining state but returns to the primary state each day, the rating should be assigned to their primary state for the purposes of the premium calculation. A typical example may be an employee that performs service work (such as a locksmith) or repair work.

2.) In cases where a Policyholder's manager or executive supervisor whose job is to visit job sites, but are not directly in charge of managing a job, should be assigned to the primary (home) state for the purposes of premium calculation.

3.) If the Policyholder employs staff to perform work outside the Policyholder's primary state, the Provider may assign the payroll to the state in which the Policyholder's premium would be highest (between the home state vs. the state in which the work was performed)

4.) When a Policyholder's employee(s) is hired to perform work only in a certain state (outside the primary state) the wages for that employee should only be reported under that specific state.

Other stipulations may occur depending on circumstances of a state or carrier rule(s) and the software is flexible for the Provider to make changes or add additional rules for their circumstances, filing or practice, etc. These rules may be particularly important where certain states maintain that the premiums must be reported in states in which the work was performed. A copy of the state rules mandating a certain premiums be reported in the state in which the work was performed, such as the State of Florida may be exposed.

When the NAICS Class Code(s) is input into the software as at step 205, there may be a list of "Suggested Possible Class Codes" for Workers Compensation. For example: A (fictitious) Classification Classifications in NAICS is: 999999— Widget Products Manufacturing, or it is the equivalent SIC Code of 9999. A corresponding Workers Compensation Classification is exposed, and states that the "Suggested Workers Compensation Classification number and description" is: 1234 Widget Products Manufacturing. In other words, when the NAICS Class Code(s) is input into the software, "suggested Class Code(s)" that are associated with this type of business are shown.

Workers Compensation Setup of Estimated Exposures

When a Workers Compensation policy is written, it is typically written with a "Deposit Premium" based on Estimated Payroll(s) by job Classification(s) for each state, by location(s) which results into an Estimated Premium 100.

Workers Compensation Setup Questions of Owner(s)/Principals/Executive Officer(s)/Member(s)

A question is posed: "Are any Owner(s)/Principals/Executive Officer(s)/Member(s) to be excluded on the Workers Compensation?" If the answer is "Yes," the software may ask for the person(s) to be identified and then no further questions about the Owner(s) on Classifications need to be asked because there may be no premium charges for this person(s). If the answer is "No," then beside each individual, the question is posed beside each Owner(s)/Principals/Executive Officer(s)/Member(s) to be included on the Workers Compensation: "What Workers Compensation Classification should be applied to this person?"

When the Owner(s)/officer/member is included for Workers Compensation coverage, a question is asked; "Have the proper forms been completed to include this individual?" The response options should be "Y/N" or if the answer is "Not Applicable", the user may describe why (a typical answer may be that there is no mandated form for this state . . . ) If the answer is "Yes" (in response to: Have the forms been completed?) a question is asked "Have the proper forms been filed with the insurance company and the proper authority?" If the answer is "No," a Red Flag Warning may be exposed alerting all parties that until the documents have been processed to allow "Yes" answer. Ultimately when the final report is ready for viewing, the Provider may view that the forms were properly filed. If the individual Owner(s)/officer/Member(s) are to be covered for Workers Compensation coverage, there should be a Payroll inserted.

If the person named as the Owner/Partner(s)/Member(s)/Executive Officer(s) is to be excluded, a statement appears: "Excluded from Workers Compensation Benefits" next to the individual's name. When the Owner/Partner(s)/Officer(s)/Member(s) is Excluded from Workers Compensation coverage, a question is asked; "Have the proper forms been completed to Exclude this individual?" The response options may be "Y/N" or if the answer is "Not Applicable", the user may describe why (a typical answer may be that there is no mandated form for this state, because they are automatically excluded/exempt from Workers Compensation . . . ). If the answer is "Yes" a question is asked "Have the proper forms been filed with the insurance company and the proper authority (such as the State Workers Compensation Board, etc.)?" If the answer is "No," then a Red Flag Warning may be exposed to all parties warning that until the documents have been processed to allow a "Yes" answer to be input.

In case(s) where "exceptions" to these exemptions are applicable (because of state laws, jurisdictional obligations, Provider requirements, or contractual requirements, etc.), the software may ask additional questions to provide information regarding such potential additional information needed for these "exceptions." An example includes a Tennessee law applicable to businesses involved in the "construction related industry." Such question(s) may include: Is exempted Owner/Partner/Member(s)/Executive Officer(s) doing any commercial work? (pop-up screen showing definition of commercial work may be available) If answer is "Yes", the software may ask for specific payroll, gross sales, an actual expense incurred or receipt of incurred income, or other exposure and any combination thereof related to actual, estimated or forecasted expense of payroll with commercial work. These type questions will be incidental and applicable to states with such exceptions within exempted Owner(s)/Partner(s)/Member(s)/Executive Officer(s). To support the sales, payrolls, or other information associated with such work, copies of contracts, draw requests, invoices, or other notifications that involve this specific job may be attached and properly referenced for this anomalous situation.

Ultimately when the final report is ready for viewing, the Provider may view that the forms were properly filed to exclude the Owner(s), etc. When the person is excluded from coverage, next to their name and title, the payroll for the calculation of the Workers Compensation is "$0." Not until question(s) have been answered as "Yes," (that these individuals have the proper exclusions on file) can the payroll be equal to "$0.00." (unless due to state statute that this person is automatically exempt)

Additional questions may be posed about the use of aircraft if answered yes in 200 series.

Workers Compensation Minimum and Maximum Payroll(s) for Owner(s)/Principals/Executive Officer(s)/Member(s)

When an Owner/Principal/Executive Officer/Member is not covered for Workers Compensation Insurance, there is no premium or reason to track the payroll for these individuals. Or stated another way, if one or more of these individuals are exempt from Workers Compensation (i.e. this person is not covered for Workers Compensation benefits) then their wages shall be established as $0 (because most often there is no payroll exposure or premium charged for an exempt owner, officer, member, etc.).

When an Owner/Principal/Executive Officer/Member is covered for Workers Compensation Insurance, often times there is a range of Payroll or a fixed amount of Payroll assigned for each covered Owner/Principal/Executive Officer/Member by NCCI rules, state rules, other rating bureau rating rules or guidelines. This depends on the specific state parameters and/or filings from the Provider. The Provider may set a Payroll limitation as a range $0 to $ infinity, or a constant wage/salary limitation. If the actual wages inserted are less that the constant wage limit, the constant wage succeeds, etc. Or stated another way, if the payroll limitation in a state was $50,000 for an Owner(s) and they made $40,000, the payroll used to calculate the premium is $50,000, but if the person made $70,000, the payroll may be recalculated at $50,000.

This preset on the Minimums and Maximums may be available for the Owner(s) and may be changed by the Provider periodically depending on the changes in that particular state. In states where bonuses are exempted from the payroll for Owner(s), Partners, Members and Executive Officers, a portal is available for the Provider to change and update as needed. A function allowing each party to understand the method to determine what is included or exempt from the calculation of Payroll may be available.

The software may contain bridge (copy/import) capabilities wherein the Payroll Exposure and/or other Exposure information from the General Liability portion (if any) may populate the needed payroll into the Workers Compensation module which may have previously been populated/input in the General Liability module (if payroll information is available). Note: these questions are often the same questions for the General Liability Classification(s) for this Owner(s)/Principals/Executive Officer(s)/Member(s), etc. when the policy is rating the exposure(s) for the owner that is based on Payroll. There are only isolated instances that a Workers Compensation policy is not rated based on Payroll however; and in such cases the software may recognize these anomalies. Additionally, the software may recognize minimum(s) and maximum(s) for these Owner(s)/Principals/Executive Officer(s)/Member(s)

Workers Compensation Setup Questions about Workers/Employees (Non-Owner(s) or Non-Officer(s))

Each Employee/Worker is listed and the software identifies potential classifications for each employee. The user then selects the proper classification and bases the reasoning based upon the job duties and responsibilities as at step 225. If the answer was "Yes" to the "Does the policy allow for a Division of Labor?", then the next question comes up "Does this person qualify for the Division of Labor?" If "No," the highest rate class shall be used for each worker and there shall not be more than one Classification per employee. If "Yes," then the person may have multiple Classifications, the software allows Provider to stipulate which Classification could be applicable to the policy and drop down boxes with these choices are available. In addition, a text field is available to describe what each employee's job functions include and why this person may qualify for the Division of Labor break out (more than one Classification for each of those employees, etc.). Does the person keep track and report to the employer what hours they spent inside each of these job Classifications? If "No," the answer to the question "Yes," is automatically converted back to "No," until the answer is "Yes." When this occurs, a Red Flag is exposed that clarifies why the individual may not qualify for multiple codes (Division of Labor). A Red Flag is exposed to the user warning that stringent requirements of record keeping are needed when the person answers "Yes," that this person qualifies for a Division of Labor. At the option of the Provider, the requirements may be also be answered as "Not Applicable."

A function may be available to the user to see sample reports that employees may use to report to Policyholder their hours worked. A sample may also be printed, with specific instructions on how to handle the Division of Labor properly.

If the Division of Labor was answered "Yes," enter the first Class Code for this individual; then 2nd, 3rd, etc. The user is then given an opportunity to add more by selecting "add another Classification?" Y/N If there is no Division of Labor entered, then only one Classification for this employee/worker is available and the user may update that information according to the proper Classification, responsibilities, etc.

Each employee that is added after the policy period (hired during the policy period), a date of hire may be added as at step 225.

The Policyholder may have access to a description of what payroll is excluded from Workers Compensation Payroll Calculations: In many States the following items may be excluded from payroll for the calculation of Workers Compensation: Airplane Flights, Club Memberships, Company Owned Auto, Dismissal Pay, Employee Discounts on Goods Bought from Employer, Discounts on Property or Services, Expense Reimbursements, Group Health Insurance Premiums paid by the Employer, Incentive Vacations, that portion of Overtime pay in excess of Straight Time Wages (Only the hourly rate of pay for Overtime is used for Workers Compensation premium calculation, not the half time of time and a half wages), Pay made to those on Active Military Duty, Payments made to Third Party Trusts such as Davis Bacon, Money for Meals for Overtime, Retirement Plan Contributions made by the Employer, Rewards for Invention or Discovery, Severance Pay, Tickets for Events, Tips or other Gratuities made to the employee (this applies primarily to restaurant or beauty salon businesses), and Work Uniform Allowances. In cases where a Bonus(es) may be exempt, the state rules governing Bonuses may be exposed. These states may include LA, NM, OR, TN, TX and other states as the rules change or are modified. The Provider may expose information as a tool to assist an understanding for any Policyholder where appropriate and needed.

Workers Compensation Questions about Payroll for Workers/Employees (Non-Owner(s) and Non-Officer(s))

The first employee's name appears and a question is posed: "How often is this employee/worker paid?" Options: Quarterly, Monthly, Semi-Monthly, Bi-Weekly, Weekly, Irregular/Sporadic (Off and On), & Other (when other is selected the individual may describe the specifics in a text field). The next question is: Does this apply to all employees? Y/N If "Yes," the program automatically pre-fills this answer for all Non-Owner employees. If "No," then the question is asked:

"Check those that this pay frequency applies," and continues to loop to the next employee and until all are answered.

The software may contain bridge (copy/import) capabilities wherein the Payroll Exposure information from the General Liability portion (if any) may populate the needed payroll into the Workers Compensation module which may have previously been populated/input in the General Liability module (if payroll information is available). Note: these questions are often the same questions for the General Liability Classification(s) for this employee when the policy is rating the exposure(s) for the employee that is based on Payroll. There are only isolated instances that a Workers Compensation policy is not rated based on Payroll however; and in such cases the software may recognize these anomalies.

Workers Compensation Questions about Subcontractors/Independent Contractors

A Policyholder using a subcontracting company for specific jobs or to supplement the labor force of the Policyholder may be insured for their own Workers Compensation policy. In cases where the subcontractor has their own coverage, verification of such shall be in the form of a Certificate of Insurance. A process of verifying the Workers Compensation is described at step 605, 610, 615.

When a subcontractor is used and there is no Workers Compensation coverage in effect under the name of the subcontractor or a Certificate of Insurance on file verifying coverage, there may be a premium charge for the Policyholder. In cases where a subcontractor is not covered for Workers Compensation coverage, a help button or a warning may be exposed to the user that clarifies what specifically occurs when using an uninsured subcontractor(s); this may be based upon state specific rules that have been predetermined from state statute or rules, while others may be based on Provider specific rules. Each Provider may handle this circumstance differently. The cost of operations may change when using a subcontractor without Workers Compensation also. A premium worksheet or sample premium may be exposed for the Policyholder to understand the cost of insurance for using the uninsured subcontractor. Provider may endorse (add) the exposure of the uninsured subcontractor(s) during the policy term and not wait till the year end reconciliation.

In some cases, where the Policyholder uses a subcontractor(s) without Workers Compensation the Policyholder and the Provider may not know how the subcontractors exposures may be handled. In these scenarios, a question and answer series may be exposed that may allow all parties to understand the needed action to take in the future and how the premium may be affected while using an uninsured subcontractor. There may be different definitions of who is a subcontractor in each state. Some states may handle the exposures of an uninsured subcontractor opposite from another state. There may be instances where a Policyholder must discern the difference between who is a subcontractor" or an "employee." In cases where the statute requires a premium charge of a Policyholder when using an uninsured subcontractor, the state or Provider rules may be exposed. Some states may disallow the owner of an uninsured subcontracting company from coverage under a policyholder's Workers Compensation insurance coverage. In these cases the insurance company may not charge a premium for that portion of the cost of using an uninsured subcontractor. The software is flexible to include just that portion of the cost of the employees or workers wages/payroll that are subject to Workers Compensation coverage under the Policyholders policy.

Because Workers Compensation coverage is often mandated (from the government) insurance coverage, the government or other mandating entity may be notified by the Provider that coverage is maintained by the Policyholder and may also be notified by the Provider when the coverage has been terminated, cancelled, non-renewed, etc. The software may periodically, evaluate and verify from the state or governmental authority (where available), or the Provider that insures the subcontractor that coverage is maintained or continuous by the subcontractor. This software technology is often referred to as a "crawler," a "web robot," a "bot," an "automatic indexer," an "ant," or a "spider," and other names that describe a software program accessing another software program to verify or access information. For example, in Tennessee, each Provider selling Workers Compensation coverage, must notify the State of Tennessee through NCCI (the Employers' Workers' Compensation Insurance Coverage Verification program) that a Policyholder is compliant with the mandate by securing Workers Compensation coverage. This also may be verified through other software that is used to monitor active and non-active status of a lower tier's Workers Compensation. The software is designed to be flexible to integrate this valuable information.

Information to assist the Policyholder may be exposed about who is a subcontractor such as the United States Internal Revenue Service definition of what constitutes a subcontractor.

Jurisdictional Considerations

The Software recognizes that state law, federal law, or laws specific to any such territory may determine specific coverages for mandated coverage as well as exceptions to certain coverages. The software allows those differences and recognizes such as "Jurisdictional Considerations". The point is made to recognize these differences and allow Providers the flexibility to allow these considerations within the software. Within some jurisdictions\* the Provider may need to have sources of income defined. The software recognizes this and allows for the Policyholder to either import from accounting software or other record keeping program or manually input such information. Certain States may require this verification of income source to properly determine the risk. An example is in the jurisdiction of the state of Tennessee where "Construction Related Classifications" are being used; the Policyholder may have exercised their option to be exempt from the Workers Compensation coverage. Although "exempt" from coverage, the current law provides that coverage may be applicable on certain commercial projects for the exempted owner. The software recognizes the need to have a breakdown between commercial and residential projects to determine coverage as well as premium as shown. Questions such as "does this project qualify as a "commercial project?" (definition of commercial project projected through a pop-up or similar notification) Depending upon the answer, follow up questions may be asked to determine the breakdown between payroll Classifications to help identify the final risk determination. The source of income example is only presented as such and does not limit the software to specific details of any specific coverage and may consider any mandate or exception to such coverage in any part of the country which considerations apply.

\* A "Jurisdiction" could be as specific as a local municipality or as broad as a National government.

When a specific location is documented, the Software System may access where the nearest hospital is located and forward this information to the Policyholder allowing the Policyholder's management to communicate the location and information other pertinent information such as driving directions, etc. Some Providers may require injured workers to go to obtain non-emergency medical care from a medical facility that has an arrangement with the Provider that reduces the expense of non-emergency care. This structure is often referred to as "Cost Containment," "Medical Provider Networks," or "Managed Care" options. The software may recognize these medical providers and communicate these providers for the specific area that the Policyholder is working. The software may also allow other pertinent information that the Provider staff may want to communicate about the region's medical treatment options. This option may particularly be helpful for construction contractors that are working in new areas or away from their home state. When the locations of each job site are exposed to the Provider, it may allow the proper staff at the Provider's office to study the best treatment options for an injured worker, should an injury occur.

The Software may address Jurisdictional Considerations from various sources; including but not limited to State Departments of Insurance, Federal Law, Protected ethnic groups, etc.

Other Considerations

When a Policyholder is working under a construction contract with an owner, construction manager or general contractor that maintains a Wrap Up, Owners Controlled Insurance Program (OCIP), or Contractor Consolidated Insurance Program (CCIP), etc., the Exposure for the Policyholder should not be charged for the insurance premiums for all employees and workers of the Policyholder as the premiums shall be charged to the entity that maintains the insurance Wrap Up policy or the OCIP. When the Policyholder notifies the Provider of such contracts as stated in 600, Policyholder's Supporting Documentation, the Provider may notify the Policyholder to clearly maintain documentation of all Exposures (employees payrolls by classification and other Exposures that are used to calculate the premiums for the Workers Compensation) that are paid to the employees or workers. The employee's payroll serving the Wrap Up or OCIP contracted jobs shall be ultimately discounted from the Final premium calculations.

The software may import loss history and previous policy periods payrolls by classifications. This information may calculate the "Experience Modification" and other reports needed or be exported to third party software to complete the calculations. The software may import the calculations into the software.

The software may import Job Descriptions and Jobs Analysis for each employee from a portal available in the software, from third party software, or by other means. The function may serve at least two purposes. One is this forum may allow the Provider to better understand the risks, exposures and the proper classification. And two, the Policyholder may make available these descriptions so that each employee's job duties and job functions may become available when needed for a treating physician or medical provider needs access to these functions to properly communicate an injured workers ability to continue with the same duties and functions should an injury occur.

Once a modified duty, or light duty job has been identified, the Policyholder may print off a "Transitional Return to Work" document that may explain the process that the employee is going through during their healing. This form may request the employee's signature as well as other parties who may work with the employee so that all parties acknowledge what is to occur.

The software may prepare a flowchart for the employer to follow to properly handle a Workers Compensation claim. For example each state has a specific process that may allow an injured employee to select from a panel of physicians or medical providers, especially when the injury is not life threatening. Should forms need to be completed for that specific state, the software may automatically pre-fill the proper Provider, Policyholder or medical provider forms to take with the injured worker to describe the job description or other forms needed to properly handle the claim. These forms may allow the Policyholder the ability to properly communicate that they will accommodate the employee for some sort of "light duty" while the employee is healing. The form shall state every job description and job function that the Policyholder may make available during the duration of the injured employees healing. Additionally, the treating physician may utilize the forms to properly communicate to the Policyholder and Provider what the injured worker may and may not do as a job function as well as what "light duty" jobs may be utilized in getting the injured worker back to work through transitional jobs, modifying the original job functions, schedule, creating other jobs that fit the light duty functions, etc.

To reduce redundant activity, Workers Compensation claim form(s) may become available when the Policyholder needs to complete forms. The Policyholder may populate information that has been pre-filled such as policy number, name of employee and other fixed information that does not typically change.

A portal may become available for the Policyholder to complete the job description. The information may include "duties," "purpose of the stated job," "responsibilities," "physical demands," "work environment," and any other information necessary. Additionally, a portal may become available for the Policyholder to post to a Intranet, Website link or other means to allow the treating physician or medical provider access to pictures, video or other images necessary to understand the injured workers necessary functions, etc.

A portal may be available post accident where the Policyholder posts notes of the progress of injured workers that have modified duties or "light duty" job functions. These notes may allow better communication between the Policyholder and Provider and allows the Provider to address specific problems early and adjust modified duty or light duty quickly, etc. Should the Policyholder fail to maintain the notes and answering questions, the Provider or other party may notify the Policyholder to update the notes and other fields, from their observations of monitoring the injured workers progress, etc.

A portal, video or other method may become available to each party explaining exactly what to expect post accident. For example to reduce anxiety of an injured worker, the Provider may allow the injured worker access to a video that clearly describes what to expect from the insurance company and the employer during the process of recovery.

A "Time Line" may be exposed to the Policyholder and/or the Provider as to what they must do in the event of an injury. Notifications to each party may be sent to any of the parties as to what obligations that they may have post accident.

Before an injury occurs, portals may be available to notify each party of their responsibility both Pre-Accident and Post-Accident. For example, the Policyholder may need assistance with posting a "Panel of Physicians." The Provider may request a copy of these documents so that the Provider understands that that these documents have been legally posted, etc. The Provider may make available through this portal, instructions as to what to do in each instance.

The Provider may make available physician panels of treating physicians or other medical provider such as hospitals, etc. in the area of each job site, or location. These panels may be in optional formats such as "traditional panels," "conformed panels," "managed care panels," and "multi lingual panels," etc.

Specific Workers Compensation Rules and Laws may be available to the Policyholder on a pre-accident basis and a post-accident basis.

Drug Free Workplace Program information may be available to the Policyholder from the Provider or other party. This information may include applications that have been properly populated with the specific Policyholder information, as well as area vendors, that may perform and administer the drug testing, etc.

The Provider or other party may notify the Policyholder of ways to mitigate potential risk to the Policyholder when seasonal workloads must increase due to volume, or other reasons. These techniques may include the use of "temporary staffing agencies," or "temporary to hire," programs.

Workers Compensation Policy—Reconciling Exposure Process

The Deposit Premium ultimately may be scrutinized, reconciled, and compared with the Actual (final) Premium. The software may allow the Policyholder, their Designated Entities or representatives, and the Provider to understand how the Forecasted Payrolls (Exposures) and premiums are compared relative to the Actual Incurred Payrolls and Premiums for a specified time period of the policy (either during or after). When the reporting of the Exposures are input into the software by either the Provider, Policyholder or either parties representative(s), the software may report the differences (if any) to all parties. Each time that a policy has updates made, the estimated exposures may be affected. During and after the policy term, the Policyholder may update the Exposure information as needed. Once the Exposure information has been updated, the findings from the reconciled Exposure(s) may be shared with both the Provider and Policyholder.

Commercial General Liability 440

The premium for a Commercial General Liability Policy is determined based on the amount of Exposure (such as payroll by labor Classification and other rating variables) as stated in the italicized example below 445:

General Liability Setup of the Available Classification(s)

A question is posed: What is the General Liability Class Code(s) for this policy? The Class Code Number(s) or the Classification Name may be searched by use of drop down boxes; additionally, as an option, a Class Code may be added manually if drop down box options that are pre-programmed into the software are not available. A drop down box option includes the Class Code and the Classification Description(s) for the General Liability policy. The General Liability Class Code(s) typically is five digits and the Classification Description Name and definition (or further explanations) could be an (infinite) character description. The software is flexible to accommodate additional digits is needed, as some carriers may have proprietary codes that are more digits, etc. Each Class Code has a specific basis of Exposure, which ultimately may be used in determining premium. Provider may have basis of Exposure defaulted into the software from information obtained from information gathered from the 100 and 200 series above. These Exposures may range from Payroll to Square Footage. A question is posed, about each of the General Liability Classification(s) that describe the Policyholder's business: What is the Classification's Exposure rating based upon? (a radio button/drop down box is exposed for easy use): Acres, Admissions, Area, Cords, Total Cost, Days, Each, Gallons, Locations, Members, Miles, Payroll, Pupils, Sales, Tonnage, Units, or OTHER: Describe (text field exposed). After input of the first Classification and Exposure information into the software a question is posed: "Do you want to add another Class Code?" (the question is looped until answered "No.") Each Class Codes may have a state or specific location to designate; each Class Code may be listed multiple times depending on the states of operation or location.

When the General Liability Classification is based on "Admissions," a statement is exposed that may state that: "All Admissions should be included except employees of the Policyholder."

When the General Liability Classification is based on "Area", a statement is exposed that may state that all "Area" is included except openings in courts or mezzanines or portions of floors/basements where 50% or more of the area is for storage or shop area for the building maintenance, a dwelling for building maintenance employees air conditioning/heat or power equipment.

When the General Liability Classification is based on "Cost", a statement comes up that states includes Costs associated with the amount paid to cover the Cost expressed in the Classification.

When the General Liability Classification is based on a rating of "Each", it includes the total number of units as indicated in the Classification.

When the General Liability Classification is based on a "Payroll", the user may receive a warning that states "ALL remuneration paid to an individual is included as Payroll unless excluded as payroll." The payroll that is often excluded from General Liability Payroll calculations is that payroll that is supported by other rating Classification and or that payroll for the clerical employees. Many states the following items are excluded from payroll calculations for Workers Compensation: Airplane Flights, Clerical Employee's wages (those employees whom work within the confines of an office), Club Memberships, Company Owned Auto, Dismissal Pay, Employee Discounts on Goods Bought from Employer, Discounts on Property or Services, Expense Reimbursements, Group Health Insurance Premiums paid by the Employer, Incentive Vacations, That portion of Overtime pay in excess of Straight Time Wages (Only the hourly rate of pay for Overtime is used for Workers Compensation premium calculation; Not the "extra pay" such as the half time of time and a half wages, etc.), Pay made to those on Active Military Duty, Payments made to Third Party Trusts such as Davis Bacon, Money for Meals for Overtime, Retirement Plan Contributions made by the Employer, Rewards for Invention or Discovery, Salespeople, Collectors, or Messengers (exception is those employees that include the delivery of items such as equipment or merchandise or whom handle or treat material(s) sold, Severance Pay, Tickets for Events, Tips or other Gratuities made to the employee (this applies primarily to a restaurant business) & Work Uniform Allowances.

When the General Liability Classification is based on a rating of "Sales", it includes the total volume of sales as indicated in the specific Classification, with some exceptions such as taxes collected for the sales, credits for returned products, finance charges, and other items which may be deemed by Provider as excluded such as inter-company sales.

When the General Liability Classification is based on a rating of "Units", it includes the total number of units as indicated in the Classification (for example this Classification basis is often used in the apartment rental Classification).

Typically the Classifications on General Liability are in a series: Mercantile, Miscellaneous, Manufacturing or Processing, Building or Premises, and Contracting or Servicing. Some businesses may have multiple Classifications such as a steel fabrication company that may also install the products. A help button is also exposed or available allowing the user the ability to view each business Classification(s) in the following areas: Mercantile, Miscellaneous, Manufacturing or Processing, Buildings or Premises—office or residential occupancy or leased to others, and Contracting or Servicing.

Does the business qualify for a Division of Labor between each Classification for employees on General Liability? Y/N If the answer is "No," there is no need to have multiple codes for each worker, employee or Owner(s)/executive officer inside the specific policies; do not allow more than one Classification on each coverage line per employee. If "Yes," then the Class Codes shall grant permission to add more than one Class Code for the employee/workers. Note: there is typically no Division of Labor on General Liability for the Owner(s)/officer payroll, but there may be that option for the employees/workers. Only one Classification Code on General Liability for the Owner(s) is normal. A notification to the Policyholder may be sent by Provider clarifying what is acceptable and what records and the method in which these records are maintained. Software may import information from accounting software, or other time-tracking software on a per employee, per job, and per Classification basis.

When the NAICS Class Code(s) is input into the software as at step 205, there may be a list of "Suggested Possible Class Codes" for General Liability. For example: A (fictitious) Classification in NAICS is: 999999—Widget Products Manufacturing, or it is the equivalent SIC Code of 9999. A corresponding General Liability Classification is exposed, and states that the "Suggested General Liability Classification number and description" is: 12345 Widget Products Manufacturing. In other words, when the NAICS Class Code(s) is input into the software, "suggested Class Code(s)" that are associated with this type of business are shown.

For those carriers that wish to cover the liability risks of an Automotive Repair and Service risks within the General Liability policy (instead of the Garage portion), additional questions not anticipated for other non-garage risks may be exposed to the user. These risks are typically referred to as Division 2 risks and may include:

Auto Alarm Installation
    Auto Body Repair
    Auto or Diesel Repair
    Auto Glass and Repair
    Car Washes
    Construction Equipment Sales/Service
    Detailing/Clean-up
    Farm machinery Sales
    Gas Sales with Repair (Service Stations)
    Miscellaneous Service Station
    Motorcycle Repair and Service
    Parking Lots
    Quick Oil Changes
    Recreational Vehicle Repair and Service
    Snowmobile Repair and Service
    Stereo/Alarm Installation
    Storage Garages
    Storage or Parking Garage
    Tire Sales, Repair and Service
    Towing Operations
    Transmission Shop
    Truck Repair
    Tune up shop
    Undercoating/Accessory Installation
    Wholesale Automobile Parts
    Windshield/Glass Repair
    Window Tinting
    Other: (describe).

When Automotive Repair and Service risks are placed within the General Liability structure (instead of Garage portion), a warning may appear to the user, Provider, and Policyholder that this coverage may need to be complemented with other Garage Policy parts such as but not limited to: Garagekeepers (physical damage coverage to vehicles left in the Policyholder's care). Additional warnings may appear to the user to add Commercial Auto Insurance (if not already included in the portfolio of coverages) to cover Owned and Non-owned Vehicles.

General Liability Setup of Estimated Exposure(s)

When a General Liability policy is written, it is typically written with a Deposit Premium based on Estimated Payroll(s) (or other Exposure as described above) by job Classification(s) for each state, by location(s) which results into an Estimated Premium. The Deposit Premium ultimately may be scrutinized, reconciled, and compared with the Actual (final) Premium. The software may allow the Policyholder, their Designated Entities or representatives, and the Provider to understand how the Forecasted Exposures and premiums are compared relative to the Actual Incurred Exposure(s) and Premium(s) for a specified time period of the policy (either during or after). When the reporting of the Exposure(s) is input into the software by the Provider, Policyholder or either parties representative(s), the software may report the differences (if any) to all parties. Each time that a policy has updates made, the Estimated Exposure(s) may be affected.

The illustration below demonstrates a "payroll exposure" based General Liability policy. There are other methods to develop a General Liability Premium, such as those expressed above.

General Liability Setup Questions of Owner(s)/Principals/Executive Officer(s)/Member(s)

A question is posed: What are the Owner(s)/Partners/Member(s)/Officer(s) General Liability Class Code(s) and Description? (Note: A Division of Labor rule does not normally exist for Owner(s) or Executive Officer(s)). The Provider may Code/Classify this person in the highest rate Code/Classification according to their duties, job title, prevailing Classification, or the primary Classification. The Class Code number and Description of the Classification(s) that are applicable for the Owner(s)/Partners/Member(s)/Officer(s) may appear as radio buttons or drop down box(es). In cases where Payroll is the basis for the policy, the typical Classification, or primary Classification for the non-construction business may be used, but in cases of the construction industry, the proper Classification may be the type work that was being performed. The Provider is the initial source in determining the proper Classification for the owner and may have Classifications defaulted in the software, or if not, a space is provided for the Classification.

There may be a "base payroll" (minimum or maximum) limit for each of the Owner(s)/Partners/Member(s)/Officer(s) of Policyholder. These "Base Payroll" limitations used by the Policyholder's Provider is predicated by the amount of payroll filed with the respective State Insurance Departments. The Provider may set a Payroll limitation as a range from $0 to $ infinity), or a constant wage/salary limitation as per the State Filing. If the Provider has dictated a minimum, maximum or excluded the Owner/Member/officer's payroll from the General Liability, a statement appears: "Payroll for Owner(s), Partners, Member(s), or Officer(s) have been pre-defined as {insert from payroll that is predefined} for the purposes of the premium calculation. There may be a difference in the values established between the organization type (Corporation, LLC, Partnership, etc.).

A question is posed: Are there any Non-Active Owner(s)/Partners/Member(s)/Officer(s)? Y/N? If "Yes," the user selects the individual(s) that are Non-Active using drop down box(es) or radio buttons that describes the specific description of the individual(s), with options such as "Non-Active," "Owner," "Investor," "Retired," or "Other;" when the "other" box has been selected the user has the opportunity to describe what "other" means in a text field. Additionally, when there are Owner(s) that are not active, the payroll shall be $0.

In some cases, there is no charge for the Owner(s) due the nature of the operations. An example might be a property investor that owns duplexes/apartments and has no other operations would normally not have a premium transaction based on how much payroll was earned because his/her Classification is normally tied to the investment property only (which may be based on the number of Units).

General Liability Minimum and Maximum Payroll(s) for the Owner(s)/Principals/Executive Officer(s)/Member(s)

Often times there is a range of Payroll or a fixed amount of Payroll, this depends on the specific state parameters and/or filings from the Provider. The Provider may set a Payroll limitation as a range $0 to $ infinity, or a constant wage/salary limitation. If the actual wages inserted are less than the constant wage limit, the constant wage succeeds, etc. (stated another way, if the payroll limitation in a state was $50,000 for an Owner(s) and they made $40,000, the payroll used to calculate the premium is $50,000, but if the person made $70,000, the payroll may be recalculated at the constant wage/salary limitation ($50,000). If one or more of these individuals are not active, the Provider may allow no payroll to be used and in such cases the wages/payroll shall be established as $0.

Preset Minimum(s) and Maximum(s) may be available for the Owner(s) and may be changed by the Provider periodically depending on the Department of Insurance (filings) changes in that particular state(s). This function also may allow each party to understand the method to determine what is included or exempt from the calculation of Payroll. A question is posed: "How often is this Owner(s), etc. paid?" Options: Quarterly, Monthly, Semi-Monthly, Bi-Weekly, Weekly, Irregular/Sporadic (Off and On), & Other (when other is selected the individual may describe the specifics in a text field). A question is posed: Does this apply to all employees? Y/N. If "Yes," the program automatically pre-fills this answer for all Non-Owner employees also. If "No," then the question is asked: "Check those that this pay frequency applies," and continues to loop to the next employee, until all are answered.

The software may contain bridge (copy/import) capabilities wherein the Payroll Exposure information from the Workers Compensation portion (if any) may populate the needed payroll into the General Liability module which may have previously been populated/input in the Workers Compensation module (if payroll information is available). Note: these questions are often the same questions for the Workers Compensation Classification(s) for this Owner(s)/Principals/Executive Officer(s)/Member(s), etc. when the policy is rating the exposure(s) for the owner that is based on Payroll. There are only isolated instances that a General Liability policy is not rated based on Payroll however; and in such cases the software may recognize these anomalies. Additionally, the software may recognize minimum(s) and maximum(s) for these Owner(s)/Principals/Executive Officer(s)/Member(s).

General Liability Setup Questions about Workers/Employees (Non-Owner(s) or Officer(s))

Each Employee(s) is listed on the input schedule as stated in 225. Each employee's Classification(s) may be listed. If the answer was "Yes" to the question posed: "Does the policy allow for a Division of Labor?", then the next question is posed "Does this person qualify for the Division of Labor?" If "no," the highest rate class shall be used for each worker and there shall not be more than one Classification per employee. If "Yes," then the person may have multiple Classifications, the software allows Provider to stipulate which Classification could be applicable to the policy and have drop down boxes with these choices available. In addition, a text field is available to describe what each employee's job functions include(s), and why this person may qualify for the Division of Labor break out (more than one Classification for each of those employees, etc.). Does the person keep track and report to the employer what hours they spent inside each of these job Classifications? If "No," the answer to the question "Yes," is automatically converted back to "No," until the answer is "Yes." When this occurs, a Red Flag is exposed that clarifies why the individual may not qualify for multiple codes (Division of Labor). A Red Flag is exposed to the user warning that stringent requirements of record keeping are needed when the person answers "Yes," that this person qualifies for a Division of Labor. At the option of the Provider, the requirements may be also be answered as "Not Applicable."

A function may be available to the user to see sample reports that employees may use to report to Policyholder their hours worked. A sample may also be printed, with specific instructions on how to handle the Division of Labor.

If the Division of Labor was answered "Yes," the user then may enter the first Class Code for this individual, then 2nd, 3rd, etc. The user is then given an opportunity to add more by clicking "Add another Classification?" Y/N. If there is no Division of Labor entered, then only one Classification for this employee/worker is available and the user may update that information according to the proper Classification, responsibilities, etc.

Each employee that is added after the policy period (hired during the policy period), a date of hire may be added as well as the background.

The Policyholder may have access to a description of what payroll is excluded from the Payroll Calculations: Some Providers may exclude from payroll for the calculation of General Liability Airplane Flights, Club Memberships, Company Owned Auto, Dismissal Pay, Employee Discounts on Goods Bought from Employer, Discounts on Property or Services, Expense Reimbursements, Group Health Insurance Premiums paid by the Employer, Incentive Vacations, That portion of Overtime pay in excess of Straight Time Wages, Pay made to those on Active Military Duty, Payments made to Third Party Trusts such as Davis Bacon, Money for Meals for Overtime, Retirement Plan Contributions made by the Employer, Rewards for Invention or Discovery, Severance Pay, Tickets for Events, Tips or other Gratuities made to the employees & Work Uniform Allowances. In cases where a Bonus(es) may be exempt, the payroll may be modified according to the rules of the Provider. The Provider may expose this information to assist an understanding for any Policyholder where appropriate and needed.

Not all General Liability policies premium(s) may be rated by Payroll, and not all employees Payroll may be included in the rate calculation(s) for those policies that are rated by Payroll. In those cases, each employee's information shall be properly marked to exclude the individual for the premium calculation. For example, often times the clerical staff of a Policyholder is not included in the rate calculation(s) of a payroll based policy. Additionally, some industries may be rated on other functions as stated below in the section titled: General Liability questions about non-payroll exposures.

General Liability Questions about Payroll for Workers/Employees (Non-Owner(s) and Non-Officer(s))

The first employee's name appears and a question is posed: "How often is this employee/worker paid?" Options: Quarterly, Monthly, Semi-Monthly, Bi-Weekly, Weekly, Irregular/Sporadic (Off and On), & Other (when other is selected the individual may describe the specifics in a text field). Next question posed: Does this apply to all employees? Y/N. If "Yes," the program automatically pre-fills this answer for all Non-Owner employees. If "No," then the question is asked: "Check those that this pay frequency applies," and continues to loop to the next employee, until all are answered.

An option is given to the user to copy (or bridge) the Payroll Exposure information to the Workers Compensation portion if any. Note: these questions are the same questions for the Workers Compensation when the policy is rated based on Payroll. (There are only isolated instances that a Workers Compensation policy is not rated based on Payroll.)

The software may contain bridge (copy/import) capabilities wherein the Payroll Exposure information from the Workers Compensation portion (if any) may populate the needed payroll into the General Liability module which may have previously been populated/input in the Workers Compensation module (if payroll information is available). Note: these questions are often the same questions for the Workers Compensation Classification(s) for this employee when the policy is rating the exposure(s) for the employee that bears a premium to the policyholder which is based on Payroll. There are instances that a General Liability policy is not rated based on Payroll; however, the full Payroll for the employee may not be used. In these cases the preset Minimum(s) and Maximum(s) may be available for the Owner(s) and may be changed by the Provider periodically depending on the Department of Insurance (filings) changes in that particular state(s). These Minimums and Maximums may also be affected by the employee's status of full-time or part-time.

General Liability Questions about Non-Payroll Exposures

When a General Liability Policy is first written or renewed, there may be Exposures that are Forecasted "Non-Payroll" Exposures. The Forecasted Premium (deposit premium) is developed based upon Exposure information obtained in an application for coverage which is used to ultimately bill the Forecasted premium to the Policyholder. There are two types of Non-Payroll driven Exposures, these are: Variable and Non-Variable Exposures. A Variable Exposure could be described as changing (from original estimate or Forecast) such as Sales, Admissions, Number of Units, etc. To further clarify; a Variable exposure is similar to Payroll driven Exposure in that it may change as the Exposure occurs. When the Variable Exposure occur(s), the user may either update info manually, or bridge/import the information on this Variable Exposure, or as also described in step 225. A Non-Variable Exposure is most often constant and typically does not change such as Area (or square footage). When the Forecasted Exposures are not Variable and do not often change, the software may pose questions periodically that confirm that the information is still accurate as described at step 225.

The software may pose questions that associate Exposure(s) with specific locations listed on the policy (or locations that are not listed on policy). When the locations are not identified on the policy, the user may add/insert manually locations where the Exposure occurred. The business generated outside of the location(s) not listed on the policy may need to be formally added to the policy. When this occurs the Provider may be notified electronically or by other means. This notification of off-site Exposure may require formal policy change(s) or endorsements to add the Exposure or location(s) to the policy.

General Liability Questions about Subcontractors/Independent Contractors

A Policyholder using a subcontracting company for specific jobs or to supplement the labor force of the Policyholder may be insured with their own General Liability policy. When a subcontractor has their own coverage, verification of the policy shall be in the form of a "Certificate of Insurance." This process of verifying the General Liability is described at step 605, 610, 615.

In cases where a Subcontractor with proof of General Liability insurance is bringing materials to install and charging the Policyholder for materials, the Exposure (typically "total cost" or "cost") shall be inclusive of both the Labor of the installation and the Materials being installed. In cases where the Policyholder has secured the materials on behalf of the Subcontractor, the cost of those materials may be included as the Exposure. Some Providers may choose to include the materials supplied to the Subcontractor by Policyholder as Exposure, while other Providers may not (include the materials supplied to the Subcontractor by Policyholder); in either case the Provider shall default which Exposure is appropriate for the policy have the right to default the proper method. The software may notify the user what is inclusive in the "total cost" or the "cost" through an electronic notification, a drop down box, or other notification. Additionally, the software may allow material cost deductions (with adequate documentation) when the Provider allows for this deduction. When material deductions are allowed, the software may provide the proper and accepted method to document these material costs.

Exceptions may occur when certain type(s) of work is performed by General Liability insured Subcontractors. In these cases, a portion of the insured Subcontractor's operations are automatically defaulted into the Primary Classification (and not the insured subcontractors Classification) of the Subcontractor, even with insurance verification of the said Subcontractor. This exception may be changed by the Provider on a per Classification basis, etc. This anomalous scenario is typically isolated for example to crane operations that are hired as a Subcontractor by Policyholder with an operator or temporary labor, etc.

When there is no General Liability coverage for a Subcontractor or a Certificate of Insurance on file with the Policyholder, there may be a premium charge as though this subcontractor is a traditional "employee" or other charge.

General Liability Questions about Exposure for Subcontractors that do Maintain General Liability When the Policyholder uses the services of a Subcontractor(s) that maintains General Liability Insurance (while working for Policyholder or during the term the Subcontractor is active), there may be a premium charge to the Policyholder by the Provider (even though the Subcontractor has their own General Liability Insurance). A question is posed when the Certificate of Insurance is on file with the Policyholder as at step 605, 610, 615: The different Classification(s) that the Policyholder may be eligible to use for the insured Subcontractors Exposure shall be available and the Policyholder and/or Provider may select based on a series of questions; for example, a question may be posed after a Subcontractor is paid to perform a task: "What were tasks performed by ABC Sample Subcontractor: Residential, Commercial Buildings, Street or Road, Non-Building Related, etc. {radio buttons}. Once the proper Classification(s) are selected, additional questions may be posed about the proper use of Classifications including: "Are any Subcontractor(s) that maintain General Liability Coverage eligible for multiple Classifications?" The General Liability policy premium for the Policyholder may include Classification(s) that are based upon how much the "Total Cost" is paid to the Subcontractor. Providers may base the Exposure of Subcontractor costs/total costs to include materials and labor, (including materials purchased by Policyholder to be used in connection with the work completed/installed by insured Subcontractor) while other Providers may base their Subcontractor cost/total cost to include labor only. (i.e. the Policyholder secures the order for the materials at the supply house and the subcontractor installs these materials) as also stated above.

Each Provider may interpret what is to be included in the calculation method being used in "Subcontractor Cost(s)," "Total Cost(s)," or "Cost," therefore the software is defaulted for the Providers to select the proper method of calculation of what defines "Exposure." The determination may be based on Insurance filings for this Classification, or the practice(s) used within the Provider's operations. The Provider may expose to the Policyholder the definition of what is the basis of the premium charge; (i.e. "Subcontractor Cost(s)," "Total Cost(s)," "Cost," etc)

Upon each payment (or draw) made to the Insured Subcontractor from the Policyholder for the performance of work, information as to how much was paid to the Insured Subcontractor and what type of work was performed on behalf of the Policyholder. This information may be updated by the Policyholder or their representative(s) by an import function into the software from the Policyholder's accounting software, or other record keeping software, and/or manually entered through questions and/or prompts in the software. Information about where the location(s) of where the work was performed may be needed by the Provider and question(s) may be posed as to what location(s) the work was performed, and/or what state the work was performed. If the location or state is not listed on the policy, the Provider may be notified of the necessity to add the location or the state to the policy.

When the "Total Cost" is the basis of the premium and the Subcontractor does not include the Materials, but are offered by the Policyholder or other party, the value of the materials supplied to the Subcontractor may need to be available to properly charge the premium for "Total Cost." This occurs when the Subcontractor does not supply the materials for the installation or materials used for the work completed by the Subcontractor. To assist the Policyholder and the Provider, the software may allow a portal to store/maintain information supplied and the cost of the materials supplied by the Policyholder and installed by the insured Subcontractor.

The Provider may set the minimum General Liability limits for the Subcontractor to be considered "insured" for General Liability Insurance. These limits may be listed in the software and exposed (available) when needed. The Certificate of Insurance document(s) on file with the Policyholder may be compared to the limits that the Provider's "minimum limits." When the Certificate of Insurance is Electronically Stored Data (ESD) or the limits for the Subcontractor (or stored in the software in another format) and the limits are not adequate to meet the Provider's minimum limits, a warning is exposed to all parties notifying the user of the potential misunderstandings, the potential gap in insurance and the potential for increased premiums for the Policyholder.

The software may periodically pose the question: "Are there Subcontractor(s) that need to be updated in the software?"

General Liability Questions about Exposure for Subcontractor(s) that do not Maintain General Liability The Subcontractor(s) that do not maintain General Liability Insurance Coverage (as evidenced when the Subcontractor(s) does not maintain a current Certificate of Insurance with the Policyholder), as stated in step 605, 610, 615. A question is posed when the Certificate of Insurance is not on file with the Policyholder: "Is any Subcontractor(s) that does not maintain General Liability coverage eligible for multiple Classifications?" If the answer is "No," each Subcontractor not maintaining General Liability Coverage shall be classified under only one Classification (typically the prevailing or primary Classification, or highest rated Classification of the Policyholder). If the answer is "Yes," the user may have the ability to select multiple Classifications listed beside each Subcontractor. The closest applicable Classification for these Subcontractors may be input by the user for the type of work performed or that Classification that meet(s) the Provider's standard(s) for the type of work performed on behalf of the Policyholder by the Uninsured Subcontractor(s). The software may provide Classifications to choose from that best describes the work performed on behalf of the Policyholder by the Uninsured Subcontractor. The Exposure for these Uninsured Subcontractors may be the amount paid to the Uninsured Subcontractor(s) which may include the Labor, the Profit, the Overhead, and the Materials or a combination of one or more (Provider selects which one or combination of these expenses are to be included in the calculation). The specific method shall be dependent on the filings of the Provider with the proper authority(s), or the practice of the Provider.

Each Provider shall have the ability to properly narrow or broaden the Policyholder's ability to select the proper Classification for an Uninsured Subcontractor.

When Subcontractor(s) are not covered for General Liability, an electronic notification or other notification shall be sent to the Provider and Policyholder that warns each party of the impending increase in hazards and cost.

Upon each payment (or draw) made to the Uninsured Subcontractor from the Policyholder for the performance of work, information as to how much was paid to the Uninsured Subcontractor and what type of work was performed on behalf of the Policyholder. This information may be updated by the Policyholder or their representative(s) by an import function into the software from the Policyholder's accounting software or manually entered through questions and/or prompts in the software. Information about where the location(s) of where the work was performed may be needed by the Provider and question(s) may be posed as to what location(s) the work was performed, and/or what state the work was performed. If the location or state is not listed on the policy, the Provider may be notified of the necessity to add the location or the state to the policy.

The software may periodically pose the question: "Are there Subcontractor(s) that need to be updated in the software?"

Companion Policies to the General Liability Policy

Additional coverage(s) maybe written along with or without the General Liability coverage. These forms of coverage may include: Liquor Liability, Pollution Liability, Professional Liability, Errors and Omissions Liability, and others. Each of these coverages may have intricate rating techniques and questions which are similar to the questions and rating techniques of the General Liability coverage part.

Other Considerations

When a Policyholder is working under a construction contract with an owner, construction manager or general contractor that maintains a Wrap Up, or Owners Controlled Insurance Program (OCIP), the Exposure for the Policyholder should not be charged for the insurance premiums for all employees and workers of the Policyholder as the premiums shall be charged to the entity that maintains the insurance Wrap Up policy or the OCIP. When the Policyholder notifies the Provider of such contracts as stated in 600, Policyholder's Supporting Documentation, the Provider may notify the Policyholder to clearly maintain documentation of all Exposures (employees payrolls by classification and other Exposures that are used to calculate the premiums for the General Liability) that are paid to the employees or workers. The employee's payroll serving the Wrap Up or OCIP contracted jobs shall be ultimately discounted from the Final premium calculations.

General Liability Policy—Reconciling Exposure Process

During and after the policy term, the Policyholder may update the Exposure information as needed. Once the Exposure information has been updated (data input), the software transforms the information allowing all parties to properly and understandably account for each premium (by Classification) and allows each party in the insurance transaction to identify and correct potential misunderstandings or risk and reconcile each area as Exposure(s) occur. Each person/department that has an interest may have access to the information.

Additionally, the software may share the "real time" data with the proper department of interest that may allow analytics and allow actuarial calculations as they occur.

Other Considerations

The software is flexible to accommodate both the Provider and the Policyholder to modify the method in which the questions are posed. Other insurance coverages that are comparative to the General Liability include Liquor Liability, Professional Liability, Pollution Liability, Contractors Pollution Liability, Agricultural Farm Liability, Owners, Landlords, and Tenants Liability (OL&T), Owners and Contractors Protective Liability (OCIP or OCP), Employment Practices Liability (EPL), and the like. These coverages may be written separate from the General Liability, included by endorsement or by other means to the General Liability policy. Virtually the same information may be requested periodically from the Providers of these coverage forms and the software may be expanded to address these anomalous needs of both the Provider and Policyholder. The use of the software by both Provider and Policyholder may also reduce the risk for both parties because each party may identify what the current cost of coverage is and access the risk during the policy period and each party may apply proper risk management if needed to the exposures.

Commercial Garage Liability and Physical Damage 450

A Garage Policy is comprised of several parts (coverages); liability, physical damage, and companion coverage parts such as uninsured motorist, etc. Each coverage part that the Policyholder purchases may have occurred at step 100, 105, 110. The policies offered are either a Dealer or a Non-Dealer garage business. The insurance industry identifies these two business types as Division 1 or Division 2 respectively. Each type may have different methods and approaches in determining Exposures as well as the type of insurance coverage forms that are purchased. Division 1 is "automotive related dealerships, and the like" (both Franchised and Non-Franchised) and Division 2 are "automotive services, and/or repair operations and the like."

Many Providers use the General Liability coverage to cover the (non-vehicle) liability of a Division 2 business (and not the Garage Liability portion). They still may use companion coverage parts of the Garage policy portfolio such as Garagekeepers to cover exposures to a loss to vehicles that are in the care of the Garage business, etc. The software recognizes what portfolio or combination of coverages that the Policyholder has purchased to properly protect the business. This is whether handled by a straight Garage form of coverage, or a combination of a Garage coverage for the Garagekeepers coverage, a General Liability coverage form for the non-vehicle Liability coverage, and a Commercial Auto coverage form for the owned or non-owned auto exposures, etc.

The premium for a Commercial Garage Liability and Physical Damage Policy is determined based on the amount of Exposure (such as Payroll by Classification, the number of Employees/Drivers, the amount of inventory and other rating variables) as stated in the example below 455:

Garage Dealers—Division 1 Policies

Garage Liability Setup of the Available Classification(s) and Territory(s) for Auto Dealer Risks (Franchised and Non-Franchised)

Policies that are written to provide coverage for Automobile, Truck and Motor Vehicle Dealers (and the like) would be provided for Franchised and Non-Franchised Dealers, normally referred to as "new" or "used" dealers, are also referred to as "Division 1" Garage risks. Both of these type dealers may sell private passenger autos, trucks, pickup trucks, motorcycles, tractor-trucks, recreational vehicles and other motorized land (or non-land) vehicles. These type risks may also provide services such as for leasing of vehicles, repair of vehicles and auto body repair or those business operations that would support the sales, service, maintenance of an automotive or hovercraft related businesses.

When the policy is written as at step 100, 105, and 110, the information about the type business classified under an Auto Dealers Garage policy may be exported into the software. This information may be the basic information about the operations such as what operations are rated or performed for the Exposures and other information needed for a Provider to properly issue or maintain coverage for the Policyholder. When this information is not captured from an export/import from the Provider's Policy Administration System or other means, the software may need additional information input manually.

If the software has not been pre-populated either by Provider or imported from another source, questions may be posed: "What is the Garage Classification(s) Code(s) for this Policyholder?" The Provider may list the different type of business(es) or operation(s) defined by Classifications and display the options (user may select one or more if applicable). The software functions are flexible to update for the Provider's needs as the needs change to meet the obligations for the Policyholder.

After the input of the first Classification into the software a question is posed: "Do you want to add another Classification Code?" (this question may be looped until answered "No.") Each Class Code may have a state to designate or location; each Class Code may be listed multiple times depending on the states of operation. Alternatively, the software may allow the Policyholder to select all operations by marking each Classification Code that applies.

Each of the Classifications that are available for a Division 1 Automotive Dealer may include:
  Franchised Private Passenger Auto and Truck Dealer
  Franchised Truck or Truck-Tractor Dealer
  Franchised Motorcycle Dealer
  Franchised Recreational Vehicle or Bus Dealer
  Non-Franchised Private Passenger Auto and Truck Dealer
  Non-Franchised Motorcycle Dealer
  Non-Franchised Tractor-Truck Dealer
  Manufacturer
  Other: (the software is designed to allow Providers with
    unique Policyholders exposures to expand offerings where appropriate to operations not described above; i.e. golf cart dealers, hovercraft dealers, digger derrick dealers, crane dealers, or other equipment dealers, etc.)

Provider may pose a question(s): Other than the sale of vehicles, what additional services or operations are performed at the Dealership? A list of additional services (as also described in Division 2 operations) may be exposed or a description may be inserted manually.

Auto Alarm Installation
Auto Body Repair
Auto or Diesel Repair
Auto Glass and Repair
Car Washes
Computer and Other Electronic Products
Construction Equipment Sales/Service
Detailing/Clean-up
Farm machinery Sales
Gas Sales with Repair (Service Stations)
Miscellaneous Service Station
Motorcycle Repair and Service
Parking Lots
Quick Oil Changes
Recreational Vehicle Repair and Service
Salvage or Dismantling Operations
Seat Cover, Upholstery and interior accessories
Snowmobile Repair and Service
Stereo/Alarm Installation
Storage Garages
Storage or Parking Garage
Tire Sales, Repair and Service
Towing Operations
Transmission Shop
Truck Repair
Tune up shop
Undercoating/Accessory Installation
Wholesale Automobile Parts
Windshield/Glass Repair
Window Tinting
Other: (the software is designed to allow Providers with unique Policyholders exposures to expand offerings where appropriate to operations not described above; i.e. specific installation of handicap accessibility products, electronic motor vehicles, hovercraft, and vehicles that transport people or materials of all types including motor vehicle types that have not yet been invented or in the process of being developed, etc.)

The software may request more information about each category, including annual sales, payroll that supports those operations, etc. The Provider may pose additional questions once the information is input into the software. For example, a garage business with Towing operations may "haul vehicles for hire," while other garage businesses may not haul for hire, just tow customers vehicles back to the garage business for repair. Providers may ask additional questions such as: Is the tow truck operations involved with "repossessing activities?"

The Territory of Operations may automatically reference when the street address is entered into the software. The "Territory" of operations may be available to change in the software by Provider as the location(s) change. (state, city, township, county, parish, zip code, etc.)

Garage Liability Setup of Estimated Exposure(s)

Each of the estimated Exposure calculations are identified, determined, or described in the steps 100, 105, 110.

When a Garage Liability policy is written, it is typically written with a Deposit Premium based on Estimated Payroll(s) or Unit(s) or other Exposure by Classification(s) for each state, by location(s) which results into an Estimated Premium or Forecasted Premium. The Deposit Premium ultimately may be scrutinized, reconciled, and compared with the Actual (final) Premium. To determine if the Exposures during the policy term or after the policy term are maintained, a process is used to update the information needed to maintain a policy. Ultimately, this Exposure information may be compared to the actual exposure.

Examples of Questions associated with a Garage Liability and Physical Damage Policy 455:

Garage Liability Setup of Proper Exposure/Rating Base (Units, Payroll, or Other) for Auto Dealer Risks (Franchised and Non-Franchised)

The rating basis (Exposure) is established by the Provider. There may be several options or methods in determining Exposure. Provider defaults are available and the software is structured for the method which is best suited for the Provider and within the Provider's filings with the various jurisdictional authorities such as Departments of Insurance, etc. Typically dealership risk's Garage Liability premiums are calculated using a system of classifying each owner, employee, or worker into an Exposure Classification called a "Unit" or "Units." The software may refer to (2) types of "Units"- Exposure Units and Rating Units. Rating Units are the process of utilizing the various types of Exposure Units and applying those with other factors to determine the final rating basis (Exposure). Providers may select the option or method they deem as Exposure as described in step 100, 105, 110. The software is flexible and defaulted to the preference of the Provider and the setup of how the policy was structured, sold, or negotiated.

When the policy premium is determined or rated based upon "Units," it involves a process of classifying each Employee and perhaps Non-Employee by the Policyholder based upon their function or responsibility working for the Policyholder or driving privileges of non-employees. The software may allow the Provider to identify each risk specifically by identifying each Exposure Unit and each Rating Unit (factors) to be assigned to every Employee and Non-employee of each Garage Policy. The information on the Employees and Non-employees may be carried forward from data captured as at step 210, 211, 225. This information includes date of employment, the number of hours worked for non-exempt (non-salaried) Employees per week (during the policy period). This information may be imported from accounting software—or entered manually. If the software does not capture each Employee and Non-Employee and their respective Classifications, the software may ask more specific questions.

Once the list of employees is exposed, questions are posed: What is this person's "primary" job function(s)? To assist user drop down boxes may be available which include Sales, Owners, Receptionist, Clerical, Accounting, Service Tech, Service Manager, Auto Detailing, Auto Washing, etc. Each person may have several responsibilities and the software may allow the user to select more than one Classification. Each drop down box may associate the Garage Policy with a certain Exposure Units and Rating Units.

When the dealership has multiple locations, the employee(s), rating units, and exposure(s) shall be assigned to their proper location(s). A warning may be available allowing the user to know of a possible misunderstanding if a multiple location operation that does not properly assign the employee(s) to their individual respective location(s). If an individual is assigned to more than one location (because they float from one location to another), the software may allow a division of time between each location. In cases where there is more than one location and an employee has duties involving more than one location, additional questions are posed about their allocation of time between each location.

Exposure "Units" are broken into (4) categories; full time employees, part time employees, non-employee drivers over 25 years of age and non-employee drivers under 25 years of age (other than customers). Providers may assign a unit of 1 per full time employee and 0.50 (one half unit) to a part time employee(s) and other rating "Units" for non-employee drivers. The Provider may determine what constitutes a worker from being either full time or part time status. The default setting for part time may be set as per the specifications of the Provider. The software may use Exposure "Units" as well as using Rating "Units" (factors) which ultimately help translate into a basis in determining a premium.

Class 1—Employees includes all employees (both full and part time) and casual laborers.

Class 2—Non-Employees includes anyone who may be regularly furnished a vehicle such as a spouse, a child or a relative of the owner/principal of the dealership. Also a non-employee may include someone who receives "perks" from the Policyholder dealership such as promotions, contests, or a football coach driving a dealer owned auto where the dealership is a booster to the school, etc.

Both Class 1 and Class 2 may be split into Classifications of Class 1-A, Class 1-B, Class 2-A and Class 2-B. This further refining of Classifications allows Providers to narrow the risk characteristics to help with the proper rating of the premium.

Class 1-A Employees
  a. All Active Owners, Partners or Executive Officers of the dealership
  b. All general, sales or services managers, salespersons
  c. Any employee who has a principal duty which involves the operation of automobiles and/or those who are furnished a vehicle covered on the garage policy.
  "principal duty of operation of automobile" may include anyone who primarily drives company vehicles, such as a lot attendant who may drive vehicles to and from mechanics garage or a parts runner doing deliveries.
  d. Any Employee furnished a vehicle covered by the Policyholder.

In instances where class 1-A employees are considered part-time, the Provider may decrease the Rating Units by adjusting the factors.

Class 1-B Employees
  a. All other employees, including those that have no access to Policyholder vehicles including reception and clerical employees.

Class 2-A Non-employees
  a. Any non-employee of dealership under the age of 25 who is furnished a covered auto.

Class 2-B Non-Employees
  a. Any non-employee of dealership over the age of 25 who is furnished a covered auto.

If the garage business is classified as a certain type operation such as a trailer dealer, the Provider may discount the total factors according to their policy rating structure. The Provider may adjust their rating factors as needed.

The software may allow the Provider to utilize technology (third party software or other technology) to identify all drivers within a household of an employee of a garage risk to enable Provider all available potential driver information associated with such risks; especially those employees that are allowed to drive a Policyholder's vehicle home, etc. (Example: Report from State Motor Vehicle Bureau (or other bureau) reveals son, age 19 in household of Owner of dealership that had been previously undisclosed and who had regular use of covered vehicles)

To identify additional or heightened exposures to a loss, the Provider may request information on the dealer tags that are issued to the Policyholder from the jurisdictional authority. This information may include the tag number, the date issued, the date tag may expire, or the number of tags issued, etc. This information may help identify the number of vehicles on the road, and complete the rating needed for coverages such as Uninsured Motorist, etc. Periodically, the software may access the jurisdictional authorities and obtain the tag numbers and tag expiration to verify that the information has been input properly. This information may be populated automatically, manually, or by other means. When the tag is expiring, expired, or about to expire, the software may automatically notify the Policyholder electronically notify or by other means that the information should be updated. Or if the jurisdictional authority has updated the software the software may notify the Policyholder electronically or by other means that the information should be reviewed for accuracy. A request to validate the information may be requested and a notification to the Policyholder to acknowledge the accuracy of the data.

The software may allow the Provider to make available a guide as to what each Employee or Non-Employee's Classification of "Units" are. This guide may allow each Provider a means in which to provide established rules as to what determines the Exposure as a "Units" based policy. The Policyholder may view how the Provider has classified each employee and each non-employee. Additionally, the software may show/alert the premium obligation for each individual during the policy period. When a Policyholder decides to hire an individual, a budget "worksheet" may be available to calculate estimated premium costs associated with each hire, and if included in software may include the premium associated with companion coverages such as Workers Compensation, employee benefits, etc.

Division 1 Providers may use a different measure of Exposure than "Units," such as Payroll (as often found in Division 2 policies) or other measure of Exposure, such as Sales, number of units sold, or other measures that the Provider may deem as Exposure, etc. The software is flexible and defaults to the preference of the Provider and the setup of how the Providers policies are structured, sold, or negotiated. Each measure of Exposure, regardless of whether Units, Payroll, other methods shall be identified and defined for all parties to understand and properly maintain.

Once the Garage Policyholder's Employees and Non-Employees have been identified, the Provider may assign factors that are applied to each person in each Classification (1-A, 1-B, 2-A, and 2-B). The Provider may apply these factors to the proper base rate.

Once information about each employee and non-employee have been established from the steps above, a driver and non-driver list may be consolidated to allow each party to maintain the information as needed.

The software may use any or all of the following information to help establish a more complete analysis of the Garage risk; including but not limited to:
  Full description of operations
  Contact and Records information
  Employees and Non-employees names, address, date of birth, drivers license #, SS #?
  Employees duties
  Method of Employees pay (drop down boxes may be available including salaried, hourly, piece mill, commissioned)
  Once the method of pay for each employee is recognized, an additional question may be posed such as "How much does John Doe make on a hourly basis?"

Determination of Full or part time

Weeks Employed

Furnished Auto—Is employee furnished a covered auto?

Covered Auto—Is employee's duties primarily involve operation of a covered auto? (help determine 1-A or 1-B Classification)

Identify Spouses, Children and Others furnished Autos

As described above, when the policy premium is determined or rated based upon "Units," it involves a process of classifying each person employed by the Policyholder based upon their function or responsibility working for the Policyholder. A "Payroll" based policy is no different. In these cases the actual "Payroll" may used or a "Base Payroll" (minimum or stated as a maximum) limit for each of the Owner(s)/Partners/Member(s)/Officer(s) of Policyholder or Employees or Workers. These "Base Payroll" limitations used by the Policyholder's Provider may be predicated by the amount of payroll filed with the respective Jurisdictional or State Insurance Departments. The Provider may set a Payroll limitation as a range from $0 to $ infinity or a constant wage/salary limitation as per the Jurisdictional Filing. If the Provider has dictated a minimum, maximum or excluded the Owner/Member/officer's payroll from the Garage Liability, a statement appears: "Payroll for Owner(s), Partners, Member(s), or Officer(s) have been pre-defined as {insert from payroll that is predefined} for the purposes of the premium calculation." There may be a difference in the values established between the organization type also; i.e. Corporation, LLC, Partnership, etc.

Additionally, when an individual is not "employed" but is assigned to drive a specific vehicle or allowed to drive vehicles owned by the garage business, the Provider may calculate an additional premium charge for the exposure. The software is flexible to accommodate such an exposure. In these situations, the Provider may amend what the basis for the premium shall be based upon the specific circumstances and may be described as a "memo entry" (if no specific classification exists) as the Provider would handle these or title these anomalous scenarios.

Garage Liability Setup Questions of Owner(s)/Principals/Executive Officer(s)/Member(s) their Exposure Calculations and Proper Classification A question is posed: What are the Owner(s)/Partners/Member(s)/Officer(s) Garage Liability Class Code(s) and Description? (Note: A Division of Labor rule does not normally exist for Owner(s) or Executive Officer(s)). The Class Code number and Description of the Classification(s) that are applicable for the Owner(s)/Partners/Member(s)/Officer(s) may appear as radio buttons or drop down box(es). The Provider is the initial source in determining the proper Classification for the owner and may have Classifications defaulted in the software, or if not, a space is provided for the Classification.

A question is posed: Are there any Non-Active Owner(s)/Partners/Member(s)/Officer(s)? Y/N? If "Yes," the user selects the individual(s) that are Non-Active using drop down box(es) or radio buttons that describes the specific description of the individual(s), with options such as "Non-Active," "Owner," "Investor," "Retired," or "Other;" when the "Other" box has been selected the user has the opportunity to describe what "other" means in a text field. Additionally, when there are Owner(s) that are not active, the payroll may be $0; Provider dependent. However, if an individual is revealed and drives a Policyholder's auto, this may eliminate their status as non-active due to the use of a garage auto/dealer auto.

Additional questions pertinent to the insurance policy may be posed of the Policyholder. For example: Does {insert name of each owner} maintain a Personal Auto Insurance Policy? If the answer is "No," the software may notify Policyholder electronically or by other means of a deficit in coverage. Provider may notify Policyholder how to cover this exposure to a loss with (the proper) insurance, titled "Drive Other Car" coverage. If the answer is "Yes," then a message is sent electronically to the Policyholder or by other means that "If this coverage is terminated the Provider should be notified." Garage Liability Setup Questions about Workers/Employees (Non-Owner(s) or Non-Officer(s)) their Exposure Calculations and Proper Classification A series of drop-down boxes may be exposed to establish whether the non-owner workers are considered either full time or part time, the number of weeks worked or was titled as employed, whether they were supplied an auto, whether they were active in the business, etc.

A question is posed "Are any more people to be added to the employee list?" Expose all drivers on the list to the Policyholder. Periodically, the software may pose questions such as: "Are any additional people to be added or deleted?"

The software may search each Policyholder's jurisdiction to determine if the Policyholder has added any additional sales staff or licensed any sales staff with an occupational or professional license by the jurisdiction during policy period such as the State of Tennessee Motor Vehicle Salesmen License.

Determination of Whether an Employee is Full-Time or Part-Time:

Each employee/worker may be listed including date hired. An import from the accounting software or other record keeping software may be received into the software. It also defines when an employee/worker is non-exempt (non-salaried) and is employed by-the-hour, or piece mill basis. The import from the software shall also import these hours per week when maintained by the accounting or record keeping software. The software may calculate the average hours per non-exempt employees when each non-salaried employee's name and the number of hours worked each week. When this information is not maintained in third party software or other record keeping software, the user may manually update this information from other records into the software.

When the employee is exempt (salaried) by the Policyholder, the software may be defaulted to recognize this person as a full-time employee.

When the policy is written as a "Units" based policy, each employee/worker shall be rated based on their status of a Part or Full Time employee/worker. Some Providers may use 20 hours as the maximum to be considered part-time, while other may use another number of hours, etc. A portal may be available for the Provider to amend the hourly maximum to be considered a part-time employee/worker. In cases where Class 1-A employees are considered part time, the software may adjust the rating factors to adjust the premium. This part time rule may apply to other classes as well; these circumstances are determined by the Provider.

When the Policyholder's Exposure is based on Payroll, the premium calculation may have a certain minimum/maximum per employee or the use of the Actual Payroll per employee.

Defaults are available for Providers to maintain the proper structure for each policy, by state, by program filing, etc.

It may appear that a person paid on a commission basis, such as an auto sales person, has not been working or that there was a leave of absence because there may have been a lag time in payment of commissions. To limit the confusion for commission only workers, a question is posed: What is this person's occupation? The length of time an employee/worker was employed may be adjusted for amount of time the employee/worker was employed. For example, if a salesperson was employed the day the coverage went into effect, but left employment 8 days into the policy period, the unit adjustment may be factored as 8 days/365 days=2.19% of the rating units. A default for the number of days employed may be used, or alternatively, the software may change the basis from the number days to the number of weeks, or months, etc.

Garage Liability Questions about Subcontractors/Independent Contractors and Exposures The use of independent contractors may increase risk to all parties and the software recognizes the independent contractors that may be used by Policyholders with Garage Liability. The question posed: Are subcontractors used to perform services on the Policyholder's behalf? If there are no Subcontractors, Non-Employees or Independent Contractors, the software may not pose additional questions until the Periodic Review as determined by either party. The software may periodically pose questions about this exposure, and may be defaulted to do so based upon the Provider's needs.

When the answer is "Yes" to the question posed about the use of Subcontractors, further questions posed may include: Do the Subcontractor(s) maintain their own Garage Liability, General Liability, or Commercial Auto Policies? If "Yes," evidence of the insurance may be attached within the software as stated in step 605, 610, 615. The software may pose questions that are relevant to the Provider in determining if there are additional or increased risks or hazards inherit with the Policyholder using these Non-Employees or Subcontractors. For example: What specifically does the individual (Subcontractors) do for the business? Are any Subcontractors authorized to drive a garage vehicle? Are any more individuals to be added to the drivers list/employee list/subcontractors list? What do they do for the dealership business?

For example, if the Provider insures a golf cart dealership (as a Division 1 policy) that uses an "independent sales force," concerns and questions may be raised by Provider such as "Does the independent contractor {name insert} remove inventory from Policyholder to demonstrate to customers?" Another example of one of these circumstances is a dealership Policyholder's automotive body shop not capable to tow a customer's damaged auto after an auto accident, the Policyholder may contact a towing company to deliver their customer's wrecked auto. These "subcontracted" services may increase the hazard and exposure to a loss for both Policyholder and Provider.

When these questions are answered, the answers may be exposed to the Provider. The Provider may need additional information. Each question and the Policyholder's answer may influence how the Provider may handle, manage the risk, or charge (or not charge) for the premium, etc. Each Provider may treat those Subcontractors with their own insurance differently than those without insurance. The Provider may have flexibility in designing the questions that best suit the circumstances and underwriting concerns.

When there are premium charges associated with the Subcontractor(s), each Subcontractor may be properly marked in the software and may be exposed on the premium calculation worksheet, or may be included with the employees with special notation of the individual(s) status as a Subcontractor (or Independent Contractor).

Garage Liability Questions about Companion Liability Forms

The Division 1 Garage Liability Policies may be complimented by other coverage parts including Medical Payments, Uninsured Motorist, Dealers Driveaway Collision Coverage for Non Franchised Dealers, False Pretense, Customer Rental Coverage, and the like; some of which have been identified above. Hired Liability Insurance (Liability for vehicles rented on behalf of the Garage business, but not the rental of vehicles to others)

When this policy coverage is selected, the premium is often calculated on the amount paid by the Policyholder for "renting autos." When the policy was written/renewed at step 100, 105, 110, the Hired Liability coverage may have Forecasted the Exposure and charged the Policyholder for the Forecasted Exposure. Periodically, the Provider may ask the Policyholder what the expenses (receipts) have occurred during the policy period for the renting of vehicles. This information is then available to be compared with the Forecasted amount of expenses (receipts).

Non-Owned Liability Insurance

When this policy coverage is selected, the premium is often calculated on the quantity, amount or number of employees (regardless of whether these employees are drivers or not). When the policy was written/renewed at step 100, 105, 110, the Non-Owned Liability coverage may have Forecasted the Exposure and charged the Policyholder for the Forecasted Exposure. Periodically, the Provider may ask the Policyholder how many employees were employed during the policy period. This number may be based on an average or the total quantity at any point during the policy term. Defaults for the proper setting of average or total may be available for the Provider to select. This information is then available to be compared with the Forecasted amount.

Drive Other Car Liability Insurance

If the policy does not include an endorsement covering the Owner(s)/Principals/Executive Officer(s)/Member(s) while driving another person's vehicle (not on company business), a question is posed: Do the Owner(s)/Principals/Executive Officer(s)/Member(s) referenced maintain a Personal Auto Policy? If the answer is Yes, then a message is sent electronically to the Policyholder or by other means that if this coverage is terminated the Provider should be notified. If the answer is "No," the software may notify Policyholder electronically or by other means of the deficit in coverage. Provider may notify Policyholder how to cover this exposure to a loss with (the proper) insurance. The typical coverage is titled "Drive Other Car" coverage.

Garage Physical Damage Reporting Procedure (Dealer Inventory)

When the policy is first written (or renewed), a determination of the beginning inventory is made at the time of the application for coverage as at step 100, 105, 110.

In cases where dealer inventory values fluctuate often as inventory is acquired, sold, or traded. The Policyholder may need to insure the values with the basis cost of the inventory but offset by the Floor Planned Insurance Policies in effect by the financial institution lending the money for the Policyholder dealer to acquire the inventory (policies covering the physical damage to vehicles financed). The process involves determining the Beginning Inventory during each reporting period and then comparing with the Ending Inventory by the Policyholder exposing the information when requested to do so or as per specific policy provisions.

Once the Provider receives the information, the software may retrieve values of inventory based upon year, make, model, and vehicle identification number from third party software ("book value") or other means and comparing to inventory basis cost. If there are any anomalies, the software may note these differences and the Provider may understand how the values compare to the so called "book value" and if any action needs to be taken, the Provider and Policyholder may be able to identify any potential conflicts in advance.

The storage location of the Dealer Inventory may also be periodically requested of Provider. The Provider may classify each storage location of the Dealer Inventory as "outside" of a building behind a fence (protected or standard) or not behind a fence (unprotected or nonstandard) or "inside" of a building. Each Provider may clarify how tall the fence must be and of materials the fence was constructed.

Additionally, to limit misunderstandings, the Provider may state clearly what is insured as "dealer inventory." For example some vehicles on dealers lot for sale are consigned automobiles by another person. These vehicles may not by definition of the physical damage insuring agreement be covered under the policy and therefore not to be reported as Dealer Inventory.

In some instances the form of Dealer Physical Damage coverage are written on a "non-reporting basis," meaning that the Policyholder is only covered for the maximum of the limit stated on the insurance policy. In these instances, the policy is structured on this basis because the inventory values remain somewhat constant and do not fluctuate a great deal. In these cases, as a service to the Policyholder, the Provider may make available the same technology for those Policyholders maintaining coverage on a "reporting basis." When this occurs, the Provider may remind the Policyholder electronically, or by other means that the values may need to be reviewed. In these instances where the Policyholder uses the software to review inventories, the Provider shall instruct the Policyholder on the use of the software, etc.

Garagekeepers Coverage Reporting Procedure (Physical Damage Coverage for Vehicles Left in the Policyholders Care, Custody or Control)

When the policy is first written (or renewed), a determination of the maximum projected value kept in the Policyholder's Care, Custody or Control may be made. The value may also include the maximum value insured for any one vehicle. Periodically, the Provider may inquire what the exposures were during a certain period of time by posing questions such as: How many vehicles were serviced and repaired (during a stated period)? What was the average length of time the vehicles were stored? What were the values? A report from the Policyholder may be requested of the amount of time each auto was held by Policyholder for service or maintenance, etc. To assist each party, the software may also record a listing of each auto serviced or repaired (or left in the Policyholder's Care, Custody or Control) through the integration third party software (such as auto service industry software) or by other means. The outcome may be compared to the values insured under the policy and adjustments made when needed.

Garagekeepers Insurance may be written on a "blanket basis" and subject to an audit based on the amount of sales of repair, service, maintenance, storage, etc. In these instances, the software may expand to include the reconciliation process to determine the Exposure and premiums associated with such blanket coverage.

Garage Liability Policy—Reconciling Exposure Process

It has been noted that the policies are first setup on a Forecast of Exposure. It has also been noted that during the policy term intermittently, on a schedule or after the policy term is complete, the Policyholder or Provider or their representatives may update the Exposures.

The Deposit Premium, which was based on Forecasted Exposures, ultimately may be scrutinized, reconciled, and compared with the Actual (final) Premium. The software may allow the Policyholder, their Designated Entities or representatives, and the Provider to understand how the Forecasted Exposures and premiums are compared relative to the Actual Incurred Exposure(s) and Premium(s) for a specified time period of the policy (either during or after). When the reporting of the Exposures are input into the software by the Provider, Policyholder or either parties representative(s), the software may report the differences (if any) to all parties. Each time that policy information has been updated in the software, the Estimated Exposure(s) may be compared to the Actual Exposure and either party may make suggestions of what to re-forecast (if any) for the balance of the policy (based on what information is revealed).

If the comparison between the Forecasted Exposure and Actual Exposure occurs during the policy period, consideration is given to only the time that has lapsed from the starting day to the date in which the information has been established. The Forecasted Exposure may be prorated for the number of days that has lapsed since the beginning of the policy term and then used to compare to the Actual Exposure. For example, if a policy term was one year and the term in which the Actual Exposure was being compared to the Forecasted Exposure was on the 121st day of the 365 day policy, the software may calculate the portion or ratio of the policy term by dividing the 121st day by the 365 days, or 33.15% of the policy term.

The software may also allow other empirical approaches; to observe the results other than comparing the time period and the exposure. For example, if either party knew that during the summer month's labor would/could/should increase by a certain percentage or other means, the software may allow the user to also re-forecast this increase (for the time period). These reports may become available for each party to view and when needed allow additional contact between the parties. If the increase in volume has already occurred and is calculated into the Actual Exposure, either party may also note these observations as to how the decrease in volume for the term may affect the outcome of the final premium calculation. Each party may reference these observations and place memo notations, noting why the observation was considered; i.e. "Payrolls shall increase 200% in the months of May-September due to additional volume of business." etc.

The software may allow each party to better evaluate the potential of additional or return premiums, or guide or monitor potential effects on the ultimate premium. Through the proper use of the software system, the software may use prior year's Exposure information to be populated in the software from Policyholder's accounting software, Provider download from prior Policyholder policy periods, regional or area trends in the specific industries that represent the Policyholders business class, etc.

The software is flexible to manage other rating considerations which may be earned flat, (earned in whole when policy period begins and no part may be refunded or returned) or by other earned methods. For example, if a Provider includes a filing fee, policy fee, risk management fee, risk retention group fee, endorsement premium, and other fees, charges or premiums, the software may determine those charges on a different scale other than "prorated."

Once each person or Exposure has been identified in the software and their actual job duties, job title, employment status, the number of weeks worked for Policyholder, identification of their wages/payroll has been input, a spreadsheet may be exposed to each party revealing the cost of insurance for the specific term in which the information is valid. The software may ask additional questions such as whether the individual was furnished a vehicle, etc. The software is flexible to allow additional information about the individual when needed; for example if an individual earned overtime wages and the Provider did not rate the Policyholder's policy with the overtime wages, either party may discount these wages when proper, footnoting these anomalous circumstances may be available so that either party may understand the entry and observe the characteristics of what potential effect there is on the information being input. For example, if a business is a surf shop on the coast, the summer season's business may increase over the business that may be evaluated in the winter; the Exposure Forecast may not be consistent across the warmer seasons.

When the Exposure is determined on status as full time or part time, the Provider may define these and offer additional resources to view for the benefit of the proper classification for each employee. When the Exposure is determined on status of wages however, the software may also define what a wage is and in some policies may further limit a minimum payroll and maximum payroll as described above. Each individual that has been rated on the policy and has affected the premium shall be available for viewing with the total premium charged for the policy period.

This may be based on the gross number of hours worked during the policy period divided by the weeks the individual was employed during the policy period, if the result was equal to or less than the number of hours established as part-time, the individual shall be rated part-time, if not, the individual shall be rated as full-time. If the individual was hired after the policy began (during the policy period), the number of weeks the individual worked (the denominator) during the policy term shall be divided by the number of hours (the numerator) worked during the policy period.

During and/or after the policy term, the Policyholder may update the Exposure information as needed. Once the Exposure information has been updated, the findings from the reconciled Exposure(s) may be shared with both the Provider and Policyholder. The software may produce a worksheet that reveals the final information needed for the Provider to reconcile the final premium or simply identify discrepancies/misunderstandings, etc. The software may summarize the Actual Exposure and may also compare the Actual Exposure to the Forecasted Exposure. When the Actual Exposure is compared to Forecasted during the policy period, the summary shall be identified as an "interim summary." When the Actual Exposure is compared to Forecasted after the policy period, the summary shall be identified as a "final summary."

When the Policyholder/dealership has multiple locations, a separate worksheet for each location may be used due to the fact that each premium for each location may be different. The software may reconcile the locations into a summary so the parties can properly identify the premium calculations. Each employee that is identified to only work between locations, an allocation or percentage may be used on the calculation of their Exposure; i.e. John Doe works 7 days a month at an Arizona location and the balance of his time is at a California location the software may allocate John's time in AZ as 83 days per year divided by 365 days times the total Exposure and the balance of Exposure to the CA location, etc.

Additional Functions Available

Once the policy detail has been populated (either by means import from Policy Administration System or manual entry) into the software, the location addresses may be exposed to Provider and or third party software or by other means to determine if the customer's vehicles or inventory are subjected to flood hazards due to do the grade and/or elevation of where the lot is located.

Other Considerations

The software may automatically call, text, or email or otherwise notify with an emergency message to the proper person(s) when a severe storm is forecasted to occur at an insured location that has been registered by the software.

The software may automatically call, text or email or otherwise notify an emergency message to the proper person(s) when a theft or crime has occurred in the vicinity of an insured location or jobsite location that has been registered by the software. Information on how to mitigate the possibility of the Policyholder suffering damage or theft may also be available.

The software may automatically call, text or email or otherwise notify the proper person when the policy is about to cancel as a result of non-payment of premium or other reasons.

The software may automatically call, text or email or otherwise notify the Policyholder Loss Control recommendations when the location has been identified. Such as weather conditions that may affect injury to a worker, etc; i.e. a cold weather advisory from the weather bureau is anticipated in the area that an insured has been identified in the software, the Loss Control Dept may notify the proper person how to reduce the possibility of slip and fall injuries at the insured location (and to spread salt or other material to reduce injury to a worker or customer, etc.), or that building plumbing may be exposed to extreme cold and to reduce the likelihood of frozen pipes to allow the pipes to drip, etc.

The software may automatically call, text or email or otherwise notify each driver listed on the drivers list to notify them of driving conditions and what to do to mitigate the possibility of accidents or traffic conditions, or to notify the Policyholder not to allow a customer to drive a dealer auto while the ice conditions are present, etc.

The software may automatically call, text or email or otherwise notify the proper person at the dealership that a "scam artist", law breaker, or other individual wanted by authorities, is in the vicinity (or has been reported) and possibly a description of the person, personal information, and the scam or other issue that the individual is involved with, etc. The software may compare personal information to various databases, public or private to assist in making such a determination. This contact may be made for any policy type, including policies such as but limited to Crime and Fidelity policies.

The software is flexible to accommodate both the Provider and the Policyholder to modify the method in which the questions are posed. Other insurance coverage's that are comparative to the Garage Auto Dealer coverage's and exposures include Boat Dealers, Aircraft Dealers, Dealers of vehicles that have not yet been identified or invented and the like. Virtually the same type information may be requested periodically from the Providers of these coverage forms and the software may be expanded to address these anomalous needs of both the Provider and Policyholder. The use of the software by both Provider and Policyholder may also reduce the risk for both parties because each party may identify what the current cost of coverage is, access the risk during the policy period and each party may apply proper risk management if needed to the exposures, and the need to secure more coverage when inventories have increased, etc.

Garage Non-Dealers—Division 2 Policies

Garage Liability Setup of the Available Classification(s) and Territory(s) for Non-Dealer Garage Risks (Service & Repair Operations)

Policies for Division 2 businesses written to provide coverage for Automobile Garages both Repair or Service risks. These risks may perform the some of the same functions as those operations performed at Division 1 Garage businesses, but do not sell autos and are typically not licensed to do so.

When the policy is written as at step 100, 105, and 110, the information about the type business classified under a Non-Dealer Garage business may be exported or revealed into the software. This information may be the basic information about the operations such as what operations are rated or performed for the Exposures and other information needed for a Provider to properly issue or maintain coverage for the Policyholder. When this information is not captured from an export into the software from the Provider's Policy Administration System or other means, the software may need additional information input manually.

If the software has not been pre-populated either by Provider or imported from another source, questions may be posed: What is the Garage Classification(s) Code(s) for this Policyholder? The Provider may list the different type of business(es) or operation(s) defined by Classifications and display the options (user may select one or more if applicable). The software functions are flexible to update for the Provider's needs as the needs change to meet the obligations for the Policyholder.

After the input of the first Classification into the software a question is posed: "Do you want to add another Classification Code?" (question may be looped until answered "NO.") Each Class Codes may have a State to designate or location; each Class Code may be listed multiple times depending on the states of operation. Alternatively, the software may allow the Policyholder to select all operations by marking each Classification Code that apply.

Each of the Classifications that are available for a Division 2 Non-Dealer Garages may include:
  Auto Alarm Installation
  Auto Body Repair
  Auto or Diesel Repair
  Auto Glass and Repair
  Car Washes
  Construction Equipment Sales/Service
  Detailing/Clean-up
  Farm machinery Sales
  Gas Sales with Repair (Service Stations)
  Miscellaneous Service Station
  Motorcycle Repair and Service
  Parking Lots
  Quick Oil Changes
  Recreational Vehicle Repair and Service
  Snowmobile Repair and Service
  Stereo/Alarm Installation
  Storage Garages
  Storage or Parking Garage
  Tire Sales, Repair and Service
  Towing Operations
  Transmission Shop
  Truck Repair
  Tune up shop
  Undercoating/Accessory Installation
  Wholesale Automobile Parts
  Windshield/Glass Repair
  Window Tinting
  Other: (the software is designed to allow Providers with unique Policyholders exposures to expand offerings where appropriate to operations not described above; i.e. specific installation of handicap accessibility products, electronic motor vehicles, hovercraft, and vehicles that transport people or materials of all types including motor vehicle types that have not yet been invented or in the process of being developed, etc.)

The software may request more information about each category, including annual sales, payroll that supports those operations described or marked above, etc. The Provider may pose additional questions once the information is input into the software. For example, a garage business with Towing operations may "haul vehicles for hire," while other garage businesses may not haul for hire, just tow customers vehicles back to the garage business for repair. Providers may ask additional questions such as: Is the tow truck operations involve "repossessing activities?"

The Territory of Operations may automatically reference when the street address is entered into the software. The "Territory" of operations may be available to change in the software by Provider as the location(s) change. (state, city, township, county, parish, zip code, etc.)

Garage Liability Setup of Estimated Exposure(s)

Each of the estimated Exposure calculations are identified, determined, or described in the steps 100, 105, 110.

When a Garage Liability policy is written, it is typically written with a Deposit Premium based on Estimated Payroll(s) or Unit(s) or other Exposure by Classification(s) for each state, by location(s) which results into an Estimated Premium or Forecasted Premium. The Deposit Premium ultimately may be scrutinized, reconciled, and compared with the Actual (final) Premium. To determine if the Exposures during the policy term or after the policy term are maintained, a process is used to update the information needed to maintain a policy. Ultimately, this Exposure information may be compared to the actual exposure.

Examples of Questions Associated with a Garage Liability and Physical Damage Policy 455:

Garage Liability Setup of Proper Exposure/Rating Base (Payroll, Units, or Other) for Non-Dealer Garage Risks (Vehicle Service or Repair Operations)

The rating basis (Exposure) is established by the Provider. There may be several options (of Exposure) and Providers may select the option or method to determine Exposure. Provider defaults are available and the software is structured for the method which is best suited for the Provider and the Provider filing with the various jurisdictional authorities. Most often the "Payroll" of the employees/workers of Non-Dealer Garage risks is the measure of Exposure for Liability coverage and ultimately translates to a premium charge. Some Providers that may not use a measure of "Payroll" and use a different approach such as Units (as found in Division 1 policies) or other measure of Exposure, such as Sales, etc. Each measure of Exposure, whether Units, Payroll, or other method shall be identified for all parties to understand and properly maintain. Most often these Exposures were identified when the policy was first written or renewed. Providers may select the option or method they deem as Exposure as described in step 100, 105, 110. The software is flexible and defaulted to the preference of the Provider and the setup of how the policy was structured, sold, or negotiated.

When the policy premium is determined or rated based upon "Payroll," it involves a process of classifying each Owner, Employee and perhaps Non-Employee worker performing functions for the Policyholder based upon their function or responsibility working for the Policyholder. The software may allow the Provider to identify each individual whether Owners, Employees and or Non-Employee workers such as independent contractors. The Provider most often may identify two specific things about each individual; what their status of employment is (Owners, Employees and or Non-Employees) and how many weeks the person was employed. The information on the Employees and Non-employees may be carried forward from data captured as at step 210, 211, 225. This information includes date of employment, the number of hours worked for non-exempt employees per week (during the policy period). This information may be imported from accounting software or entered manually. If the software does not capture each Employee and Non-Employee and their respective Classifications, the software may ask more specific questions.

Once the list of employees are exposed, questions are posed: "What is this person's job functions?" To assist user drop down boxes may be available which include Owners, Receptionist, Clerical, Accounting, Service Tech, Service Manager, Auto Detailing, Auto Washing, etc. Each person may have several responsibilities and the software may allow the user to select more than one Classification. Each drop down box may associate the Garage Policy with a certain maximum Payroll limits, if applicable.

When the garage business has multiple locations, the employee(s), rating units, and exposure(s) shall be assigned to their proper location(s). A warning may be available allowing the user to know of a possible conflict or misunderstanding if a multiple location operation that does not properly assign the employee(s) to their individual respective location(s). If an individual is assigned to more than one location (because they rotate from one location to another), the software may allow a division of time between each location. In cases where there is more than one location and an employee has duties involving more than one location, additional questions are posed about their allocation of time between each location.

The actual amount of "payroll," the actual "payroll" or a "base payroll" (minimum or stated as a maximum) limit may be used for each of the Owner(s)/Partners/Member(s)/Officer(s) of Policyholder or Employees/Workers or non employees. These "Base Payroll" limitations used by the Policyholder's Provider is predicated by the amount of Payroll limitations filed with the respective Jurisdictional or State Insurance Departments. The Provider may set a Payroll limitation as a range from $0 to $ infinity (typically $100 per week of employment or up to $5,200 per year) or a constant wage/salary limitation as per the Jurisdictional Filing. If the Provider has dictated a minimum, maximum or excluded the Owner/Member/officer's payroll from the Garage Liability, a statement appears: "Payroll for Owner(s), Partners, Member(s), or Officer(s) have been pre-defined as {insert from payroll that is predefined} for the purposes of the premium calculation." There may be a difference in the values established between the organization type also, such as a Corporation, LLC, Partnership, etc. Additionally, the software may recognize that if the total payroll for non-owners is less than the total amount of maximum payroll per week (typically $100 per week maximum) that the Provider may use the lesser wage to charge the Policyholder for the non-owner, only the total payroll shall be used for the purposes of the premium calculation. For example if an employee was employed for 12 weeks and made only $600 for this period of time, the actual payroll may be used instead of the $100 per week. On the other hand however, if an owner made $600 for entire policy term, the maximum of $100 per week may be used, or $5,200.

The Provider may make available a guide as to what each Employee or Non-Employee's Classification of "Payroll" is. This guide may allow each Provider to provide established rules as to what determines the Exposure as a "Payroll" based policy. The Policyholder may view what the Provider classifies each employee and each non-employee; additionally, the software may show/alert the premium obligation for each individual and policy period. When a Policyholder decides to hire an individual, a budget "worksheet" may be available to calculate estimated premium costs associated with each hire, and if included in software may include the premium associated with companion coverages such as Workers Compensation, employee benefits, etc.

Division 2 Providers may use a different measure of Exposure than "Payroll," such as Units (as often found in Division 1 policies) or other measure of Exposure, such as Sales, number of units serviced or installed, or other measures that the Provider may deem as Exposure, etc. The software is flexible and defaulted to the preference of the Provider and the setup of how the Providers policies were structured, sold, or negotiated. Each measure of Exposure, regardless of whether Units, Payroll, or other methods may be identified for all parties to understand and properly maintain.

The Provider may make available what each Employee or Non-Employee's Classification of "Payroll" is. The Policyholder may view what the Provider classifies each employee and each non-employee; additionally, the software may show/alert the premium obligation for each individual. When a Policyholder decides to hire an individual, a budget "worksheet" may be available to calculate estimated premium costs associated with each hire, and if included in software may include the premium associated with companion coverage's such as Workers Compensation, employee benefits, etc.

Providers may use a different measure of Exposure than "Payroll," such as Units (as often found in Division 1 policies) or other measure of Exposure, such as Sales, number of units sold, or other measures that the Provider may deem as Exposure, etc. The software is flexible and defaulted to the preference of the Provider and the setup of how the Providers policies were structured, sold, or negotiated. Each measure of Exposure, regardless of whether Units, Payroll, or other methods shall be identified and defined for all parties to understand and properly maintain.

Once information about each employee and non-employee have been established from the steps above, a driver and non-driver list may be consolidated to allow each party to maintain the information as needed.

The software may use any or all of the following information to help establish a more complete analysis of the Garage risk; including but not limited to:
Full description of operations
Contact and Records information
Employees and Non-employees names, address, date of birth, drivers license #, SS #?
Employees duties
Method of Employees pay (drop down boxes may be available including salaried, hourly, piece mill, commissioned)
Once the method of pay for each employee is recognized, an additional question may be posed such as "How much does John Doe make on a hourly basis?"
Determination of Full or part time
Weeks Employed
Furnished Auto-Is employee furnished a covered auto?

Additionally, when an individual is not "employed" but is assigned to drive a specific vehicle or allowed to drive vehicles owned by the garage business, the Provider may calculate an additional premium charge for the exposure. The software is flexible to accommodate such an exposure. In these situations, the Provider may amend what the basis for the premium shall be based upon the specific circumstances and may be described as a "memo entry" (if no specific classification exists) as the Provider would handle these or title these anomalous scenarios.

Garage Liability Setup Questions of Owner(s)/Principals/Executive Officer(s)/Member(s) their Exposure Calculations and Proper Classification A question is posed: What are the Owner(s)/Partners/Member(s)/Officer(s) Garage Liability Class Code(s) and Description? (Note: A Division of Labor rule does not normally exist for Owner(s) or Executive Officer(s)). The Class Code number and Description of the Classification(s) that are applicable for the Owner(s)/Partners/Member(s)/Officer(s) may appear as radio buttons or drop down box(es). The Provider is the initial source in determining the proper Classification for the owner and may have Classifications defaulted in the software, or if not, a space is provided for the Classification.

A question is posed: Are there any Non-Active Owner(s)/Partners/Member(s)/Officer(s)? Y/N? If "Yes," the user selects the individual(s) that are Non-Active using drop down box(es) or radio buttons that describes the specific description of the individual(s), with options such as "Non-Active," "Owner," "Investor," "Retired," or "Other;" when the "Other" box has been selected the user has the opportunity to describe what "Other" means in a text field. Additionally, when there are Owner(s) that are not active, the payroll may be $0, Provider dependent. However, if this individual drives a Policyholder's auto or a customer's auto, this may eliminate their status as non-active due to the use of a garage auto.

Additional questions pertinent to the insurance policy may be posed of the Policyholder. For example: Does the {insert name of each owner} maintain a Personal Auto Insurance Policy? If the answer is "No," the software may notify Policyholder electronically or by other means of a deficit in coverage. Provider may notify Policyholder how to cover this exposure to a loss with (the proper) insurance, titled "Drive Other Car" coverage. If the answer is "Yes," then a message is sent electronically to the Policyholder or by other means that "If this coverage is terminated the Provider should be notified."

Garage Liability Setup Questions about Workers/Employees (Non-Owner(s) or Non-Officer(s)) their Exposure Calculations and Proper Classification A series of drop-down boxes may be exposed to establish whether the non-owner employees/workers are considered either full time or part time status. Consideration may be given to the number of weeks worked, the number of hours worked each week, employee's job title, whether the employee was supplied an auto, whether they were active in the business, etc.

A question is posed "Are any additional person(s) to be added to the employee list?" Expose all drivers on the list to the Policyholder and the software may pose questions such as: "Are any additional person(s) to be added or deleted from this list?

Determination of Whether an Employee is Full-Time or Part-Time

Each employee/worker may be listed including date hired. An import from the accounting software or other record keeping software may be received into the software. When an employee/worker is non-exempt (non-salaried) and is employed by-the-hour, or piece mill basis. The import from the software may also import these hours per week when maintained by the accounting or record keeping software. The software may calculate the average hours per non-exempt employees when each non-salaried employee's name and the number of hours worked each week When the employee is exempt (salaried) by the Policyholder, the software may be defaulted to recognize this person as a full-time employee.

When the Policyholder's Exposure is based on Payroll, the premium calculation may have a certain minimum/maximum per employee or the use of the Actual Payroll per employee. Defaults are available for Providers to maintain the proper structure for each policy, by state, by program filing, etc.

In cases where employees are considered part time, the software may adjust the rating factors to adjust the premium. These circumstances are similar cited under the Division 1 policies such as Class 1-A. This part time rule may apply to other classes as well; these circumstances are determined by the Provider.

The software is flexible to allow the Provider to amend the basis of identifying exposure and charging a premium from "Payroll" to other basis such as "Sales," "Units," etc.

Garage Liability Questions about Subcontractors/Independent Contractors and Exposure The use of independent contractors may increase risk to all parties and the software recognizes the independent contractors that may be used by Policyholders with Garage Liability. The question is posed: Are subcontractors used to perform services on the Policyholder's behalf? If there are no Subcontractors, Non-Employees or Independent Contractors, the software may not pose additional questions until the Periodic Review as determined by either party. The software may periodically pose questions about this exposure, and may be defaulted to do so based upon the Provider's needs.

When the answer is "Yes" to the question posed about the use of Subcontractors, further questions posed may include: Do the Subcontractor(s) maintain their own Garage Liability, General Liability, or Commercial Auto Policies? If "Yes," evidence of the insurance may be attached within the software as stated in step 605, 610, 615. The software may pose questions that are relevant to the Provider in determining if there are additional or increased risks or hazards inherit with the Policyholder using these Non-Employees or Subcontractors. For example: What specifically does the individual (Subcontractors) do for the business? Are any Subcontractors authorized to drive a garage vehicle? Are anymore individuals to be added to the drivers list/employee list/subcontractors list? What do they do for the dealership business?

An example of one of these anomalous circumstances is when a Policyholder's automotive repair business is not capable to tow a customer's auto, the Policyholder may contact a towing company to deliver their customer's disabled auto to the Policyholder's shop for repair. These "subcontracted" services may increase the hazard and exposure to a loss for both Policyholder and Provider.

When these questions are answered, the answers may be exposed to the Provider. The Provider may need additional information. Each question and the Policyholder's answer may influence how the Provider may handle, manage the risk, or charge (or not charge) for the Policyholder's premium, etc. Each Provider may treat those Subcontractors with their own insurance differently than those without insurance. The Provider may have flexibility in designing the questions that best suit the circumstances and underwriting concerns.

When there are premium charges associated with the Subcontractor(s), each Subcontractor may be properly marked in the software and may be exposed on the premium calculation worksheet, or may be included with the employees with special notation of the individual(s) status as a Subcontractor (or Independent Contractor).

Garage Liability Questions about Companion Liability Forms

The Division 2 Garage Liability Policies may be complimented by other coverage parts including
   Medical Payments
   Customer Rental Coverage
   Autos Held For Sale (non-dealers)

In some cases companion forms of coverage are not applicable to the Division 2 Garage policies. The software is flexible and recognizes when coverage for the companion coverage is structured under an alternate insuring agreement such as a Commercial Auto Coverage form, etc.

Hired Liability Insurance (Liability for vehicles rented on behalf of the Garage business, but not the rental of vehicles to others)

When this policy coverage is selected, the premium is often calculated on the amount paid by the Policyholder for "renting autos." When the policy was written/renewed at step 100, 105, 110, the Hired Liability coverage may have Forecasted the Exposure and charged the Policyholder for the Forecasted Exposure. Periodically, the Provider may ask the Policyholder what the expenses (receipts) have occurred during the policy period for the renting of vehicles. This information is then available to be compared with the Forecasted amount of expenses (receipts).

Non-Owned Liability Insurance

When this policy coverage is selected, the premium is often calculated on the quantity, amount or number of employees (regardless of whether these employees are drivers or not). When the policy was written/renewed at step 100, 105, 110, the Non-Owned Liability coverage may have Forecasted the Exposure and charged the Policyholder for the Forecasted Exposure. Periodically, the Provider may ask the Policyholder how many employees were employed during the policy period. This number may be based on an average or the total quantity at any point during the policy term. Defaults for the proper setting of average or total may be available for the Provider select. This information is then available to be compared with the Forecasted amount. Additionally, the software may calculate the number of employees as determined through the Garage Liability (or General Liability) reconciliation process.

Drive Other Car Liability Insurance

If the policy does not include an endorsement covering the Owner(s)/Principals/Executive Officer(s)/Member(s) while driving another person's vehicle (not on company business), a question is posed: Do the Owner(s)/Principals/Executive Officer(s)/Member(s) referenced maintain a Personal Auto Policy? If the answer is "Yes," then a message is sent electronically to the Policyholder or by other means that if this coverage is terminated the Provider should be notified. If the answer is "No," the software may notify Policyholder electronically or by other means of the deficit in coverage. Provider may notify Policyholder how to cover this exposure to a loss with (the proper) insurance. The typical coverage is titled "Drive Other Car" coverage.

Garagekeepers Coverage Reporting Procedure (Physical Damage Coverage for Vehicles Left in the Policyholders Care, Custody or Control)

When the policy is first written (or renewed), a determination of the maximum projected value kept in the Policyholder's Care, Custody or Control may be made. The value may also include the maximum value insured for any one vehicle. Periodically, the Provider may inquire what the exposures were during a certain period of time by posing questions such as: How many vehicles were serviced and repaired (during a stated period)? What was the average length of time the vehicles were stored? What were the values? To assist each party, the software may also record a listing of each auto serviced or repaired (or left in the Policyholder's Care, Custody or Control) through the integration third party software (such as auto service industry software) or by other means. The outcome may be compared to the values insured under the policy and adjustments made when needed.

Garage Liability Policy—Reconciling Exposure Process

It has been noted that the policies are first setup on a Forecast of Exposure. It has also been noted that during the policy term intermittently, on a schedule or after the policy term is complete, the Policyholder or Provider or their representatives may update the Exposures.

The Deposit Premium, which was based on Forecasted Exposures, ultimately may be scrutinized, reconciled, and compared with the Actual (final) Premium. The software may allow the Policyholder, their Designated Entities or representatives, and the Provider to understand how the Forecasted Exposures and premiums are compared relative to the Actual Incurred Exposure(s) and Premium(s) for a specified time period of the policy (either during or after). When the reporting of the Exposures are input into the software by the Provider, Policyholder or either parties representative(s), the software may report the differences (if any) to all parties. Each time that policy information has been updated in the software, the Estimated Exposure(s) may be compared to the Actual Exposure and either party may make suggestions of what to re-forecast (if any) for the balance of the policy (based on what information is revealed).

If the comparison between the Forecasted Exposure and Actual Exposure occurs during the policy period, consideration is given to only the time that has lapsed from the starting policy date to the date in which the information has been established. The Forecasted Exposure may be prorated for the number of days that has lapsed since the beginning of the policy term and then used to compare to the Actual Exposure. For example, if a policy term was one year and the term in which the Actual Exposure was being compared to the Forecasted Exposure was on the 121st day of the 365 day policy, the software may calculate the portion or ratio of the policy term by dividing the 121st day by the 365 days, or 33.15% of the policy term.

The software may also allow other empirical approaches to observe the results other than comparing the time period and the exposure. For example, if either party knew that during the summer month's labor would/could/should increase by a certain percentage or other means, the software may allow the user to also re-forecast this increase (for the time period). These reports may become available for each party to view and when needed allow additional contact between the parties. If the increase in volume has already occurred and is calculated into the Actual Exposure, either party may also note these observations as to how the decrease in volume for the term may affect the outcome of the final premium calculation. Each party may reference these observations and place memo notations, noting why the observation was considered; i.e. "Payrolls shall increase 200% in the months of May-September due to additional volume of business." etc.

The software may also automatically or manually evaluate the potential for injury by analyzing relative information or through the use of third party software to help each party better evaluate the potential of additional or return premiums, or guide or monitor potential effects on the ultimate premium. The software may use prior year Exposure information to be populated in the software from Policyholder's accounting software, Provider download from prior Policyholder policy periods, regional or area trends in the specific industries that represent the Policyholders business class, etc.

The software is flexible to manage other rating considerations which may be earned flat, (earned in whole when policy period begins and no part may be refunded or returned) or by other earned methods. For example, if a Provider includes a filing fee, policy fee, risk management fee, risk retention group fee, endorsement premium, and other fees, charges or premiums, the software may determine those charges on a different scale other than "prorated."

Once each person or Exposure has been identified in the software and their actual job duties, job title, employment status, the number of weeks worked for Policyholder, identification of their wages/payroll has been input; a spreadsheet may be exposed to each party revealing the cost of insurance for the specific term in which the information is valid. The software may ask additional questions such as whether the individual was furnished a vehicle, etc. The software is flexible to allow additional information about the individual when needed; for example if an individual earned overtime wages and the Provider did not rate the Policyholder's policy with the overtime wages, either party may discount these wages when proper, footnoting these anomalous circumstances may be available so that either party may understand the entry and observe the characteristics of what the potential effect there is on the information being input. For example, if a business is a surf shop on the coast, the summer season's business may increase over and if the business is evaluated in the winter, the Exposure Forecast may not be consistent across the warmer seasons.

When the Exposure is determined on status as full time or part time, the Provider may define these and offer additional resources to view for the benefit of the proper classification for each employee. When the Exposure is determined on status of wages however, the software may also define what a wage is and in some policies may further limit a minimum payroll and maximum payroll as described above. Each individual that has been rated on the policy and has affected the premium shall be available for viewing with the total premium charged for the policy period.

This may be based on the gross number of hours worked during the policy period divided by the weeks the individual was employed during the policy period, if the result was at or less than the number of hours established as part-time, the individual shall be rated part-time, if not, the individual shall be rated as full-time. If the individual was hired after the policy began (during the policy period), the number of weeks the individual worked (the denominator) during the policy term shall be divided by the number of hours (the numerator) worked during the policy period.

During and/or after the policy term, the Policyholder may update the Exposure information as needed. Once the Exposure information has been updated, the findings from the reconciled Exposure(s) may be shared with both the Provider and Policyholder. The software may produce a worksheet that reveals the final information needed for the Provider to reconcile the final premium or simply identify discrepancies/misunderstandings, etc. The software may summarize the Actual Exposure and may also compare the Actual Exposure to the Forecasted Exposure. When the Actual Exposure is compared to Forecasted during the policy period, the summary shall be identified as an "interim summary." When the Actual Exposure is compared to Forecasted after the policy period, the summary shall be identified as a "final summary."

When the Policyholder/dealership has multiple locations, a separate worksheet for each location may be used due to the fact that premium for each location may be different. The software may reconcile the locations into a summary so the parties can properly identify the premium calculations. Each employee that is identified to only work between locations, an allocation or percentage may be used on the calculation of their Exposure; i.e. John Doe works 7 days a month at an Arizona location and the balance of his time is at a California location the software may allocate John's time in AZ as 83 days per year divided by 365 days times the total Exposure and the balance of Exposure to the CA location, etc.

Additional Functions Available

Once the policy detail has been populated (either by means import from Policy Administration System or manual entry) into the software, the location addresses may be exposed to Provider and or third party software or by other means to determine if the customer's vehicles are subjected to flood hazards due to do the grade and/or elevation of where the lot is located.

Other Considerations

The software may automatically call, text, or email or otherwise notify an emergency message to the proper person(s) when a severe storm is forecasted to occur at an insured location that has been registered by the software.

The software may automatically call, text or email or otherwise notify an emergency message to the proper person(s) when a theft or crime has occurred in the vicinity of an insured location or jobsite location that has been registered by the software. Information on how to mitigate the possibility of the Policyholder suffering damage or theft may also available.

The software may automatically call, text or email or otherwise notify the proper person when the policy is about to cancel as a result of non-payment of premium or other reasons.

The software may automatically call, text or email or otherwise notify the Policyholder Loss Control recommendations when the location has been identified. Such as weather conditions that may affect injury to a worker, etc; i.e. a cold weather advisory from the weather bureau is anticipated in the area that an insured has been identified in the software, the Loss Control Dept may notify the proper person how to reduce the possibility of slip and fall injuries at the insured location (and to spread salt or other material to reduce injury to a worker or customer, etc.), or that building plumbing may be exposed to extreme cold and to reduce the likelihood of frozen pipes to allow the pipes to drip, etc.

The software may automatically call, text or email or otherwise notify each driver listed on the drivers list to notify them of driving conditions and what to do to mitigate the possibility of accidents or traffic conditions, or to notify the Policyholder not to allow an employee to drive a garage auto while the ice conditions are present, etc.

The software may automatically call, text or email or otherwise notify the proper person at the dealership that a "scam artist" is in the vicinity (or has been reported) and a description of the person and the scam that the individual is involved with, etc.

The software is flexible to accommodate both the Provider and the Policyholder to modify the method in which the questions are posed. Other insurance coverages that are comparative to the Garage Non-Dealer coverages and exposures include Boat Repair, Aircraft Repair, Repair operations of vehicles that have not yet been identified or invented and the like. Virtually the same type information may be requested periodically from the Providers of these coverage forms and the software may be expanded to address these anomalous needs of both the Provider and Policyholder. The use of the software by both Provider and Policyholder may also reduce the risk for both parties because each party may identify what the current cost of coverage is, access the risk during the policy period and each party may apply proper risk management if needed to the exposures, and the need to secure more coverage when exposures have increased, etc.

Additionally, in the event the Garage policy is not sufficient enough to properly cover the "liability exposures" to the public, etc. (under the Garage Policy portfolio), the Provider may also recommend other coverages such as General Liability, or Commercial Auto to the Garage policy portfolio when needed.

Commercial Auto and Truckers Liability and Physical Damage 460

The premium is determined based on the number of power and non-power units (vehicles), by garaging location, value (or cost new), radius of operations, gross vehicle weight capacity, use by Classification, the number employees, and other rating variables as stated in the process and examples of Questions below 465:

Vehicle Liability Insurance

Certain policies may cover autos/trucks/fleet/vehicles subject to motor vehicle laws secured or bought before or during the policy; even if not listed on the policy. These broad coverages may still require an eventual report to be sent to the Provider and premium charged from the date the vehicle was placed into service. Additionally, these policies may also be changed when a vehicle(s) has been taken out of service, disposed, became inoperable, sold, or traded, etc.

The beginning vehicle schedule is exposed to the Policyholder from the Provider to review and make appropriate changes (additions or subtractions). Depending on the size of the Policyholder's fleet/vehicle schedule the Provider may determine the specific periods in which to request an update to the schedule.

Periodically, the software may access the various data banks of information available to Providers from the jurisdictions motor vehicle departments to also determine if any vehicles are missing from the schedule. When vehicles do not appear to be registered or do not appear on the insurance policy, notifications may be sent from the Provider to the Policyholder about this discrepancy.

Further questions may be asked about each vehicles size, vehicle identification number, the purpose or use of the vehicle, gross vehicle weight capacity, and the radius of operations, etc. The software may pre-populate items such as gross vehicle weight capacity directly from the alpha-numeric vehicle identification numbers or type of vehicle, etc.

A request from Provider to the Policyholder may occur when the garaging location is not listed on the policy. The Provider may also pose a question next to the schedule of vehicles: "What state is this vehicle titled?" The purpose for this is to assist the Policyholder is assigning or confirming the proper rating territory.

Additional warnings may be exposed and sent to the Policyholder if there is an indication that the auto is still owned, but not in service or inoperable. The warning may state to the user to collect the tags and keys and place inside an envelope and write on the outside of the envelope "Do not place this vehicle until added back to policy schedule." The Policyholder may be notified to instruct all employees that the vehicle has been taken off the insurance policy. The Policyholder may also be instructed to place envelope into a locked cabinet. Additionally, the Policyholder may be notified to contact the Dept of Motor Vehicles or the jurisdiction that governs the Motor Vehicle Laws that the vehicle is not presently being used, or is out of commission. This is especially true if the Provider may notify the authority of the fact that the vehicle is not covered by the state mandated limit of coverage. Specific state or jurisdiction instructions may also be exposed to the Policyholder when available by the Provider; this may include who to contact, and the proper address, etc.

Hired Liability Insurance (Liability for Rented Vehicles)

When this policy coverage is selected, the premium is often calculated on the amount spent by the Policyholder for "renting autos." When the policy was written/renewed at step 100, 105, 110, the Hired Liability coverage may have Forecasted the Exposure and charge the Policyholder for the Forecasted Exposure. Periodically, the Provider may ask the Policyholder what the expenses (receipts) have occurred during the policy period for the renting of vehicles. This information is then available to be compared with the Forecasted amount of expenses (receipts).

Non-Owned Liability Insurance

When this policy coverage is selected, the premium is often calculated on the quantity, amount or number of employees (regardless of whether these employees are drivers or not). When the policy was written/renewed at step 100, 105, 110, the Non-Owned Liability coverage may have Forecasted the Exposure and charged the Policyholder for the Forecasted Exposure. Periodically, the Provider may ask the Policyholder how many employees were employed during the policy period. This number may be based on an average or the total quantity at any point during the policy term. Defaults for the proper setting of average or total may be available for the Provider to select. This information is then available to be compared with the Forecasted amount of expenses (receipts).

Drive Other Car Liability Insurance

If the policy does not include an endorsement covering the Owner(s)/Principals/Executive Officer(s)/Member(s) while driving another person's vehicle (not on company business), a question is posed: Do the Owner(s)/Principals/Executive Officer(s)/Member(s) referenced maintain a Personal Auto Policy? If the answer is Yes, then a message is sent electronically to the Policyholder or by other means that if this coverage is terminated the Provider should be notified. If the answer is No, the software may notify Policyholder electronically or by other means of the deficit in coverage. Provider may notify Policyholder how to cover this exposure to a loss with (the proper) insurance. The typical coverage is titled "Drive Other Car" coverage.

Vehicle Physical Damage Insurance

Certain policies may cover autos/trucks/fleet/vehicles subject to motor vehicle laws secured or bought before or during the policy; even if not listed on the policy. These broad coverages may still require an eventual report to be sent to the Provider and premium charged from the date the vehicle was placed into service or acquired. Additionally, these policies may also be changed when a vehicle(s) has been taken out of service, disposed, became inoperable, sold, or traded, etc.

The beginning vehicle schedule is exposed to the Policyholder from the Provider to review and make appropriate changes (additions or subtractions). Depending on the size of the Policyholder's fleet/vehicle schedule the Provider may determine the specific periods in which to request an update to the schedule.

Hired Physical Damage Insurance (Physical Damage to Rented Vehicles)

When this policy coverage is selected, the premium is often calculated on the amount spent by the Policyholder for "renting autos." When the policy was written/renewed at step 100, 105, 110, the Hired Physical Damage coverage may have Forecasted the Exposure and charged the Policyholder for the Forecasted Exposure. Periodically, the Provider may ask the Policyholder what the expenses (receipts) have occurred during the policy period for the renting of vehicles. This information is then available to be compared with the Forecasted amount of expenses (receipts).

Commercial Auto Policy Companion Coverages

Other coverage may also be updated such as Uninsured Motorist/Under-insured Motorist coverages that may be affected by deletion and additions as stated above.

Commercial Auto Policy

When the garaging location is listed on the policy or the policy premium is based on the territory of the garaging location, a cross reference is exposed to the Provider (such as the Provider's territory lists) to assist in verifying the proper territory is accurate for the garaging location. A portal is available for the user to forward the vehicle(s) schedule (electronically or by other means) that are assigned to the driver, fleet manager, or maintenance person to complete additional unanswered questions such as the garage location, use, assigned drivers, etc.

Commercial Auto Policy—Reconciling Exposure Process

During and after the policy term, the Policyholder may update the Exposure information as needed. Once the Exposure information has been updated (data input), the software transforms the information allowing all parties to properly and understandably account for each vehicle and premium (by Classification) and allows each party in the insurance transaction to identify and correct potential misunderstandings or risk and reconcile each area as Exposure(s) occur. Each person/department that has an interest may have access to the information.

Periodically, the software may import a list of all vehicles licensed/registered in the states in which the Policyholder has operations from the jurisdictional authority/state DMV. The imported list of registered vehicles is then compared to the list of vehicles listed on the policy. If there are any listed on DMV report, a notice from Provider to Policyholder may be sent either electronically or other means letting the Policyholder know that there is a deficit. Additionally, the software may allow the Provider to utilize technology (third party software or other technology) to identify all drivers within a household of an employee of a garage risk to enable Provider all available potential driver information associated with such risks; especially those employees that are allowed to drive a Policyholder's vehicle home, etc. (Example: Report from State Motor Vehicle Bureau (or other bureau) reveals son, age 19 in household of Owner of dealership that had been previously undisclosed and who had regular use of covered vehicles)

Additionally, the software may share the "real time" data with the proper department of interest that may allow analytics and allow actuarial calculations as they occur.

Other Considerations

The software may automatically call, text, or email or otherwise notify an emergency message to the proper person(s) when a severe storm is forecasted to occur at an insured location that has been registered by the software.

The software may automatically call, text or email or otherwise notify an emergency message to the proper person(s) when a theft of vehicles has occurred in the vicinity of an insured location.

The software may automatically call, text or email or otherwise notify the proper person when the policy is about to cancel as a result of non-payment of premium or other reasons.

The software may automatically call, text or email or otherwise notify each driver listed on the drivers list to notify them of driving conditions and what to do to mitigate the possibility of accidents or traffic conditions.

The software is flexible to accommodate both the Provider and the Policyholder to modify the method in which the questions are posed. Other insurance coverages that are comparative to the Garage Dealer coverages and exposures include Floor Plan Physical Damage insurance that is offered through certain financial institutions and lenders that finance vehicles or other items for their clientele (such as a motor vehicle dealer). This coverage may insure the inventory with a Provider but the Provider may require that the financial institution track the inventory that is to be covered. Premium charges may be based on the same functions as Garage Physical Damage. The software may track these inventories and may be flexible and expandable to accommodate such operations.

The software is able to allow the Policyholder to report mileage driven in insured vehicles by the commercial auto policy at periodic intervals. These reports may be needed to comply with policy provisions requiring the Policyholder to report mileage for policies commonly known as "pay-as-you-go auto insurance," or "pay-per-mile auto insurance," etc.

Property Insurance with Blanket Provisions Subject to Reconciliation 470

Types of Coverages

Certain insurance policies that insure property both real and other property may be written on a "blanket basis." The blanket policy may insure the property for future acquisitions; whether purchased, newly built, or pre-existing inventory of property when the policy begins. The process to determine premium and exposure may be based on all presently owned property, acquisitions (such as property being bought or built) during the policy period and deletions (such as property sold or traded during the policy period). These coverages include bank owned property acquired through foreclosure or repossession property (or by other means), property built by contractor or owner(s), inland marine coverage such as mobile equipment, jewelry, watches, furs, fine art, collectibles, antiques, etc as stated in step 470. Each policy may limit the maximum value per item, piece, location, and may limit the maximum value per policy (aggregate).

Examples of Questions associated with a Property/Inland Marine Insurance Policy with Blanket Provisions 475: Provider may have basis of Exposure defaulted into the software from information obtained from information gathered from the 100 and 200 series above but may address additional information needed to assess the exposure.

Basis of Inventory and Forecast for Future Exposures

The software recognizes values may fluctuate as inventory is acquired, sold, or traded. The Policyholder may need to insure the values with the basis cost or value of the inventory. The process involves determining the Beginning Inventory during each reporting period and then comparing with the Ending Inventory by the Policyholder exposing the information when requested to do so or as per specific Provider's policy provisions.

Once the Policyholder's Forecasted Exposures are input into the software 105 there may be a corresponding premium(s) forecast. Under most circumstances a Provider may invoice/bill a premium(s) based off this Forecasted Exposure (many times referred to as a "deposit premium.") Most often, premiums derived from Forecasted Exposures are not the final premium that the Provider may charge the Policyholder.

Reporting Options

The software allows for various policy types to be addressed; (Monthly reporting with completed values, Monthly reporting per start, Annual auditable gross receipts, Annual auditable completed value) Regardless of which type policy is being addressed with the software, specific information may be input (imported or manually) about various risk, such as but not limited to; New construction estimates, Model homes, Homes currently in inventory, Construction trailer(s), Multi-family and questions related to optional coverages. Examples of optional coverages may be "include-flood, Earthquake, soft costs, construction loan interest, engineering or supervisory fees and an input for "other".

Protection Class Identification including Subscription

Additionally, in cases when the property policy insures a building, the software may utilize and identify the proper Fire Department or Protection Class ratings of the responding Fire Department. This method shall utilize programs, third party software, or other means to help all parties to the insurance contract identify who responds to a fire at the building. The process may also identify the number of miles to the responding fire departments, the number of feet to the nearest fire hydrant(s), the distance to other hazards that may increase the risk of casualty or property damage.

The software may also identify whether the Policyholder has subscribed to the responding fire department using third party software in use, being created or created or by other means. When the Policyholder has not subscribed to their fire department, the software may notify the Policyholder electronically or by other means to let them know or remind them that this is needed. After a certain amount of time lapsed, the software may access the third party software or by other means to confirm that the Policyholder has subscribed. If so, the Policyholder may receive from the Provider a notification that the policy records have been updated. If no subscription to the fire department was obtained, a notification may be sent out from the Provider to the Policyholder notifying the pending rate change or other underwriting decisions that may be made by the Provider.

Maximum Property limit Alerts

The software may also recognize if the value of a reported structure exceeds the maximum value or policy limits. If such values are exceeded or within an amount predetermined by Provider to cause an "alert," the software may notify all parties of the potential or actual deficit in coverage.

The software recognizes these additions and reconciles the values against the policy limits stated in the contract.

Examples of questions posed by the software;

Blanket Builders Risk General Questions

- Location Address: to include Lot, Subdivision Name, Physical Street Address, City, State, Zip and County.
- How often is (Policyholder name inserted) required to report new inventory to the Provider? Monthly, Quarterly, Semi-Annual, Annual, Other—Describe. (radio buttons)
- Type Construction: Residential, Commercial Building, Remodel Residential, Remodel Commercial or Other—Describe: _____ [radio button]
- Type of Building: Frame, Masonry with Wood Roof Joists, Metal Non-Combustible, Masonry with Non-Combustible Roof Joists, Other: Describe: _____. [radio button]
- Date Construction Started (may contain carry over inventory, calendar exposed)
- Date Construction was Completed [calendar exposed] this question is not going to be updated till the building is out of inventory.
- Speculative Construction? Yes/No. If the question is answered "No," a question is posed: Was this building built for someone else as a Custom Construction project? Yes/No. If Yes, include Owner(s) name, add another Owner Y/N if YES loop till "No."
- Is there a mortgage on this construction project? Yes/No. If Yes, include mortgagee's name, add another Owner Y/N if Yes loop till No.
- Total Value upon completion (sales price minus cost of land) $ _____. Does the Policyholder include Profit on the Builders Risk Policy? Y/N if Yes, on the question below about the value, the question may need to have the value to include profit. An estimate of profit as fixed price or a percentage of job value (radio button). If profit is excluded from the policy, then software may periodically notify the Policyholder that the value to be reported should exclude profit and primarily report the forecasted cost to complete each project/insured location.
- Is any property located outside of a "protected" fire Public Protection Class®? If yes, software may ask for such property to be listed.

As mentioned in previous paragraph, Inland marine coverage such as mobile equipment, jewelry, watches, furs, fine art, collectibles, antiques, etc as stated in step 470 may be tracked and reconciled within the software. Any such "property" may be asked similar questions (as above builders risk) to determine beginning values, location of property, and allow for changes, additions and eventual reconciliation to be made within the software to assess the risk at the beginning, during and after the policy period.

Identifying Carry-Over Inventory for Renewal

When the policy term has ended, those units that are not completed or unsold should be identified as such. The final document should state; "unfinished or unsold." When the person sets up their renewal for the Blanket Builders Risk, those units that were "unfinished or unsold" should carry over to the next policy term. For the renewal term under "Date Started" there is an automatic field that says "Carry Over from Policy Term." When there are carry over locations that continue on to the renewal policy term the Start Date for those units should be the renewal effective date and directly underneath it a caption with the words "carry over inventory" should be stated.

In cases where the Provider is not the insurance company (but the agency, etc.) a new policy may be written with a new Provider and carry over inventory should be updated, warning flags may be prominently displayed to assure new Provider understands assumption of risk with "carry over inventory."

Other Considerations

The software may automatically call, text, or email or otherwise notify an emergency message to the proper person(s) when a severe storm is forecasted to occur at an insured location or job site location that has been registered by the software.

The software may automatically call, text or email or otherwise notify an emergency message to the proper person(s) when a theft or crime has occurred in the vicinity of an insured location or job site location that has been registered by the software. Information on how to mitigate the possibility of the Policyholder suffering damage or theft may also available.

The software may automatically call, text or email or otherwise notify the proper person when the policy is about to cancel as a result of non-payment of premium or other reasons.

The software may automatically call, text or email or otherwise notify the Policyholder Loss Control recommendations when the location has been identified. Such as weather conditions that may affect the insured building plumbing may be exposed to extreme cold and to reduce the likelihood of frozen pipes to allow the pipes to drip, etc. Additionally, these warnings may also reiterate that the policy will not cover damage to structures from busted pipes resultant from failure to maintain heat.

The software is flexible to accommodate both the Provider and the Policyholder to modify the method in which the questions are posed and other type of property coverages. Other insurance coverages may include policies such as Agricultural Farm Property, Crop Damage coverages, etc.

To benefit each party and to properly insure the business, the software is flexible and may import information from third party software that may access information from such as surveys, building occupancy, building diagrams, aerial views, satellite views or other images, view and determine distance to utilities and fire hydrants, view and determine distance to bodies of water, view and determine distance to fire or police department records such as call history involving fires, thefts and other emergency calls. This pertinent information may also verify the information obtained during the application and/or verify that there have been no changes in the conditions or exposures in the property or the variables that may affect the premium charged.

The software may "mine", "spider" and/or otherwise retrieve information out of other computers or other programs by importing information from building permits in the area on a Policyholder level or region level specifically. This information may assist the Provider to understand the potential for extraordinary losses in the event of a catastrophic event. Other databases and/or locations may have information which may be retrieved by the software for these or other purposes.

Additionally, geographic information system (GIS) technologies may be used once the address of the property has been input into the software. The software may allow Providers to recognize extraordinary concentration (proximity) of risk in specific areas among other policyholders within the Providers universal book of business. This advanced tool which identifies risk to the Provider may also work among multiple lines of insurance business. For example, should a construction company build inside a neighborhood where the property values are significant, the Provider may recognize this concentration across other lines of business; such as Homeowners Insurance policies written inside the same neighborhood or area, or other coverages that may increase the risk of significant value in the event of a "catastrophic event," etc. This repository and internal geocoding of information on each insured property also may allow the Provider to further mitigate a potential loss by securing specific reinsurance for the project or area due to the concentration of risk, especially on blanket coverage where often the Provider may not realize the location until well after the coverage has ran its course.

The software may notify the Policyholder of the potential for having an uncovered claim in certain areas (when coverage is not recognized). For example, if a General Contractor is building a water treatment plant and an installation contract involves placing pumps and other electronic equipment, the software may notify the Policyholder of the need to add "Equipment Breakdown Insurance" to the builders risk insurance. This coverage would protect the electronic equipment with insurance when damage occurs from a drop in electrical current or other circumstances that may cause damage during the testing phase and other phases of the installation before the certificate of completion is made, etc.

Process of Verification of Accuracy of Exposure Based Policies 480

Once the forecasted Policyholder's Exposure Based Information 400 is loaded into software (either by import or manually entered), the Policyholder should verify the data is accurate. If not confirmed accurate by Policyholder, all parties to the transaction shall be notified electronically or by other means. If not verified as accurate, the Policyholder and the Provider can determine the misunderstanding or mistake. Once verified accurate, the Policyholder may begin updating the Exposure based information as early as immediately after incurred (Actual Exposure) or as late as after the policy period has ended as in step 480. After the Policyholder updates the Actual Exposure(s) during or after the policy period, the software is enabled to produce a report which may reconcile and compare the Forecasted to Actual Exposure, thus allowing all parties to understand whether the Policyholder has over-funded or under-funded their Exposure Based Policy as at step 485. An Administrative Level function allows each party to the insurance transaction (whether Provider or Policyholder) to evaluate the future exposures based on observing the past. A pre-set date may be established in the software from a calendar that sets a future activity and the proper person is contacted.

As the policy progress through time, the Provider has the ability to send out periodic notifications via an email or other notification for Policyholder to update the data/information through links to self-service portals. This notification is automated and may preferably not notify if the Policyholder has updated without reminder as in step 490.

As an Exposure Based Policy matures (policy term has reached the expiration date), the Provider and Policyholder may determine if the coverage may be renewed. If the coverage is to be renewed, the Provider and Policyholder should be aware of the renewal forecasts as to base renewal pricing. All interested parties can evaluate the future policy term (renewal) Exposures through the software tool included in the software. This tool/report allows all parties to determine future policy Forecasts based on an empirical approach. Additionally, the tool may allow the Policyholder and Provider (most often the agent) to use a Comparative Analysis approach based on what has occurred in the past as in step 495.

Policyholder's Supporting Documentation 600

When a Policyholder or Provider maintains policy information on the software, the software may allow certain information to be stored as Electronic Stored Data (ESD). The ESD or other images are stored in a searchable diary from image type, or description. These images may reference any of the coverage types, or support and or verify the Exposure data as at step 605. For example, if a subcontractor is paid to perform work, a copy of the Certificate of Insurance is attached and a copy of the construction contract and/or purchase order is referenced.

The Policyholder may attach scanned documents such as a subcontractor's Certificate of Insurance, copies of contracts such as construction contracts, subcontractor agreements, tax forms such as 1099, W2, Federal 941's and other state quarterly wage and tax statements/forms, such as the state form Florida's UCT-6 form, and other relevant records, as stated in step 610.

These attachments may be labeled and attached to the form. (example: "Certificate of Insurance for: ABC Plumbing 05/01/2xxx-05/01/2xxx" and other labels that may be attached to the relevant records, keyword searchable, and reversible searchable for ease of future recall) These documents can be associated with vendor and other files that are relevant to the transaction (i.e., when a contractor is paid, and it is noted in the software that this sub is "insured", a certificate of insurance should be attached to that vendor file) as stated in step 615.

Before the Policyholder or user publishes the ESD, the software may have the function to redact, edit, extract, or revise certain information within the ESD or attached documents that would be considered privileged. Policyholder retains freedom to override software to manually redact any additional information Policyholder feels is privileged. The information that may be redacted would be items such as Social Security or other private information as stated in step 620.

Once the Supporting Documentation has been scanned, attached, or entered into the software, the information may need to be verified and confirmed periodically so that all parties know that the information represented in the supporting documentation is still accurate, current and valid. For example, a Certificate of Insurance for a subcontractor may need to be updated as a new policy term begins or coverage renews for the subcontractor, etc. The Provider may email or send other notifications to the Policyholder to update the data/information through links to self-service portals as stated in step 625.

Once the Policyholder identifies the subcontractors insurance Provider, a periodic request may be sent to the subcontractors insurance Provider and subcontractor using an automated feature in software requesting Certificates of Insurance and/or Additional Insured endorsements where applicable. Additionally, the request from either party (lower tier or higher tier) may require that the Provider notify the higher tier if the insurance coverage is cancelled through a policy endorsement titled a "Cancellation Notice Recipient." A portal is available for the higher tier or lower tier to make the request by exposing to the Provider of the lower tier the obligation that the lower tier (subcontractor) has entered into with the higher tier to be notified if coverage terminated or cancelled and once the coverage is cancelled, the Provider's obligation to notify the parties that coverage is cancelled, as stated in step 630.

When specific wording on Certificates of Insurance and Additional Insured endorsements, or Cancellation Notice Recipient Endorsements and the like are needed, a sample of each document may be sent electronically or by other means for the Subcontractors Agent/Provider to use to eliminate mistakes and misunderstandings as stated in step 635. Additionally, directives issued from Providers, Departments of Insurance or other authorities that govern the insurance business may be available on the proper use of a Certificate of Insurance or document verifying insurance may be available. As an example, if the party that is being insured has coverage being "certified" through a Certificate of Insurance or other document that is governed by the State of Georgia, a directive from the Insurance and Safety Fire Commissioner titled "Directive 11-EX-2" may be available if the requesting party needs the information, especially if the requestor of the information is requesting an amendment to the standard language of the Certificate of Insurance. Each party to the insurance contract that receives such Certificate of Insurance may have available this document that clearly states what the laws or rules say regarding a Certificate of Insurance, or modifying a Certificate of Insurance.

Agent/Provider of Subcontractor prepares the Certificate of Insurance, preferably in a digital format and begins the process to attach the Certificate of Insurance as stated in step 640.

The Certificate of Insurance is attached to the internet link exposed in the email or notification to this Provider as stated in step 645. So that the Certificate of Insurance can be recognized and distinct, the Provider for the Subcontractor may have an opportunity to edit the input of a diary/note that may name the attachment. i.e. "COI for Acme Plumbing 2/1/2xxx-2/1/2xxx," and identify the source of the image, etc. as stated in step 650.

When the Provider for the Subcontractor provides the software with the image of the Certificate of Insurance, the information that "certifies insurance coverage," the software also converts certain fields of information from the image from digital to text format. The text information is populated in the software to describe the document and allows reductions of input of further descriptions. i.e. A Certificate of Insurance image is attached to the Policyholder file in software for Acme Plumbing (a subcontractor working for Policyholder), the image reveals that the policy begins 2/1/2xxx and ends on 2/1/2xxx, the software converts this set of data to a text file and then into the proper field, this is possible due to standardization of these documents in the industry, etc as stated in step 655.

If the data sets are not properly described from this automated function or later the Policyholder or Provider determine that the information was not properly or best described originally, either party may update or override the image description(s) by editing the description of the attached image, or purging/moving the image altogether as stated in step 660.

Some Certificates of Insurance have specific wording that define the terms and conditions of the Certificate of Insurance. This may be for a specific job name, etc. Additionally, the Certificate of Insurance may require an attachment document typically titled an "Additional Insured Endorsement," or a Cancellation Notice Recipient. These endorsements often require wording that should be phrased a certain way. In these cases, the Policyholder may expose to the Provider of Subcontractor this information in a "sample format," or the final format, including the specific type of Additional Insured Endorsement. This format may be available by the Policyholder on an as needed basis as stated in step 665.

The Provider (typically the Agent of the Policyholder) may issue Certificates of Insurance, Cancellation Notice Recipient endorsements, and Additional Insured endorsements for the Policyholder. A portal may be available for these images to be viewed by all parties and allow the Provider to view what Certificates of Insurance and Additional Insured documents have been issued on behalf of the Policyholder by the Provider or the Agent as stated in step 670.

When the Policyholder enters into a contract, agreement, or other obligation to perform services for others or receive services from others, the Policyholder may attach the copies of such documents to the software. The Provider may receive notification that the contract has been entered into and the Provider may observe the nature of the contract and determine if any resources should be deployed to such job site, such as Loss Control, Risk Control, Ergonomics Specialist, or other staff or independent third party vendor to access the risk and mitigate known potential hazards as stated in step 675.

Once the contract to provide services or receive services is attached and described in the software as described at step 605, 610, and 615, the software may ask additional questions or provide a request of the Policyholder to further describe the nature of such job. For ease of use, the software may have drop down boxes that allow the Policyholder to easily mark the processes used to install material or construct for example. The drop down boxes may first be characterized as the general industry such as "Plumbing," however when multiple construction or installation disciplines are part of the construction or installation contract, the Policyholder may check multiple classifications of industry in the software. Once marked, additional questions may be exposed such as "Residential Project" or "Commercial Project," once marked, the software may continue to guide the Policyholder to all of the types of processes that shall or may be used in the job description, installation, manufacturing or construction. Once the information about the description of operations of the job that has been contracted, the information is input using the drop down boxes or other methods of descriptions of operations into the software describing the details of the job site and the hazards associated with the job site. The software may prepare or assist in assimilation of a Site Specific Safety Plan or other safety plan that may assist the Policyholder and the employees/workers of the Policyholder to assess the potential hazards and how to avert or mitigate such potential for bodily injury or property damage as in step 680. Information from other sections of the software may assist the Policyholder in properly populating such a plan as stated in step 225. The Provider may also automatically or manually evaluate the potential for injury by analyzing relative information or through the use of third party software.

When the installation contract or other contract is attached to the software, questions may be posed about the method or materials being installed or material used to install products in the installation process. The Provider may automatically evaluate the potential for injury when the Policyholder is using such materials by the Provider may also automatically or manually evaluate the potential for injury by analyzing relative information or through the use of third party software. Additionally, when the materials list is input into the contract to install materials or the use of materials, the software may automatically assist the Policyholder by forwarding electronically or by other means the Material Safety Data Sheets; commonly referred to as the MSDS. Additionally, when the materials or products being used or installed are identified, the installation process may also be forwarded to the Policyholder to assist with the proper techniques and methods of the installation. For example, if an installation contract is entered into to install building materials such as siding, the Provider may make available the proper technique(s) for the installation and the materials that should be used. A video illustrating the proper use, technique may be available to the Policyholder. These processes implemented may reduce or mitigate the potential for injury to a worker or someone from the public while reducing the potential for a completed operations or product liability claim as described at step 685.

When the location of the job-site that the Policyholder has contracted to perform work or install materials is entered into the software, the software may automatically or by other means determine if the location of the state is a covered location under either states designated as 3A or 3C states as noted on the information pages of the Workers Compensation policy(s). If the location state is not on either 3A or 3C states, the software may automatically or by other means notify the Provider and Policyholder of the potential problem with the policy exposure. Each party may determine the steps to take to eliminate or mitigate the potential exposure. If the policies do not include the premium rates for the states not covered on the insurance policies, the Provider may contact the Policyholder to alert them of the premium obligation, or notify the Policyholder of the need to make a request to add the coverage (3A) to the policy (or that coverage is not available and alternative coverage must be placed through another source) as stated in step 690.

Policies with restrictive policy language or limitation involving the type of materials used or installed (property losses such as Installation Floater or Builders Risk) or other losses such as work performed outside of the United States or coverage territory, work or products manufactured or installed that are not insured products or installations that may affect the General Liability or other coverage as stated in step 691.

When ESD is stored within the software, the software may search for key words written inside the ESD that may be of underwriting concern, Provider concern, and/or Policyholder concern. These key words (words of concern) may be maintained by either party; especially the Provider. The purpose of the key word search is to monitor on the behalf of either party the ability to ascertain the involvement of risk that the Policyholder is assuming and the amount of risk that the Provider is assuming in insuring these risks. For example, a certain electronically stored document may be identified by the Policyholder as "Installation Contract: Plumbing Contract to install pipe and plumbing fixtures: Widget Manufacturing, 123 Main Street, Anytown, ST 55555." The ESD attached to the software may find the "words of concern" by searching either the image as a digital format, text format or other format. If a word or words of concern are exposed, warnings regarding certain language may be sent to either or all parties. These words (or phrases) may include but not limited to "OCIP," "indemnify," "indemnification," "limits of insurance," "insurance," "to the fullest extent," "risk," "injury," "hold harmless," or a number such as "$5,000,000," etc. When the software recognizes that the contracted job is a protected by an "OCIP," the Provider and Policyholder may be notified with special instructions on how to avoid conflicts in the future; such as properly documenting each labor cost, or other cost on the invoice given to the higher tier contractor, construction manager, or owner, etc., as well as notifying the Policyholder of the nuances and unusual characteristics (pitfalls) of entering into such an agreement.

Exposure Information is Available to View or Transfer 800

Once the Policyholder or Provider updates the Exposure information as stated in 100, 200, 400, and 600, a report may be available to allow each authorized interested party to view Forecasted Exposures to Actual Exposures as well as other Exposures that may affect risk. The software identifies the cost of insurance as Exposure(s) have occurred as well as allowed the Provider the ability to get a complete assessment of the whole risk before it occurs through reporting and risk management processes as well as define the costs after the Exposures have occurred.

Those risks may be identified not only from cost(s) standpoint but also from identifying increased risks that could cause a potential loss (insured and uninsured). When the data about the Exposures have been updated in the software, the policy, hazards, costs and exposures to a loss can be evaluated immediately, as incurred, any time, in real time and on time through the date in which the software has been updated. The benefit from allowing all parties; Provider, Policyholder, Agent and all other professional working for or on behalf of either party should be evident.

With updated information being properly maintained and recorded on the software by all parties, everyone can clearly understand the insurance policies from each angle; cost to identifying potential for losses. This information contained within the Policyholder's Exposures Based Information, Supporting Documentation, including the proper wording on the Certificates of Insurance from subcontractors, or other contracts to fulfill an obligation, should benefit.

Each Party or Department which has a Specific Vested Interest in the Information Contained and Obtained within and from the Software.

- Provider Premium Audit Department, Software System Professional Technician or Provider Appointed Auditor
- Provider Underwriting Department or Actuarial Department
- Provider Loss Control Department
- Provider Legal Department
- Provider Claims Department
- Provider Billing or Accounting Department
- Policyholder's Insurance Agent/Broker/Third Party Administrators (TPA)
- Policyholder
- Policyholder's Designated Entity or representative such as a CPA®

Each party, whether a Policyholder or Provider may utilize the software for different reasons. Some of these reasons may include but are not limited to:

Allows Policyholder's subcontractors insurance Provider to know that a Certificate of Insurance is to be on file with the Policyholder.

Allows the Certificate of Insurance to be sent when the Policyholder updates software with pertinent information, etc. (i.e. Policyholder has contracted to lay block/brick at a new school being built by ABC General Contractors. The construction contract requires Insurance coverages which are described in the construction contract, the Policyholder scans/attaches or by other means a copy of the construction contract to perform the masonry work.)

The Provider knows automatically about the job and what Loss Control techniques are to be used.

When the job details and location of the job are input into the software the Provider may automatically or by other means, send a cost of insurance spreadsheet that may allow the Policyholder to maintain the proper cost associated with each worker for job costing, etc.

When the job site location is maintained in the software, the Provider's Loss Control Department may forward or make available to the Policyholder a copy of a "Site Specific Safety Plan."

When the Provider views the information associated with the job, additional resources may be called upon such as Provider Loss Control staff or other resources.

The Provider may evaluate the exposures to an insured or uninsured loss using the software tool or third party specific location data tools, this information about the location may assist either party with vital information that predicts the probability of a loss on the job, whether from an injury to a worker, physical damage to equipment or property, bodily injury or property damage to the public, etc. (i.e. If the Provider noted that the job included painting a building using a sprayer, the Provider may determine the probability of an over-spray claim based upon historical information and other factors such as experience, etc.)

When the Policyholder's Safety Plan does not address the exposures that are apparent in the obligated job duties that the Policyholder has contractually obligated themselves to perform, the Loss Control Department or other entity may review with the Policyholder recommendations, or updates to the Policyholder's Safety Plan, etc.

When the Policyholder requires Provider (or Provider must disclose to the Policyholder) full discloser of the commissions, fee(s), compensation, incentive pay, contingent compensation or profit sharing that the Provider has paid, may pay, or will pay to the sales department/Agent/Agency/Consultant/Broker/TPA or other party as a result of the Policyholder placing its business with the Provider, a portal disclosing such obligation may be available.

Additionally, the software may prepare a "custom employee handbook" once that the Policyholder's employees have been input into the software. Furthermore, a portal, and/or other link or communication may be established showing that the employee acknowledges receipt and/or access to the employer's handbook/manual. Electronic signatures or other means of verification relative to the employee may be utilized for at least some embodiments.

The software may import loss history and previous policy terms/periods payrolls and other exposures by classifications. This information may calculate the "Experience Modification," "Loss Picks," and other reports and analytics, or the information may be exported to third party software to complete the calculations. The software may import the calculations into the software to assist each party assess future costs of insurance or the potential for future losses, loss ratios, etc.

The software is exportable to Provider's Policy Administration System, Premium Audit Software Systems, third party software programs, or other formats, or printed in formats such as pdf, tif, GoogleDocs®, and other file, print and electronic formats. The information captured in the software may be translated into the proper format such a flat file format, etc. This allows software programs such as those of described in U.S. Pat. No. 5,855,005 to receive the information from software export without redundant keying, etc.

Numerous alterations of the structure herein disclosed will suggest themselves to those skilled in the art. However, it is to be understood that the present disclosure relates to the preferred embodiment of the invention which is for purposes of illustration only and not to be construed as a limitation of the invention. All such modifications which do not depart from the spirit of the invention are intended to be included within the scope of the appended claims.

What is claimed is:

1. A method of notifying parties as insurance exposure is incurred comprising the steps of:

maintaining a communication portal for a provider which receives information from representatives of policy holders;

sending information from the policy holder to the provider, with the information providing evidence of exposure to the provider related to one of activities and potential activities of the policy holder through the communication portal relative to a current policy;

automatedly evaluating the information relative to baseline information related to an insurance policy of the policy holder with a computer processor to evaluate if additional exposure is incurred; and outputting output to at least the provider instances of possible increased exposure for the current policy;

wherein the information is selected from the group of contracts having at least one third party other than the policy holder and insurance company as a contractual party and payroll information, and if at least one contract is provided, automatedly requesting at least one of insurance information of a third party, and if at least one payroll entry is provided, evaluating the classification of the employee relative to a baseline classification for the employee.

2. The method of claim 1 wherein the method is implemented independently of third party auditors.

3. The method of claim 1 wherein insurance cancellation notices from third parties are automatedly communicated through the communication portal to the provider.

4. A method of notifying parties as insurance exposure is incurred comprising the steps of:

maintaining a communication portal for a provider which receives information from representatives of policy holders;

sending information from the policy holder to the provider, with the information providing evidence of exposure to the provider related to one of activities and potential activities of the policy holder through the communication portal relative to a current policy;

automatedly evaluating the information relative to baseline information related to an insurance policy of the policy holder with a computer processor to evaluate if additional exposure is incurred; and outputting output to at least the provider instances of possible increased exposure for the current policy;

wherein the possible increased exposure identifies a source of shrinkage in a current policy thereby allowing the provider to advise the insured of increased premiums to cover the increased exposure identified by the processor in the current policy.

5. The method of claim 4 further comprising the step of identifying a rational for a heightened risk based on business intelligence and then screening information provided by the policy holder based on that heightened risk.

6. The method of claim 5 wherein the heightened risk is storm information.

7. The method of claim 6 wherein the policy holder inputs information which is related to at least a third named insured.

8. The method of claim 7 wherein the information relates to an employee and the processor compares the information relative to a database of employees to identify whether the employee is perceived as having heightened risks associated therewith.

9. The method of claim 8 wherein the heightened risks result from at least one of a background check, a medical history check, and an insurance claim filing check.

10. The method of claim 4 wherein the policy holder inputs the information which is related to at least a first and a second named insured in the insurance policy.

11. The method of claim 4 wherein insurance cancellation notice recipient requests are communicated through the portal to at least the provider.

12. The method of claim 4 wherein the method is implemented independently of third party auditors.

13. The method of claim 4 further comprising the step of the provider notifying the policy holder of an activity which is beyond the scope of the insurance policy.

14. The method of claim 13 wherein the notification is automatically initiated by the processor to be sent through the communications portal to the policy holder.

15. The method of claim 4 further comprising the step of the provider takes measures upon receipt of the output to at least one of (a) mitigate potential damages, (b) increase at least one of the premium and scope of the insurance policy, and (c) apply at least one risk transfer technique.

16. The method of claim 15 wherein the step of taking measures is automatically initiated upon receipt of the output by the processor.

17. The method of claim 15 wherein mitigation of potential damages is provided by generating a panel of physicians to be provided to the policy holder to provide at a worksite in an event of an injury.

18. The method of claim 4 wherein the communications portal further comprises an insurance provider rates and rules tool, whereby the policy holder can remotely access the tool and the processor automatically provide at least one of an insurance policy quote and premium based on input exposures by the policy holder.

19. The method of claim 4 wherein the policy holder inputs the information independently of specific requests on behalf of the provider.

20. The method of claim 4 wherein upon identifying possible increased exposure, further comprising the step of notifying at least one of a loss control department of the provider, a risk management department of the provider, an underwriting department of the provider, a claim department of the underwriter, an insurance broker for the policy holder, and at least one of an insurance agent and agency for the policy holder.

* * * * *